(12) United States Patent
Yang et al.

(10) Patent No.: US 11,059,918 B2
(45) Date of Patent: *Jul. 13, 2021

(54) METALLOCENE CATALYST COMPOSITIONS AND POLYMERIZATION PROCESS THEREWITH

(71) Applicant: ExxonMobil Chemical Patents Inc., Baytown, TX (US)

(72) Inventors: Jian Yang, Houston, TX (US); Peijun Jiang, Katy, TX (US); Xiongdong Lian, Shanghai (CN)

(73) Assignee: ExxonMobil Chemical Patents Inc., Baytown, TX (US)

( * ) Notice: Subject to any disclaimer, the term of this patent is extended or adjusted under 35 U.S.C. 154(b) by 94 days.

This patent is subject to a terminal disclaimer.

(21) Appl. No.: 16/301,596

(22) PCT Filed: May 27, 2016

(86) PCT No.: PCT/US2016/034784
§ 371 (c)(1),
(2) Date: Nov. 14, 2018

(87) PCT Pub. No.: WO2017/204830
PCT Pub. Date: Nov. 30, 2017

(65) Prior Publication Data
US 2019/0292282 A1  Sep. 26, 2019

(51) Int. Cl.
| | | |
|---|---|---|
| C07F 17/00 | (2006.01) | |
| C08F 4/6592 | (2006.01) | |
| C08F 110/06 | (2006.01) | |
| B01J 31/16 | (2006.01) | |
| C08F 210/16 | (2006.01) | |
| C08F 4/00 | (2006.01) | |
| C08F 4/659 | (2006.01) | |

(52) U.S. Cl.
CPC ............. *C08F 110/06* (2013.01); *B01J 31/16* (2013.01); *C07F 17/00* (2013.01); *C08F 4/00* (2013.01); *C08F 4/65925* (2013.01); *C08F 4/65927* (2013.01); *C08F 210/16* (2013.01); *C08F 4/65908* (2013.01); *C08F 4/65912* (2013.01); *C08F 4/65916* (2013.01); *C08F 2420/01* (2013.01); *C08F 2800/20* (2013.01)

(58) Field of Classification Search
None
See application file for complete search history.

(56) References Cited

U.S. PATENT DOCUMENTS

| | | | |
|---|---|---|---|
| 5,049,535 A | 9/1991 | Resconi et al. | |
| 5,276,208 A | 1/1994 | Winter et al. | |
| 5,278,264 A | 1/1994 | Spaleck et al. | |
| 5,411,994 A | 5/1995 | Galli et al. | |
| 5,459,117 A | 10/1995 | Ewen | |
| 5,532,396 A | 7/1996 | Winter et al. | |
| 5,539,076 A | 7/1996 | Nowlin et al. | |
| 5,543,373 A | 8/1996 | Winter et al. | |
| 5,547,756 A | 8/1996 | Kamo et al. | |
| 5,585,509 A | 12/1996 | Langhauser et al. | |
| 5,589,549 A | 12/1996 | Govoni et al. | |
| 5,631,202 A | 5/1997 | Ewen | |
| 5,661,098 A | 8/1997 | Harrison et al. | |
| 5,696,045 A | 12/1997 | Winter et al. | |
| 5,700,886 A | 12/1997 | Winter et al. | |
| 5,770,753 A | 6/1998 | Kueber et al. | |
| 5,786,432 A | 7/1998 | Kueber et al. | |
| 5,840,644 A | 11/1998 | Kueber et al. | |
| 5,990,242 A | 11/1999 | Naga et al. | |
| 5,869,584 A | 12/1999 | Winter et al. | |
| 6,001,764 A | 12/1999 | Pullukat et al. | |
| 6,028,140 A | 2/2000 | Collina et al. | |
| 6,051,727 A | 4/2000 | Kueber et al. | |
| 6,069,213 A | 5/2000 | Nernzek et al. | |
| 6,121,182 A | 9/2000 | Okumura et al. | |
| 6,150,481 A | 11/2000 | Winter et al. | |
| 6,174,930 B1 | 1/2001 | Agarwal et al. | |
| 6,242,544 B1 | 6/2001 | Kueber et al. | |
| 6,255,506 B1 | 7/2001 | Kueber et al. | |
| 6,262,195 B1 | 7/2001 | Dall'Occo et al. | |
| 6,329,315 B1 | 12/2001 | Denton et al. | |
| 6,350,830 B1 | 2/2002 | Gores et al. | |
| 6,376,627 B1 | 4/2002 | Burkhardt et al. | |
| 6,399,533 B2 | 6/2002 | Sacchetti et al. | |
| 6,429,250 B1 | 8/2002 | Rohrmann | |
| 6,444,833 B1 | 9/2002 | Ewen et al. | |
| 6,492,465 B1 | 12/2002 | Burkhardt et al. | |
| 6,559,252 B1 | 5/2003 | Horton et al. | |

(Continued)

FOREIGN PATENT DOCUMENTS

| | | |
|---|---|---|
| CN | 102731691 | 2/2014 |
| EP | 0834519 | 4/1998 |

(Continued)

OTHER PUBLICATIONS

U.S. Appl. No. 16/774,923, filed Jan. 28, 2020, Luo, L. et al.
U.S. Appl. No. 62/885,103, filed Aug. 9, 2019, Canich, J. et al.
U.S. Appl. No. 62/914,209, filed Oct. 11, 2019, Yang, J. et al.
U.S. Appl. No. 62/926,969, filed Oct. 28, 2019, Rapp, J. et al.
U.S. Appl. No. 62/980,809, filed Feb. 24, 2020, Canich, J. et al.

(Continued)

*Primary Examiner* — Yun Qian

(57) ABSTRACT

This invention relates bisindenyl metallocene catalyst compounds having long (at least 4 carbon atoms) linear alkyl groups substituted at the two position and substituted or unsubstituted aryl groups at the four position and process using such catalyst compounds, particularly in the solution process at higher temperatures.

5 Claims, 11 Drawing Sheets

(56) References Cited

U.S. PATENT DOCUMENTS

| | | |
|---|---|---|
| 6,608,224 B2 | 8/2003 | Resconi et al. |
| 6,635,779 B1 | 10/2003 | Ewen et al. |
| 6,673,736 B2 | 1/2004 | Kellum et al. |
| 6,777,366 B2 | 8/2004 | Gauthier et al. |
| 6,777,367 B2 | 8/2004 | Gauthier et al. |
| 6,787,616 B2 | 9/2004 | Takemori et al. |
| 6,841,501 B2 | 1/2005 | Resconi et al. |
| 6,846,943 B2 | 1/2005 | Nakano et al. |
| 6,855,783 B2 | 2/2005 | Gauthier et al. |
| 6,870,016 B1 | 3/2005 | Burkhardt et al. |
| 6,878,786 B2 | 4/2005 | Resconi et al. |
| 6,916,886 B2 | 7/2005 | Morioka et al. |
| 6,949,614 B1 | 9/2005 | Schottek et al. |
| 6,953,829 B2 | 10/2005 | Kratzer et al. |
| 6,992,153 B1 | 1/2006 | Collina et al. |
| 7,034,173 B2 | 4/2006 | Schottek |
| 7,122,498 B2 | 10/2006 | Hart et al. |
| 7,141,527 B1 | 11/2006 | Van Baar et al. |
| 7,314,903 B2 | 1/2008 | Resconi et al. |
| 7,342,078 B2 | 3/2008 | Schottek et al. |
| 7,405,261 B2 | 7/2008 | Schulte et al. |
| 7,452,949 B2 | 11/2008 | Okumura et al. |
| 7,569,651 B2 | 8/2009 | Schottek et al. |
| 7,615,597 B2 | 11/2009 | Resconi et al. |
| 7,799,880 B2 | 9/2010 | Ciaccia |
| 7,829,495 B2 | 11/2010 | Floyd et al. |
| 7,964,679 B2 | 6/2011 | Resconi et al. |
| 7,985,799 B2 | 7/2011 | Resconi et al. |
| 8,222,356 B2 | 7/2012 | Kipke et al. |
| 8,299,287 B2 | 10/2012 | Dimeska et al. |
| 8,318,872 B2 | 11/2012 | Savatsky et al. |
| 8,399,375 B2 | 3/2013 | Itan et al. |
| 8,415,492 B2 | 4/2013 | Sell et al. |
| 8,507,706 B2 | 8/2013 | Dimeska et al. |
| 8,557,917 B2 | 10/2013 | Leskinen et al. |
| 8,729,206 B2 | 5/2014 | Resconi et al. |
| 9,193,856 B2 | 11/2015 | Ebata et al. |
| 9,249,238 B2 | 2/2016 | Hagadorn et al. ........ C08F 4/76 |
| 9,249,239 B2 | 2/2016 | Jian et al. |
| 9,260,552 B2 | 2/2016 | Hagadorn et al. .. C08F 210/016 |
| 9,279,024 B2 | 3/2016 | Holtcamp et al. ........ C08F 4/76 |
| 9,376,559 B2 | 6/2016 | Holtcamp et al. |
| 9,458,257 B2 | 10/2016 | Funaya et al. |
| 9,464,145 B2 | 10/2016 | Yang et al. |
| 9,644,047 B2 | 5/2017 | Yang et al. |
| 9,676,882 B2 | 6/2017 | Holtcamp et al. .... C08F 210/06 |
| 9,718,900 B2 | 8/2017 | Giesbrecht |
| 9,725,537 B2 | 8/2017 | Luo et al. |
| 9,725,569 B2 | 8/2017 | Holtcamp et al. |
| 9,738,779 B2 | 8/2017 | Luo et al. |
| 9,745,390 B2 | 8/2017 | Yang et al. |
| 9,809,664 B2 | 11/2017 | Luo et al. |
| 9,834,628 B2 | 12/2017 | Canich et al. |
| 9,920,176 B2 | 3/2018 | Luo et al. |
| 9,944,665 B2 | 4/2018 | Yang et al. |
| 9,988,410 B2 | 6/2018 | Yang et al. ............ C07F 17/00 |
| 10,077,325 B2 | 9/2018 | Luo et al. |
| 10,119,016 B2 | 11/2018 | Luo et al. |
| 10,280,240 B2 | 5/2019 | Hagadorn et al. .... C08F 110/06 |
| 10,570,219 B2 | 2/2020 | Luo et al. ................. C08F 2/34 |
| 2001/0053833 A1 | 12/2001 | Nakano et al. |
| 2002/0147105 A1 | 10/2002 | Shamshoum et al. |
| 2003/0171207 A1 | 9/2003 | Shih et al. |
| 2003/0236365 A1 | 12/2003 | Tian et al. |
| 2004/0204310 A1 | 10/2004 | Gauthier et al. |
| 2005/0003951 A1 | 1/2005 | Ferraro et al. |
| 2005/0085376 A1 | 4/2005 | Nagy et al. |
| 2005/0182266 A1 | 8/2005 | Schulte et al. |
| 2007/0004814 A1 | 1/2007 | Resconi et al. |
| 2007/0055021 A1 | 3/2007 | Chandrashekar et al. |
| 2007/0179051 A1 | 8/2007 | Mihan et al. |
| 2009/0018267 A1 | 1/2009 | Vestberg et al. |
| 2009/0062492 A1 | 3/2009 | Luo et al. |
| 2009/0259007 A1 | 10/2009 | Ciaccia |
| 2010/0267907 A1 | 10/2010 | Dimeska et al. |
| 2011/0034649 A1 | 2/2011 | Standaert et al. |
| 2011/0160373 A1 | 2/2011 | Bernreitner et al. |
| 2011/0081817 A1 | 4/2011 | Bieser et al. |
| 2011/0112262 A1 | 5/2011 | Gauthier et al. |
| 2011/0230630 A1 | 9/2011 | Sell et al. |
| 2013/0253124 A1 | 9/2013 | Bernreiter et al. |
| 2013/0345376 A1 | 12/2013 | Luo et al. |
| 2014/0221514 A1 | 8/2014 | Datta et al. |
| 2014/0303308 A1 | 10/2014 | Grestenberger et al. |
| 2014/0357771 A1 | 12/2014 | Tranninger et al. |
| 2015/0025208 A1 | 1/2015 | Yang et al. |
| 2015/0119537 A1 | 4/2015 | Holtcamp et al. |
| 2015/0183893 A1* | 7/2015 | Yang ................... C08F 4/65927 526/127 |
| 2016/0032025 A1 | 2/2016 | Giesbrecht |
| 2016/0137763 A1 | 5/2016 | Hoitcamp et al. |
| 2016/0244539 A1 | 8/2016 | Resconi et al. |
| 2016/0335619 A1 | 12/2016 | Ye et al. |
| 2016/0355653 A1 | 12/2016 | Holtcamp et al. |
| 2016/0355654 A1 | 12/2016 | Luo et al. |
| 2016/0355655 A1 | 12/2016 | Luo et al. |
| 2016/0355657 A1 | 12/2016 | Luo et al. |
| 2017/0253656 A1 | 9/2017 | Penta et al. |
| 2017/0306136 A1 | 10/2017 | Luo et al. |
| 2017/0342175 A1 | 11/2017 | Hagadorn et al. |
| 2018/0022843 A1 | 1/2018 | Luo et al. |
| 2018/0142045 A1 | 5/2018 | Luo |
| 2018/0142046 A1 | 5/2018 | Luo |
| 2018/0162964 A1 | 6/2018 | Yang et al. |
| 2018/0179319 A1 | 6/2018 | Luo et al. |
| 2018/0201630 A1 | 7/2018 | Yang et al. ............. C07F 7/006 |
| 2019/0119418 A1 | 4/2019 | Yang et al. ........... C08F 210/14 |
| 2019/0144571 A1 | 5/2019 | Yang et al. ............. C08F 10/02 |
| 2019/0161560 A1 | 5/2019 | Yang et al. ......... C08F 4/65927 |
| 2019/0161561 A1 | 5/2019 | Yang et al. ......... C08F 4/65927 |
| 2019/0194370 A1 | 6/2019 | Tsou et al. ............ C08F 210/16 |
| 2019/0248936 A1 | 8/2019 | Yang et al. ........... C08F 210/16 |
| 2019/0263953 A1 | 8/2019 | Li et al. ................ C08F 210/16 |
| 2019/0292282 A1 | 9/2019 | Yang et al. ........... C08F 210/16 |
| 2019/0359744 A1 | 11/2019 | Chen et al. ............. C08F 10/14 |
| 2019/0359745 A1 | 11/2019 | Chen et al. ............. C08F 10/14 |
| 2019/0359748 A1 | 11/2019 | Chen et al. ........... C08F 210/16 |
| 2020/0024436 A1 | 1/2020 | Tsou et al. .............. C08L 23/16 |

FOREIGN PATENT DOCUMENTS

| | | |
|---|---|---|
| EP | 1205493 | 5/2002 |
| EP | 1380598 | 1/2004 |
| EP | 1541598 | 6/2005 |
| JP | 2003-073414 | 3/2003 |
| JP | 2012-214709 | 11/2012 |
| WO | 01/58970 | 12/2000 |
| WO | 02/02575 | 1/2002 |
| WO | 02/02576 | 1/2002 |
| WO | WO2002/022575 | 3/2002 |
| WO | 03/002583 | 1/2003 |
| WO | 03/045551 | 6/2003 |
| WO | 03/051934 | 6/2003 |
| WO | 2004/052945 | 6/2004 |
| WO | 2004/092225 | 10/2004 |
| WO | 2004/106351 | 12/2004 |
| WO | 2014/016318 | 1/2014 |
| WO | 2015/065676 | 5/2015 |
| WO | 2015/070360 | 5/2015 |
| WO | 2016/196331 | 12/2016 |
| WO | 2016/196334 | 12/2016 |
| WO | 2016/196339 | 12/2016 |
| WO | 2016/197014 | 12/2016 |
| WO | 2016/197037 | 12/2016 |
| WO | 2017/204830 | 11/2017 |
| WO | WO 2017204830 | * 11/2017 .............. C08F 4/659 |

OTHER PUBLICATIONS

Sinn, "Proposals for Structure and Effect of Methylalumoxane Based on Mass Balances and Phase Separation Experiments," Macromolecular Symposia, 1995, vol. 97, Issue 1, pp. 27-52.

Pasquini, N. (Ed.), Polypropylene Handbook, 2005, 2nd Ed., Hanser Publishers, Munich, pp. 78-89.

(56) References Cited

OTHER PUBLICATIONS

Shinamoto et al., "Microspherical Silica Supports with High Pore Volume for Metallocene Catalysts," presented at Metallocenes Europe '97 Dusseldorf, Germany, Apr. 8-9, 1997.
Imhoff et al., "Characterization of Methylaluminoxanes and Determination of Trimethylaluminum Using Proton NMR", Organometallics, 1998, vol. 17, pp, 1941-1945.
Kaminsky, "Highly Active Metallocene Catalysts for Olefin Polymerization ," Journal of Chemical Society, Dalton Trans., 1998, pp. 1413-1418.
Mortazavi et al., "Characterization of MAO-Modified Silicas for Ethylene Polymerization," Journal of Applied Polymer Science, 2013, vol. 130, No. 6, pp. 4568-4575.
Chen et al., "Preparation and characterization of agglomerated porous hollow silica supports for olefin polymerization catalyst," Journal of Non-Crystalline Solids, 2007, vol. 353, No. 11-12, pp. 1030-1036.
Smit et al., "Effects of Methylaluminoxane Immobilization on Silica on the Performance of Zirconocene Catalysts in Propylene Polymerization," Journal of Polymer Science: Part A: Polymer Chemistry, 2005, vol. 43, pp. 2734-2748.
Von Hohenesche et al., "Agglomerated non-porous silica nanoparticles as model carriers in polyethylene synthesis," Journal of Molecular Catalysis A: Chemical, Elsevier, Amsterdam, NL, 2004, vol. 221, No. 1-2, pp. 185-199.
Cecchin et al, "On the Mechanism of Polypropene Growth over MgCl2/TiCl4 Catalyst Systems," Macromolecular Chemistry and Physics, 2001, vol. 202, No. 10, p. 1987-1994.
D'Agnillo et al., "Controlling Molecular Weight Distributions of Polyethylene by Combining Soluble Metallocene/MAO Catalysts," Journal of Polymer Science Part A: Polymer Chemistry, 1998, vol. 36, No. 5, pp. 831-840.
Zheng et al., "Fragmentation Behavior of Silica-Supported Metallocene/MAO Catalysts in the Early Stages of Olefin Polymerization," Macromolecules, 2005, vol. 35, No. 11, pp. 4673-4678.
Resconi et al., "Metallocene Catalysts for Propylene Polymerization," Polypropylene Handbook, Pasquini, Ed., Chapter 2.2, Hanser Publications, Munic, 2005.
Schmidt et al., "Synthesis and characterization of unbridged metallocene dichloride complexes with two differently mono-substituted indenyl ligands and their application as catalysts for the polymerization of ethane and propene," Journal of Molecular Catalysis A: Chemical, 2001, 172 (1-2), pp. 43-65.
Tynys et al., "Ethylene-Propylene Copolymerizations: Effect of Metallocene Structure on Termination Reactions and Polymer Miscrostructure," Macromolecular Chemical Phys., 2005, vol. 206, pp. 1043-1056.
Severn et al., Editors, Tailor-Made Polymers, 2008, p. 103.
Leino, R. et al. (2007) "Isotactic Polypropylene from $C_{2-}$ and Pseudo-$C_2$-Symmetric Catalysts," *Stereoselective Polymerization with Single-Site Catalysts*, CRC Press, Baugh, L. S. and Canich, J. A. M. (Eds.), pp. 3-35.

\* cited by examiner

METALLOCENE CATALYST COMPOSITIONS AND POLYMERIZATION PROCESS THEREWITH

RELATED APPLICATIONS AND PATENTS

This application is the § 371 National Stage application for PCT/US2016/034784, filed May 27, 2016. This invention relates to: PCT/US2016/034755, filed May 27, 2016, which has entered the United States National Phase as U.S. Ser. No. 15/570,809, PCT/US2016/034768, filed May 27, 2016, which has entered the United States National Phase as U.S. Ser. No. 15/570,814.

FIELD OF THE INVENTION

This invention relates to novel catalyst compounds, catalyst systems comprising asymmetric substituted indenyl groups and uses thereof.

BACKGROUND OF THE INVENTION

Olefin polymerization catalysts are of great use in industry. Hence, there is interest in finding new catalyst systems that increase the commercial usefulness of the catalyst and allow the production of polymers having improved properties.

Catalysts for olefin polymerization are often based on metallocenes as catalyst precursors, which are typically activated either with an alumoxane or with an activator containing a non-coordinating anion. Metallocene catalysts for propylene copolymers, however, have been limited by their inability to produce propylene-ethylene copolymers of high molecular weight or other desired properties. This has been observed for many metallocene structures, such as the syndiospecific $C_s$ symmetric $Me_2C(Cp)(Flu)ZrCl_2$, the aspecific $C_{2v}$ symmetric $Me_2Si(Flu)_2ZrCl_2$, and both the $C_2$ symmetric rac-$Me_2C(3-iPr-Ind)_2ZrCl_2$ and the fluxional (2-Ph-Ind)$_2$ZrCl$_2$ catalysts for elastomeric polypropylene. This deficit has also been found for the isospecific $C_2$ symmetric rac-$Me_2Si(2-Me-4,5-Benz-Ind)_2ZrCl_2$ and rac-$Me_2Si(2-Me-4-Ph-Ind)_2ZrCl_2$ (L. Resconi, C. Fritze, "Metallocene Catalysts for Propylene Polymerization" In Polypropylene Handbook (N. Pasquini, Ed.), ch. 2.2, Hanser Publishers, Munic 2005). It is thought that, while the 2-Me substitution of this catalyst family suppresses the β-hydrogen transfer to the propylene monomer and thus prevents the formation of low molecular weight polymer, it fails to prevent the β-hydrogen transfer to the ethylene comonomer in case of the latter's presence. This β-hydrogen transfer to the ethylene comonomer becomes the favored chain termination mechanism and leads to the formation of low molecuar weight propylene-ethylene copolymers (A. Tynys et al., Macromol. Chem. Phys. 2005, vol. 206, pp. 1043-1056: "Ethylene-Propylene Copolymerizations: Effect of Metallocene Structure on Termination Reactions and Polymer Microstructure"). Exceptions have been found in some zirconocenes with bulky ligands, such as rac-$Me_2C(3-tBu-Ind)_2$ $ZrCl_2$, which show a marked increase in molecular weight by ethylene incorporation. This catalyst, however, has shortcomings in terms of homopolymer molecular weight and activity.

Desirable metallocene catalysts for isotactic polypropylene production produce polypropylenes with high melting points. This thought to be due to high stereospecificity and/or regioselectivity in the polymer microstructure. Within the rac-$Alk_2Si(2-Alk-Ind)_2ZrCl_2$ catalyst family (Alk=Alkyl), the stereospecificity and regioselectivity is continuously being modified. For Example, EP 834 519 A1 relates to rac-$Me_2Si(2-Me-4-Ar-Ind)_2ZrCl_2$ type metallocenes for the production of rigid, high melting point polypropylenes with high stereoregularity and very low amounts of regio errors. However, these polypropylenes did not fare well under commercially relevant process conditions and suffered from low activity/productivity-levels.

US-A1 2001/0053833 discloses metallocenes where the 2-position is substituted with an unsubstituted heteroaromatic ring or a heteroaromatic ring having at least one substituent bonded to the ring that produce propylene ethylene copolymers having less than desired melting points.

WO 01/058970 relates to impact copolymers having a high melting point and a good rubber content, produced by catalysts of the rac-$Me_2Si(2-Alk-4-Ar-Ind)_2ZrCl_2$ family when both alkyl substituents were iso-propyl groups. However, these catalysts suffer from activity issues.

WO 02/002576 discloses bridged metallocenes of the (2-Alkyl-4-Ph-Ind)$_2$ZrCl$_2$ family where the 2-positions can be isopropyl and the Ph substituents are substituted in the 3 and 5 positions, particularly with t-butyl. However, these catalysts also suffer from activity/productivity issues at commercial conditions.

WO 03/002583 discloses bridged metallocenes of the (2-Alkyl-4-Ph-Ind)$_2$ZrCl$_2$ family where the 2-positions may be substituted with isopropyl groups and the 4 positions are substituted with Ph group substituted at the 2-position, particularly with a phenyl group.

However, these catalysts also suffer from activity/productivity issues at commercial conditions. In addition, these catalysts have relatively low Mw capabilities for isotactic homopolypropylene.

EP-A2 1 250 365; WO 97/40075; and WO 03/045551 relate to bis indenyl metallocenes where substituents at the 2-positions of either of the indenyl ligands are branched or cyclicized in the α-position. However, these catalysts still have relatively limited Mw capabilities for isotactic homopolypropylene.

WO 04/106351 relates to bisindenyl metallocenes having substitutents in the 2-positions of the indenyl ligands with the proviso that one ligand is unbranched or bound via an sp$^2$-hybridized carbon atom and the other ligand is branched in the α-position. However, these catalysts still have relatively limited Mw capabilities for isotactic homopolypropylene.

U.S. Pat. No. 8,507,706 discloses bisindenyl metallocenes where at least one 2 position on the indenyl groups is substituted with a group branched at the beta position and the other 2-position is not branched at the alpha position. US 2011/0230630 discloses similar metallocenes except that the group at the 2 position is branched in the beta-position and that the beta-carbon atom is a quarternary carbon atom and part of a non-cyclic hydrocarbon system.

U.S. Pat. No. 7,829,495 discloses alkyl substituted metallocenes having a " . . . $C_3$ or greater hydrocarbyl . . . substitutent bonded to either the LA or LB ring through a primary carbon atom . . . preferably an n-alkyl substituent . . . " (see column 4, lines 9-12). Further, in the Examples section, (n-propylcyclopentadienyl)(tetramethylcyclopentadienyl)zirconium dichloride combined with methylalumoxane and Davision™ 948 silica is used for ethylene hexene polymerization; bis(n-propyl cyclopentadienyl) zirconium dichloride combined with methylalumoxane and Davision™ 948 silica is used for ethylene hexene polymerization; and dimethylsilyl(flourenyl)(n-propyl cyclopentadienyl) zirconium dichloride combined with methylalumoxane and Davision silica is used for ethylene hexene polymerization.

US 2015/0025208, published Jan. 22, 2015, discloses bridged bisindenyl compounds where the 2 positions on the indene ($R^2$ and $R^8$) are not the same and the 4 positions on the indene ($R^4$ and $R^{10}$) are substituted phenyl groups, where at least one of $R^4$ and $R^{10}$ is a phenyl group substituted at the 3 and 5 position.

US 2005/0182266 discloses a process for preparing transition metal compounds having a specific substitution pattern, the corresponding transition metal compounds themselves and their use in the preparation of catalyst systems and also the use of the catalyst systems in the polymerization and copolymerization of olefins.

Other references of interest include U.S. Pat. Nos. 6,051,727; 6,255,506; EP 0 576 970; U.S. Pat. Nos. 5,459,117; 5,532,396; 5,543,373; 5,585,509; 5,631,202; 5,696,045; 5,700,886; 6,492,465; 6,150,481; 5,770,753; 5,786,432; 5,840,644; 6,242,544; 5,869,584; 6,399,533; 6,444,833; 6,559,252; 6,608,224; 6,635,779; 6,841,501; 6,878,786; 6,949,614; 6,953,829; 7,034,173; 7,141,527; 7,314,903; 7,342,078; 7,405,261; 7,452,949; 7,569,651; 7,615,597; 7,799,880; 7,964,679; 7,985,799; 8,222,356; 5,278,264; 5,276,208; 5,049,535; US 2011/0230630; WO 02/002575; WO 02/022575; WO 2003/002583; U.S. Pat. No. 7,122,498; US 2011/0230630; US 2010/0267907; EP 1 250 365; WO 97/9740075; WO 03/045551; WO 02/002576; US 2015/0025205; U.S. Ser. No. 14/572,195; filed Dec. 16, 2014; U.S. Pat. No. 9,193,856; WO 2004/052945; US 2016/0032025; and Journal of Molecular Catalysis A: Chemical (20010705), 172(1-2), pp. 43-65.

This invention relates to co-owned U.S. Pat. No. 9,249,239 and co-pending applications U.S. Ser. No. 15/000,731, filed Jan. 19, 2016; U.S. Ser. No. 14/324,333, filed Jul. 7, 2014; U.S. Ser. No. 14/324,408, filed Jul. 7, 2014; and U.S. Ser. No. 14/324,427, filed Jul. 7, 2014.

There is still a need in the art for new and improved catalyst systems for the polymerization of olefins, in order to achieve specific polymer properties, such as high melting point, high molecular weights, to increase conversion or comonomer incorporation, or to alter comonomer distribution without deteriorating the resulting polymer's properties.

It is therefore an object of the present invention to provide novel catalyst compounds, catalysts systems comprising such compounds, and processes for the polymerization of olefins using such compounds and systems.

Furthermore, it is an objective of the present invention to provide olefin polymers, particularly propylene homopolymers, and random copolymers of propylene with ethylene and/or higher alpha-olefins.

SUMMARY OF THE INVENTION

This invention relates to metallocene catalyst compounds represented by the formula:

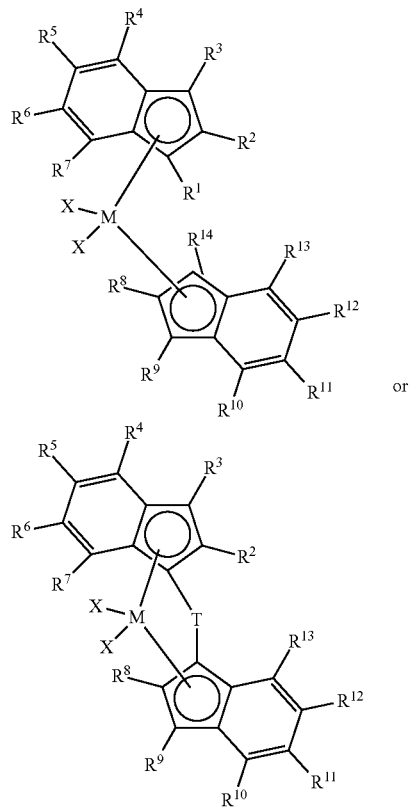

wherein, $R^2$ and $R^8$ are, independently, a C1 to C20 linear alkyl group, provided that at least one of $R^2$ and $R^8$ must have at least 4 carbon atoms;

$R^4$ and $R^{10}$ are substituted or unsubstituted aryl groups, provided that at least one of the aryl groups is: 1) substituted at an othro position with at least one group selected from $C_1$ to $C_{40}$ hydrocarbyls, heteroatoms, and heteroatom containing groups and/or 2) substituted at the 3', 4' or 5' position with at least one group selected from $C_1$ to $C_{40}$ hydrocarbyls, heteroatoms, and heteroatom containing groups;

M is a group 2, 3 or 4 transition metal;

T is a bridging group;

each X is an anionic leaving group;

each $R^1$, $R^3$, $R^5$, $R^6$, $R^7$, $R^9$, $R^{11}$, $R^{12}$, $R^{13}$, and $R^{14}$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents.

This invention further relates to a catalyst system comprising such metallocenes and an activator.

This invention further relates to a method to polymerize olefins comprising contacting olefins with a catalyst system comprising said metallocene catalyst compound(s) described above and an activator.

This invention further relates to a method to polymerize olefins comprising contacting at a temperature of 60° C. (alternately 80° C.) or more, olefins and with a catalyst system comprising an activator and one or more catalyst compounds described above, and preferably obtaining polymer having: a) from 0.5 to 60 weight % ethylene, based upon the weight of the copolymer; b) an Mw of 200,000 g/mol or more, as determined by GPC-DRI.

DETAILED DESCRIPTION OF THE INVENTION

Figure 1A:
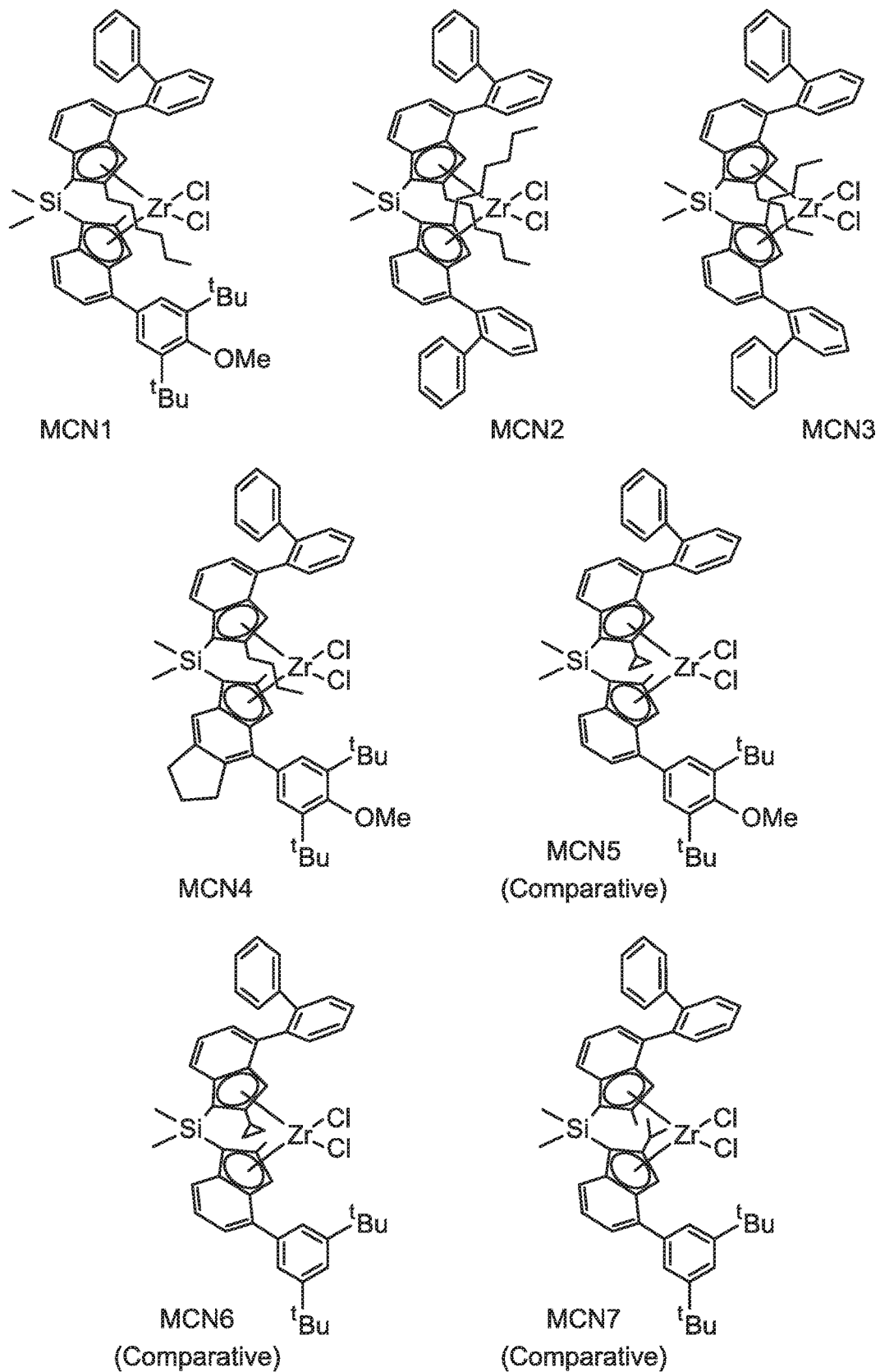
FIG. 1 is a drawing of the formulas for MCNs 1 to 14.
Figure 1B:
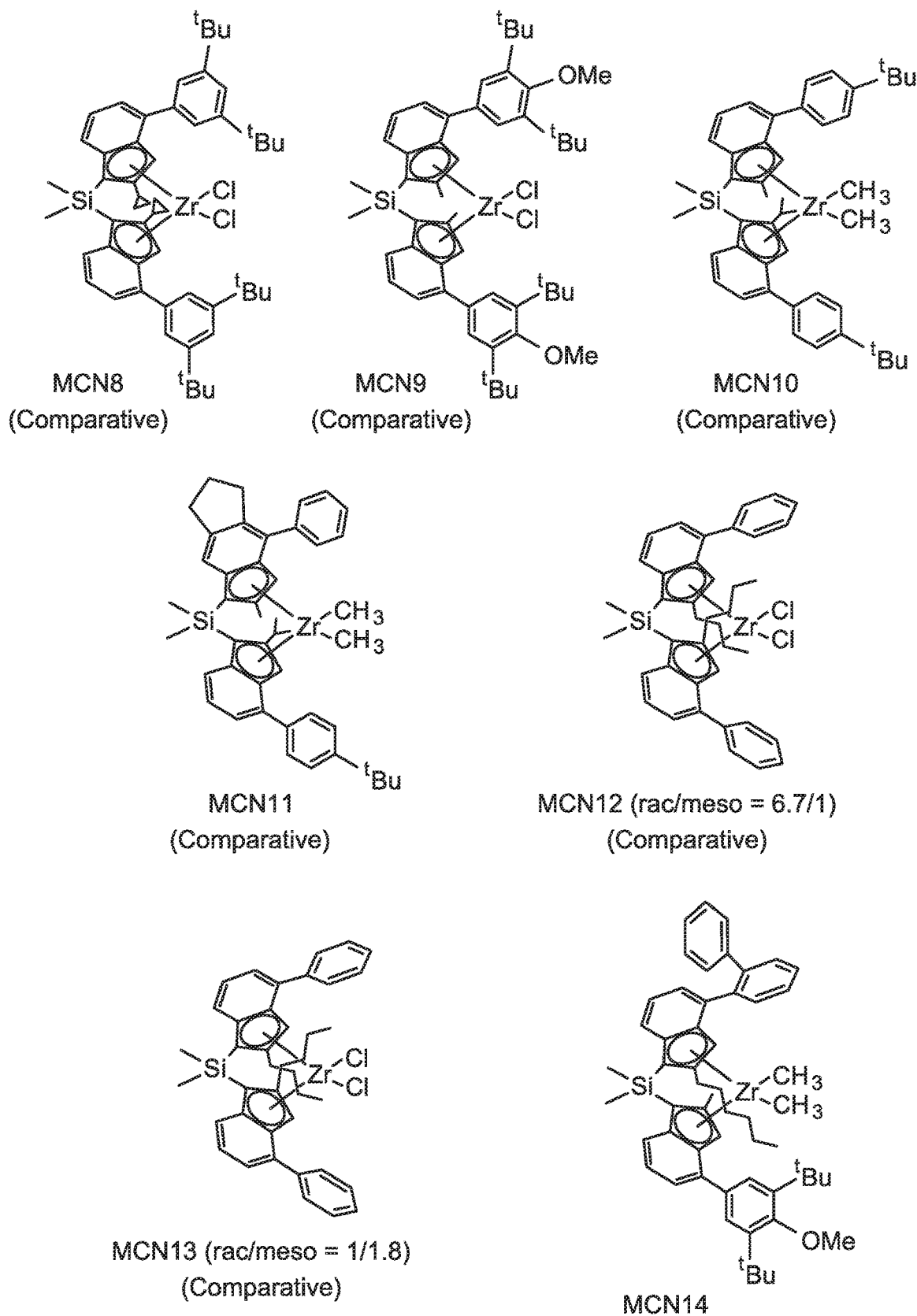

For the purposes of this invention and the claims thereto, the new numbering scheme for the Periodic Table Groups is used as described in CHEMICAL AND ENGINEERING NEWS, 63(5), p. 27 (1985). Therefore, a "Group 4 metal" is an element from Group 4 of the Periodic Table.

Unless otherwise indicated, "catalyst productivity" is a measure of how many grams of polymer (P) are produced using a polymerization catalyst comprising W g of catalyst (cat), over a period of time of T hours; and may be expressed by the following formula: P/(T x W) and expressed in units of gPgcat$^{-1}$ hr$^{-1}$. Unless otherwise indicated, "catalyst activity" is a measure of how active the catalyst is and is reported as the mass of product polymer (P) produced per mole of catalyst (cat) used (kgP/molcat). Unless otherwise indicated, "conversion" is the amount of monomer that is converted to polymer product, and is reported as mol % and is calculated based on the polymer yield and the amount of monomer fed into the reactor.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

For the purposes of this invention, ethylene shall be considered an α-olefin.

For purposes of this invention and claims thereto, the term "substituted" means that a hydrogen group has been replaced with a heteroatom, or a heteroatom containing group. For example, a "substituted hydrocarbyl" is a radical made of carbon and hydrogen where at least one hydrogen is replaced by a heteroatom or heteroatom containing group.

Unless otherwise indicated, room temperature is 23° C.

"Different" or "not the same" as used to refer to R groups in any formula herein (e.g., $R^2$ and $R^8$ or $R^4$ and $R^{10}$) or any substituent herein indicates that the groups or substituents differ from each other by at least one atom or are different isomerically.

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are reported in units of g/mol. The following abbreviations may be used herein: Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bn is benzyl, MAO is methylalumoxane.

A "catalyst system" is combination of at least one catalyst compound, at least one activator, an optional co-activator, and an optional support material. For the purposes of this invention and the claims thereto, when catalyst systems are described as comprising neutral stable forms of the components, it is well understood by one of ordinary skill in the art, that the ionic form of the component is the form that reacts with the monomers to produce polymers.

In the description herein, the metallocene catalyst may be described as a catalyst precursor, a pre-catalyst compound, metallocene catalyst compound or a transition metal compound, and these terms are used interchangeably. An "anionic ligand" is a negatively charged ligand which donates one or more pairs of electrons to a metal ion.

A metallocene catalyst is defined as an organometallic compound with at least one π-bound cyclopentadienyl moiety (or substituted cyclopentadienyl moiety) and more frequently two π-bound cyclopentadienyl moieties or substituted cyclopentadienyl moieties bonded to a transition metal.

For purposes of this invention and claims thereto in relation to metallocene catalyst compounds, the term "substituted" means that a hydrogen group has been replaced with a hydrocarbyl group, a heteroatom, or a heteroatom containing group. For example, methyl cyclopentadiene (Cp) is a Cp group substituted with a methyl group.

For purposes of this invention and claims thereto, "alkoxides" include those where the alkyl group is a $C_1$ to $C_{10}$ hydrocarbyl. The alkyl group may be straight chain, branched, or cyclic. The alkyl group may be saturated or unsaturated. In some embodiments, the alkyl group may comprise at least one aromatic group.

"Asymmetric" as used in connection with the instant indenyl compounds means that the substitutions at the 4 positions are different, or the substitutions at the 2 positions are different, or the substitutions at the 4 positions are different and the substitutions at the 2 positions are different.

Metallocene Catalyst Compounds

The invention relates to a metallocene catalyst compound represented by the formula:

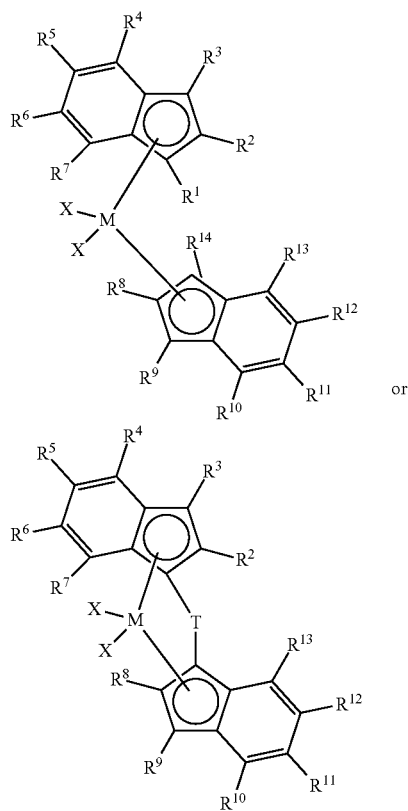

wherein, $R^2$ and $R^8$ are may be the same or different and each is, independently a $C_1$ to $C_{20}$ linear alkyl group, provided at at least one of $R^2$ and $R^8$ has at least 4 carbon atoms, preferably at least 6 carbon atoms, preferably $R^2$ and $R^8$ have no branches at the alpha or beta positions;

$R^4$ and $R^{10}$ are substituted or unsubstituted aryl groups (such as substituted or unsubstituted phenyl groups, preferably substituted phenyl groups), provided that at least one of the aryl groups is: 1) substituted at an othro position with at least one group selected from $C_1$ to $C_{40}$ hydrocarbyls, heteroatoms, and heteroatom containing groups and/or 2) substituted at the 3', 4' or 5' position with at least one group selected from $C_1$ to $C_{40}$ hydrocarbyls, heteroatoms, and heteroatom containing groups;

M is a group 2, 3 or 4 transition metal, preferably group 4 transition metal;

T is a bridging group;

each X is an anionic leaving group;

each $R^1$, $R^3$, $R^5$, $R^6$, $R^7$, $R^9$, $R^{11}$, $R^{12}$, $R^{13}$, and $R^{14}$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents.

In any embodiment described herein, $R^2$ may be a linear $C_1$-$C_{10}$ alkyl group, such as methyl, ethyl, n-propyl, n-butyl, n-pentyl, n-hexyl, n-heptyl, n-octyl, n-nonyl or n-decyl) which may be halogenated, preferably with I, F, Cl or Br.

In any embodiment described herein, $R^8$ is a linear $C_1$-$C_{10}$ alkyl group, preferably methyl, ethyl, n-propyl, n-butyl, n-pentyl, n-hexyl, n-heptyl, n-octyl, n-nonyl or n-decyl) which may be halogenated, preferably with I, F, Cl or Br.

In some embodiments of the invention, $R^2$ and $R^8$ are the same linear alkyl group, such as n-butyl, n-hexyl, etc.

In alternate embodiments, $R^2$ and $R^8$ are different, such as $R^2$ is methyl and $R^8$ is n-butyl, n-pentyl, n-hexyl, n-heptyl, or n-octyl.

By "substituted phenyl group" is meant a phenyl is substituted with 1, 2, 3, 4, or 5 $C_1$ to $C_{20}$ substituted or unsubstituted hydrocarbyl groups, such as methyl, ethyl, propyl, butyl, pentyl, hexyl, heptyl, octyl, nonyl, decyl, undecyl, dodecyl, phenyl, substituted phenyl, biphenyl or an isomer thereof. In useful embodiments, the phenyl group is substituted at the meta or para positions, preferably the 3' and/or 5' positions, preferably with C4 to C12 alkyl groups. Alternately the phenyl group may be substituted at the 2' position, but is preferably not substituted in the 2' and 6' positions, e.g., in a preferred embodiment of the invention when the 2' position of the phenyl is substituted, the 6' position is H). Alternately, the phenyl group may be substituted at the 4' position, with a group of the formula $(XR'_n)^-$, wherein X is a Group 14, 15, 16, or 17 heteroatom and R' is one of a hydrogen atom, halogen atom, a $C_1$-$C_{10}$ alkyl group, or a $C_6$-$C_{10}$ aryl group and n is 0, 1, 2, or 3; preferably —$NR'_2$, —SR', —OR', —$OSiR'_3$, —$SiR'_3$, or —$PR'_2$; and optionally, one or more of the remaining positions on the phenyl are substituted, such as the 2', 3' and or 5' positions.

In another aspect the 4' position on the aryl group is not a C4 group, alternately is not a hydrocarbyl group.

In another aspect, $R^4$ and $R^{10}$ are independently substituted phenyl groups, preferably phenyl groups substituted with $C_1$ to a $C_{10}$ alkyl groups (such as t-butyl, sec-butyl, n-butyl, isopropyl, n-propyl, cyclopropyl, cyclobutyl, cyclopentyl, cyclohexyl, cycloheptyl, cyclooctyl, phenyl, mesityl, or adamantyl), or an aryl group which may be further substituted with an aryl group, and the two aryl groups bound together can be joined together directly or by linker groups, wherein the linker group is an alkyl, vinyl, phenyl, alkynyl, silyl, germyl, amine, ammonium, phosphine, phosphonium, ether, thioether, borane, borate, alane or aluminate groups.

In another aspect, at least one of $R^4$ and $R^{10}$ is (or optionally, both are) a phenyl group substituted at the 3' and 5' position.

In another aspect, at least one of $R^4$ and $R^{10}$ is (or optionally, both are) a phenyl group substituted at the 2' position with an alkyl or an aryl group, such as a phenyl group.

In another aspect, at least one of $R^4$ and $R^{10}$ is (or optionally, both are) a phenyl group substituted at the 3' and 5' position and at least one of $R^4$ and $R^{10}$ is a phenyl group substituted at the 2' position with an alkyl group or an aryl group, such as a phenyl group.

In yet another aspect, at least one of $R^4$ and $R^{10}$ is (or optionally, both are) a phenyl group substituted at the 3' and 5' positions with $C_1$ to a $C_{10}$ alkyl groups, such as a tertiary butyl group.

In yet another aspect, at least one of $R^4$ and $R^{10}$ is a phenyl group substituted at the 3' and 5' positions with $C_1$ to a $C_{10}$ alkyl groups, such as a tertiary butyl group and at least one of $R^4$ and $R^{10}$ is a phenyl group substituted at the 2' position with an alkyl or an aryl group, such as a phenyl group.

In yet another aspect, at least one of $R^4$ and $R^{10}$ is a phenyl group substituted at the 3' and 5' positions with $C_1$ to a $C_{10}$ alkyl groups, such as a tertiary butyl group and at the 4' position with $(XR'_n)^-$, wherein X is a Group 14, 15, 16 or 17 heteroatom having an atomic weight of 13 to 79, R' is one of a hydrogen atom, halogen atom, a $C_1$-$C_{10}$ alkyl group, or a $C_6$-$C_{10}$ aryl group, and n is 0, 1, 2, or 3, such as methoxy, and at least one of $R^4$ and $R^{10}$ is a phenyl group substituted at the 2' position with an alkyl or an aryl group, such as a phenyl group.

In yet another aspect, both $R^4$ and $R^{10}$ are a phenyl group substituted at the 3' and 5' positions with $C_1$ to a $C_{10}$ alkyl groups, such as a tertiary butyl group.

In still another aspect, at least one of $R^4$ and $R^{10}$ is a phenyl group substituted at the 3' and 5' positions with aryl groups, such as substituted or unsubstituted phenyl groups.

In still another aspect, both $R^4$ and $R^{10}$ are a phenyl group substituted at the 3' and 5' positions with aryl groups, such as substituted or unsubstituted phenyl groups.

In another aspect, at least one of $R^4$ and $R^{10}$ is an aryl group substituted at 3' and 5' positions with $C_1$ to a $C_{10}$ alkyl groups (such as t-butyl, sec-butyl, n-butyl, isopropyl, n-propyl, cyclopropyl, cyclobutyl, cyclopentyl, cyclohexyl, cycloheptyl, cyclooctyl, phenyl, mesityl, or adamantyl) or aryl groups and combinations thereof, wherein, when $R^4$ or $R^{10}$ is a phenyl group which is further substituted with an aryl group, the two groups bound together can be joined together directly or by linker groups, wherein the linker group is an alkyl, vinyl, phenyl, alkynyl, silyl, germyl, amine, ammonium, phosphine, phosphonium, ether, thioether, borane, borate, alane or aluminate groups.

Alternately, when at least one of $R^4$ and $R^{10}$ is a phenyl group substituted at 3' and 5' positions, the phenyl group may also be substituted at the 4' position, preferably with a substituent is selected from $(XR'_n)^-$, wherein X is a Group 14, 15, 16 or 17 heteroatom having an atomic weight of 13 to 79 (preferably N, O, S, P, or Si) and R' is one of a hydrogen atom, halogen atom, a $C_1$-$C_{10}$ alkyl group (such as methyl, ethyl, propyl, butyl, pentyl, hexyl, octyl, nonyl, decyl or an isomer thereof), or a $C_6$-$C_{10}$ aryl group and n is 0, 1, 2, or 3; preferably $(XR'_n)^-$ is —$NR'_2$, —SR', —OR', —$OSiR'_3$, —$SiR'_3$, or —$PR'_2$, preferably $(XR')^-$ is —$NR'_2$, —SR', —OR', —$OSiR'_3$, or —$PR'_2$, preferably $(XR')^-$ is —SR', —OR', or —$OSiR'_3$, preferably $(XR')^-$ is —$NR'_2$ or —$PR'_2$, or preferably $(XR')^-$ is —OR' m preferably where R' is a $C_1$-$C_{10}$ alkyl group, particularly a methoxy, ethoxy, n-propoxy, isopropoxy, n-butoxy, iso-butoxy, sec-butoxy, or t-butoxy group, most particularly methoxy.

In yet another aspect, M is Hf, Ti and/or Zr, particularly Hf and/or Zr, particularly Zr.

Suitable radicals for the each of the groups $R^1$, $R^3$, $R^5$, $R^6$, $R^7$, $R^9$, $R^{11}$, $R^{12}$, $R^{13}$, and $R^{14}$ are independently selected from hydrogen or hydrocarbyl radicals including methyl, ethyl, ethenyl, and all isomers (including cyclics such as cyclohexyl) of propyl, butyl, pentyl, hexyl, heptyl, octyl, nonyl, decyl, undecyl, dodecyl, propenyl, butenyl, and from halocarbyls and all isomers of halocarbyls including perfluoropropyl, perfluorobutyl, perfluoroethyl, perfluoromethyl, and from substituted hydrocarbyl radicals and all isomers of substituted hydrocarbyl radicals including trimethylsilylpropyl, trimethylsilylmethyl, trimethylsilylethyl, and from phenyl, and all isomers of hydrocarbyl substituted phenyl including methylphenyl, dimethylphenyl, trimethylphenyl, tetramethylphenyl, pentamethylphenyl, diethylphenyl, triethylphenyl, propylphenyl, dipropylphenyl, tripropylphenyl, dimethylethylphenyl, dimethylpropylphenyl, dimethylbutylphenyl, dipropylmethylphenyl, and the like; from all isomers of halo substituted phenyl (where halo is, independently, fluoro, chloro, bromo and iodo) including halophenyl, dihalophenyl, trihalophenyl, tetrahalophenyl, and pentahalophenyl; and from all isomers of halo substituted hydrocarbyl substituted phenyl (where halo is, independently, fluoro, chloro, bromo and iodo) including halomethylphenyl, dihalomethylphenyl, (trifluoromethyl)phenyl, bis(triflouromethyl)phenyl; and from all isomers of benzyl, and all isomers of hydrocarbyl substituted benzyl including methylbenzyl, dimethylbenzyl.

In other embodiments of the invention, each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system).

Suitable examples for X include chloride, bromide, fluoride, iodide, hydride, and $C_1$ to $C_{20}$ hydrocarbyls, preferably methyl, ethyl, propyl, butyl, pentyl, hexyl, phenyl, benzyl, and all isomers thereof, or two X together are selected from $C_4$ to $C_{10}$ dienes, preferably butadiene, methylbutadiene, pentadiene, methylpentadiene, dimethylpentadiene, hexadiene, methylhexadiene, dimethylhexadiene, or from $C_1$ to $C_{10}$ alkylidenes, preferably methylidene, ethylidene, propylidene, or from $C_3$ to $C_{10}$ alkyldiyls, preferably propandiyl, butandiyl, pentandiyl, and hexandiyl. In particular, X is chloride or methyl.

In any embodiment, T is a bridging group selected from $R'_2C$, $R'_2Si$, $R'_2Ge$, $R'_2CCR'_2$, $R'_2CCR'_2CR'_2$, $R'C=CR'$, $R'C=CR'CR'_2$, $R'_2CSiR'_2$, $R'_2SiSiR'_2$, $R'_2CSiR'_2CR'_2$, $R'_2SiCR'_2SiR'_2$, $R'C=CR'SiR'$, $R'_2CGeR'_2$, $R'_2GeGeR'_2$, $R'_2CGeR'_2CR'_2$, $R'_2GeCR'_2GeR'_2$, $R'_2SiGeR'_2$, $R'C=CR'GeR'_2$, R'B, $R'_2C$—BR', $R'_2C$—BR'—$CR'_2$, R'N, $R'_2C$—NR', $R'_2C$—NR'—$CR'_2$, R'P, $R'_2C$—PR', and $R'_2C$—PR'—$CR'_2$ where R' is, independently, hydrogen, hydrocarbyl, substituted hydrocarbyl, halocarbyl, substituted halocarbyl, silylcarbyl, or germylcarbyl, and two or more R' on the same atom or on adjacent atoms may join together to form a substituted or unsubstituted, saturated, partially unsaturated, or aromatic cyclic or polycyclic substituent.

Suitable examples for the bridging group T include dihydrocarbylsilylenes including dimethylsilylene, diethylsilylene, dipropylsilylene, dibutylsilylene, dipentylsilylene, dihexylsilylene, methylphenylsilylene, diphenylsilylene, dicyclohexylsilylene, methylcyclohexylsilylene, dibenzylsilylene, tetramethyldisilylene, cyclotrimethylenesilylene, cyclotetramethylenesilylene, cyclopentamethylenesilylene, divinylsilylene, and tetramethyldisiloxylene; dihydrocarbylgermylenes including dimethylgermylene, diethylgermylene, dipropylgermylene, dibutylgermylene, methylphenylgermylene, diphenylgermylene, dicyclohexylgermylene, methylcyclohexylgermylene, cyclotrimethylenegermylene, cyclotetramethylenegermylene, and cyclopentamethylenegermylene; carbylenes and carbdiyls including methylene, dimethylmethylene, diethylmethylene, dibutylmethylene, dipropylmethylene, diphenylmethylene, ditolylmethylene, di(butylphenyl)methylene, di(trimethylsilylphenyl)methylene, dibenzylmethylene, cyclotetramethylenemethylene, cyclopentamethylenemethylene, ethylene, methylethylene, dimethylethylene, trimethylethylene, tetramethylethylene, cyclopropylene, cyclobutylene, cyclopentylene, cyclohexylene, propanediyl, methylpropanediyl, dimethylpropanediyl, trimethylpropanediyl, tetramethylpropanediyl, pentamethylpropanediyl, hexamethylpropanediyl, vinylene, and ethene-1,1-diyl; boranediyls including methylboranediyl, ethylboranediyl, propylboranediyl, butylboranediyl, pentylboranediyl, hexylboranediyl, cyclohexylboranediyl, and phenylboranediyl; and combinations thereof including dimethylsilylmethylene, diphenylsilylmethylene, dimethylsilylethylene, methylphenylsilylmethylene.

In particular, T is $CH_2$, $CH_2CH_2$, $C(CH_3)_2$, $SiMe_2$, $SiPh_2$, $SiMePh$, $Si(CH_2)_3$, $Si(CH_2)_4$, $Si(Me_3SiPh)_2$, or $Si(CH_2)_5$.

In another embodiment, T is represented by the formula $R_2{}^a J$, where J is C, Si, or Ge, and each $R^a$ is, independently, hydrogen, halogen, $C_1$ to $C_{20}$ hydrocarbyl or a $C_1$ to $C_{20}$ substituted hydrocarbyl, and two $R^a$ can form a cyclic structure including aromatic, partially saturated, or saturated cyclic or fused ring system.

In a preferred embodiment of the invention in any formula described herein, T is represented by the formula, $(R^*_2 G)_g$, where each G is C, Si, or Ge, g is 1 or 2, and each $R^*$ is, independently, hydrogen, halogen, C1 to C20 hydrocarbyl or a C1 to C20 substituted hydrocarbyl, and two or more $R^*$ can form a cyclic structure including aromatic, partially saturated, or saturated cyclic or fused ring system.

In aspects of the invention, the rac/meso ratio of the metallocene catalyst is 50:1 or greater, or 40:1 or greater, or 30:1 or greater, or 20:1 or greater, or 15:1 or greater, or 10:1 or greater, or 7:1 or greater, or 5:1 or greater.

In an embodiment of the invention, the metallocene catalyst comprises greater than 55 mol % of the racemic isomer, or greater than 60 mol % of the racemic isomer, or greater than 65 mol % of the racemic isomer, or greater than 70 mol % of the racemic isomer, or greater than 75 mol % of the racemic isomer, or greater than 80 mol % of the racemic isomer, or greater than 85 mol % of the racemic isomer, or greater than 90 mol % of the racemic isomer, or greater than 92 mol % of the racemic isomer, or greater than 95 mol % of the racemic isomer, or greater than 98 mol % of the racemic isomer, based on the total amount of the racemic and meso isomer-if any, formed. In a particular embodiment of the invention, the metallocene, especially the bridged bis(indenyl)metallocene, compound consists essentially of the racemic isomer.

Amounts of rac and meso isomers are determined by proton NMR. $^1H$ NMR data are collected at 23° C. in a 5 mm probe using a 400 MHz Bruker spectrometer with deuterated methylene chloride or deuterated benzene. Data is recorded using a maximum pulse width of 45°, 8 seconds between pulses and signal averaging 16 transients. The spectrum is normalized to protonated methylene chloride in the deuterated methylene chloride, which is expected to show a peak at 5.32 ppm.

In a preferred embodiment in any of the processes described herein one catalyst compound is used, e.g., the catalyst compounds are not different. For purposes of this invention one metallocene catalyst compound is considered different from another if they differ by at least one atom. For example, "bisindenyl zirconium dichloride" is different from (indenyl)(2-methylindenyl) zirconium dichloride" which is different from "(indenyl)(2-methylindenyl) hafnium dichloride." Catalyst compounds that differ only by isomer are considered the same for purposes if this invention, e.g., rac-dimethylsilylbis(2-methyl 4-phenyl)hafnium dimethyl is considered to be the same as meso-dimethylsilylbis(2-methyl 4-phenyl)hafnium dimethyl.

In some embodiments, two or more different catalyst compounds are present in the catalyst system used herein. In some embodiments, two or more different catalyst compounds are present in the reaction zone where the process(es) described herein occur. When two transition metal compound based catalysts are used in one reactor as a mixed catalyst system, the two transition metal compounds should be chosen such that the two are compatible. A simple screening method such as by $^1H$ or $^{13}C$ NMR, known to those of ordinary skill in the art, can be used to determine which transition metal compounds are compatible. It is preferable to use the same activator for the transition metal compounds, however, two different activators, such as a non-coordinating anion activator and an alumoxane, can be used in combination. If one or more transition metal compounds contain an $X_1$ or $X_2$ ligand which is not a hydride, hydrocarbyl, or substituted hydrocarbyl, then the alumoxane is typically contacted with the transition metal compounds prior to addition of the non-coordinating anion activator.

The transition metal compounds (pre-catalysts) may be used in any ratio. Preferred molar ratios of (A) transition metal compound to (B) transition metal compound fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact pre-catalysts chosen, the method of activation, and the end product desired. In a particular embodiment, when using the two pre-catalysts, where both are activated with the same activator, useful mole percents, based upon the molecular weight of the pre-catalysts, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

Methods to Prepare the Catalyst Compounds

Figure 13:
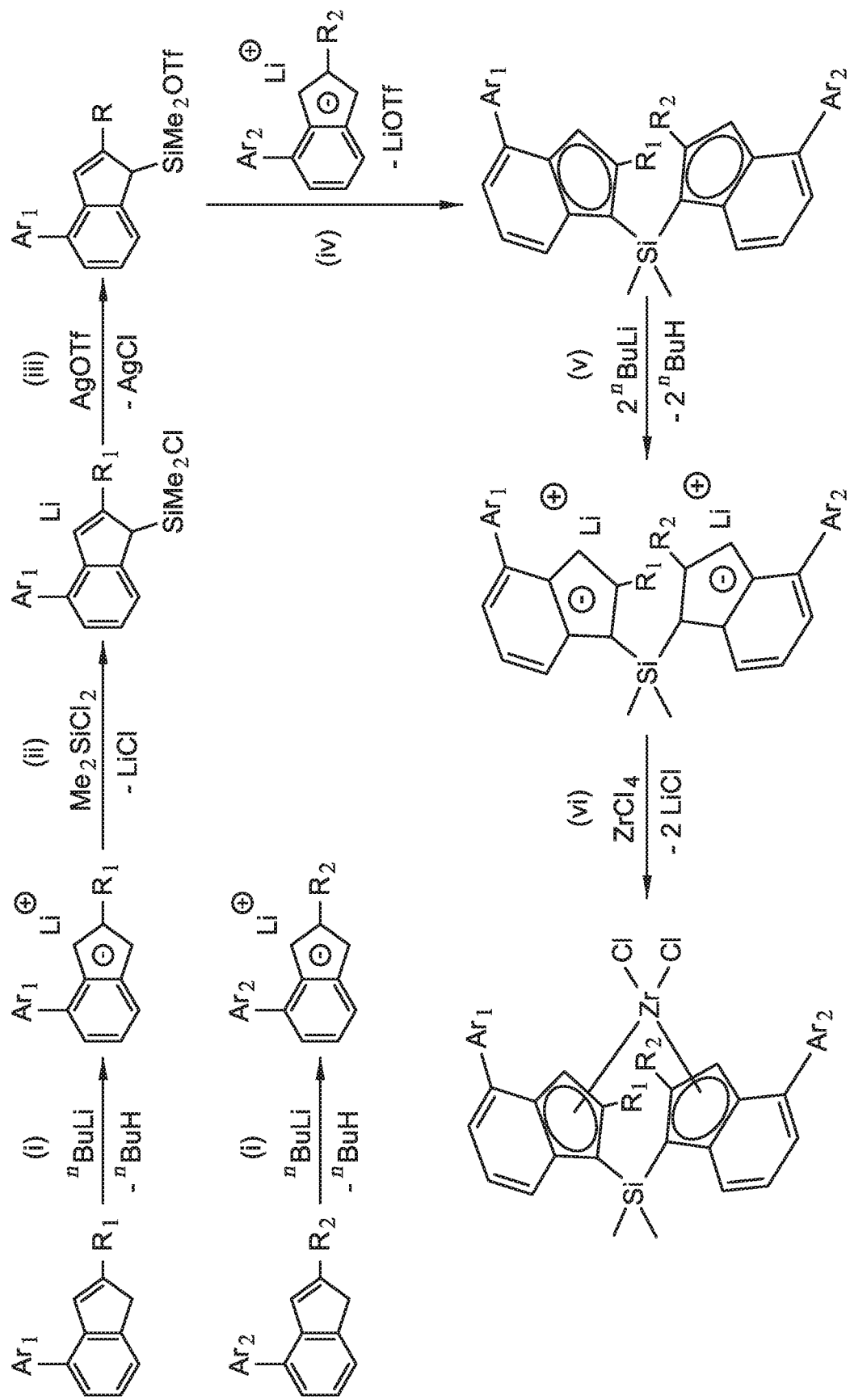
FIG. 13 is a reaction scheme for synthesis of metallocenes.

Generally, metallocenes of this type are synthesized as shown in FIG. 13 where (i) is a deprotonation via a metal salt of alkyl anion (e.g., "BuLi) to form an indenide. (ii) reaction of indenide with an appropriate bridging precursor (e.g., $Me_2SiCl_2$). (iii) reaction of the above product with AgOTf. (iv) reaction of the above triflate compound with another equivalent of indenide. (v) double deprotonation via an alkyl anion (e.g. "BuLi) to form a dianion (vi) reaction of the dianion with a metal halide (e.g., $ZrCl_4$). The final products are obtained by recrystallization of the crude solids where $Ar_1$ and $Ar_2$ are as defined for $R^4$ and $R^{10}$, and $R_1$ and $R_2$ are defined for $R^2$ and $R^8$.

Catalyst compounds useful herein include: $Me_2Si(4-oPh_2-2-nC_6-Ind)(2-Me-4-(3',5'-tBu_2-4'-OMe-Ph)-Ind)ZrCl_2$; $Me_2Si(4-oPh_2-2-nBu-Ind)(2-Me-4-(3',5'-tBu_2-4'-OMe-Ph)-Ind)ZrCl_2$; $Me_2Si(4-oPh_2-2-nC_5-Ind)(2-Me-4-(3',5'-tBu_2-4'-OMe-Ph)-Ind)ZrCl_2$; $Me_2Si(4-oPh_2-2-nC_7-Ind)(2-Me-4-(3',5'-tBu_2-4'-OMe-Ph)-Ind)ZrCl_2$; $Me_2Si(4-oPh_2-2-nC_8-Ind)(2-Me-4-(3',5'-tBu_2-4'-OMe-Ph)-Ind)ZrCl_2$; $Me_2Si(4-oPh_2-2-nC_9-Ind)(2-Me-4-(3',5'-tBu_2-4'-OMe-Ph)-Ind)ZrCl_2$; $Me_2Si(4-oPh_2-2-nC_{10}-Ind)(2-Me-4-(3',5'-tBu_2-4'-OMe-Ph)-Ind)ZrCl_2$; $Me_2Si(4-oPh_2-2-nC_6-Ind)(2-Me-4-(3',5'-tBu_2Ph)-Ind)ZrCl_2$; $Me_2Si(4-oPh_2-2-nBu-Ind)(2-Me-4-(3',5'-tBu_2Ph)-Ind)ZrCl_2$; $Me_2Si(4-oPh_2-2-nC_5-Ind)(2-Me-4-(3',5'-tBu_2Ph)-Ind)ZrCl_2$; $Me_2Si(4-oPh_2-2-nC_7-Ind)(2-Me-4-(3',5'-tBu_2Ph)-Ind)ZrCl_2$; $Me_2Si(4-oPh_2-2-nC_8-Ind)(2-Me-4-(3',5'-tBu_2Ph)-Ind)ZrCl_2$; $Me_2Si(4-oPh_2-2-nC_9-Ind)(2-Me-4-(3',5'-tBu_2Ph)-Ind)ZrCl_2$; $Me_2Si(4-oPh_2-2-nC_{10}-Ind)(2-Me-4-(3',5'-tBu_2Ph)-Ind)ZrCl_2$; $Me_2Si(4-oPh_2-2-nC_6-Ind)(2-Me-4-(3',5'-tBu_2-4'-OMe-Ph)-Ind)ZrCl_2$; $Me_2Si(4-oPh_2-2-nBu-Ind)(2-Me-4-(3',5'-tBu_2-4'-OMe-Ph)-Ind)ZrCl_2$; $Me_2Si(4-oPh_2-2-nC_5-Ind)(2-Me-4-(3'1,5'-tBu_2-4'-OMe-Ph)-Ind)ZrCl_2$; $Me_2Si(4-oPh_2-2-nC_7-Ind)(2-Me-4-(3',5'-tBu_2-4'-OMe-Ph)-Ind)ZrCl_2$; $Ph_2Si(4-oPh_2-2-nC_8-Ind)(2-Me-4-(3',5'-tBu_2-4'-OMe-Ph)-Ind)ZrCl_2$; $Me_2Si(4-oPh_2-2-nC_9-Ind)(2-Me-4-(3',5'-tBu_2-4'-OMe-Ph)-Ind)ZrCl_2$; $Me_2Si(4-oPh_2-2-nC_{10}-Ind)(2-Me-4-(3',5'-tBu_2-4'-OMe-Ph)-Ind)ZrCl_2$; $Me_2Si(4-oPh_2-2-nC_6-$ Ind)(2-Me-4-(3',5'-tBu$_2$Ph)-Ind)ZrCl$_2$; Me$_2$Si(4-oPh$_2$-2-nBu-Ind)(2-Me-4-(3',5'-tBu$_2$Ph)-Ind)ZrCl$_2$; Me$_2$Si(4-oPh$_2$-2-nC$_5$-Ind)(2-Me-4-(3',5'-tBu$_2$Ph)-Ind)ZrCl$_2$; Me$_2$Si(4-oPh$_2$-2-nC$_7$-Ind)(2-Me-4-(3',5'-tBu$_2$Ph)-Ind)ZrCl$_2$; Me$_2$Si(4-oPh$_2$-2-nC$_8$-Ind)(2-Me-4-(3',5'-tBu$_2$Ph)-Ind)ZrCl$_2$; Me$_2$Si(4-oPh$_2$-2-nC$_9$-Ind)(2-Me-4-(3',5'-tBu$_2$Ph)-Ind)ZrCl$_2$; Me$_2$Si(4-oPh$_2$-2-nC$_{10}$-Ind)(2-Me-4-(3',5'-tBu$_2$Ph)-Ind)ZrCl$_2$; Me$_2$Si(4-oPh$_2$-2-nC$_6$-Ind)(2-Et-4-(3',5'-tBu$_2$-4'-OMe-Ph)-Ind)ZrCl$_2$; Me$_2$Si(4-oPh$_2$-2-nBu-Ind)(2-Et-4-(3,5'-tBu$_2$-4'-OMe-Ph)-Ind)ZrCl$_2$; Me$_2$Si(4-oPh$_2$-2-nC$_5$-Ind)(2-Et-4-(3',5'-tBu$_2$-4'-OMe-Ph)-Ind)ZrCl$_2$; Me$_2$Si(4-oPh$_2$-2-nC$_7$-Ind)(2-Et-4-(3',5'-tBu$_2$-4'-OMe-Ph)-Ind)ZrCl$_2$; Me$_2$Si(4-oPh$_2$-2-nC$_8$-Ind)(2-Et-4-(3',5'-tBu$_2$-4'-OMe-Ph)-Ind)ZrCl$_2$; Me$_2$Si(4-oPh$_2$-2-nC$_9$-Ind)(2-Et-4-(3',5'-tBu$_2$-4'-OMe-Ph)-Ind)ZrCl$_2$; Me$_2$Si(4-oPh$_2$-2-nC$_{10}$-Ind)(2-Et-4-(3',5'-tBu$_2$-4'-OMe-Ph)-Ind)ZrCl$_2$; Me$_2$Si(4-oPh$_2$-2-nC$_6$-Ind)(2-Et-4-(3',5'-tBu$_2$Ph)-Ind)ZrCl$_2$; Me$_2$Si(4-oPh$_2$-2-nBu-Ind)(2-Et-4-(3',5'-tBu$_2$Ph)-Ind)ZrCl$_2$; Me$_2$Si(4-oPh$_2$-2-nC$_5$-Ind)(2-Et-4-(3',5'-tBu$_2$Ph)-Ind)ZrCl$_2$; Me$_2$Si(4-oPh$_2$-2-nC$_7$-Ind)(2-Et-4-(3',5'-tBu$_2$Ph)-Ind)ZrCl$_2$; Me$_2$Si(4-oPh$_2$-2-nC$_8$-Ind)(2-Et-4-(3',5'-tBu$_2$Ph)-Ind)ZrCl$_2$; Me$_2$Si(4-oPh$_2$-2-nC$_9$-Ind)(2-Et-4-(3',5-tBu$_2$Ph)-Ind)ZrCl$_2$; Me$_2$Si(4-oPh$_2$-2-nC$_{10}$-Ind)(2-Et-4-(3',5'-tBu$_2$Ph)-Ind)ZrCl$_2$; Me$_2$Si(4-oPh$_2$-2-nC$_6$-Ind)(2-Et-4-(3',5'-tBu$_2$-4'-OMe-Ph)-Ind)ZrCl$_2$; Me$_2$Si(4-oPh$_2$-2-nBu-Ind)(2-Et-4-(3',5'-tBu$_2$-4'-OMe-Ph)-Ind)ZrCl$_2$; Me$_2$Si(4-oPh$_2$-2-nC$_5$-Ind)(2-Et-4-(3',5'-tBu$_2$-4'-OMe-Ph)-Ind)ZrCl$_2$; Me$_2$Si(4-oPh$_2$-2-nC$_7$-Ind)(2-Et-4-(3',5'-tBu$_2$-4'-OMe-Ph)-Ind)ZrCl$_2$; Me$_2$Si(4-oPh$_2$-2-nC$_8$-Ind)(2-Et-4-(3',5'-tBu$_2$-4'-OMe-Ph)-Ind)ZrCl$_2$; Me$_2$Si(4-oPh$_2$-2-nC$_9$-Ind)(2-Et-4-(3',5'-tBu$_2$-4'-OMe-Ph)-Ind)ZrCl$_2$; Me$_2$Si(4-oPh$_2$-2-nC$_{10}$-Ind)(2-Et-4-(3,5'-tBu$_2$-4'-OMe-Ph)-Ind)ZrCl$_2$; Me$_2$Si(4-oPh$_2$-2-nC$_6$-Ind)(2-Et-4-(3',5'-tBu$_2$Ph)-Ind)ZrCl$_2$; Me$_2$Si(4-oPh$_2$-2-nBu-Ind)(2-Et-4-(3',5'-tBu$_2$Ph)-Ind)ZrCl$_2$; Me$_2$Si(4-oPh$_2$-2-nC$_5$-Ind)(2-Et-4-(3',5'-tBu$_2$Ph)-Ind)ZrCl$_2$; Me$_2$Si(4-oPh$_2$-2-nC$_7$-Ind)(2-Et-4-(3,5'-tBu$_2$Ph)-Ind)ZrCl$_2$; Me$_2$Si(4-oPh$_2$-2-nC$_8$-Ind)(2-Et-4-(3,5'-tBu$_2$Ph)-Ind)ZrCl$_2$; Me$_2$Si(4-oPh$_2$-2-nC$_9$-Ind)(2-Et-4-(3',5'-tBu$_2$Ph)-Ind)ZrCl$_2$; Me$_2$Si(4-oPh$_2$-2-nC$_{10}$-Ind)(2-Et-4-(3',5'-tBu$_2$Ph)-Ind)ZrCl$_2$; Me$_2$Si(4-oPh$_2$-2-nC$_6$-Ind)(2-nPr-4-(3',5'-tBu$_2$-4'-OMe-Ph)-Ind)ZrCl$_2$; Me$_2$Si(4-oPh$_2$-2-nBu-Ind)(2-nPr-4-(3',5'-tBu$_2$-4'-OMe-Ph)-Ind)ZrCl$_2$; Me$_2$Si(4-oPh$_2$-2-nC$_5$-Ind)(2-Et-4-(3,5'-tBu$_2$-4'-OMe-Ph)-Ind)ZrCl$_2$; Me$_2$Si(4-oPh$_2$-2-nC$_7$-Ind)(2-Et-4-(3',5'-tBu$_2$-4'-OMe-Ph)-Ind)ZrCl$_2$; Me$_2$Si(4-oPh$_2$-2-nC$_8$-Ind)(2-Et-4-(3',5'-tBu$_2$-4'-OMe-Ph)-Ind)ZrCl$_2$; Me$_2$Si(4-oPh$_2$-2-nC$_9$-Ind)(2-Et-4-(3',5'-tBu$_2$-4'-OMe-Ph)-Ind)ZrCl$_2$; Me$_2$Si(4-oPh$_2$-2-nC$_{10}$-Ind)(2-Et-4-(3',5'-tBu$_2$-4'-OMe-Ph)-Ind)ZrCl$_2$; Me$_2$Si(4-oPh$_2$-2-nC$_6$-Ind)(2-Et-4-(3',5'-tBu$_2$Ph)-Ind)ZrCl$_2$; Me$_2$Si(4-oPh$_2$-2-nBu-Ind)(2-Et-4-(3',5'-tBu$_2$Ph)-Ind)ZrCl$_2$; Me$_2$Si(4-oPh$_2$-2-nC$_5$-Ind)(2-Et-4-(3',5'-tBu$_2$Ph)-Ind)ZrCl$_2$; Me$_2$Si(4-oPh$_2$-2-nC$_7$-Ind)(2-Et-4-(3,5'-tBu$_2$Ph)-Ind)ZrCl$_2$; Me$_2$Si(4-oPh$_2$-2-nC$_8$-Ind)(2-Et-4-(3',5'-tBu$_2$Ph)-Ind)ZrCl$_2$; Me$_2$Si(4-oPh$_2$-2-nC$_9$-Ind)(2-Et-4-(3',5'-tBu$_2$Ph)-Ind)ZrCl$_2$; Me$_2$Si(4-oPh$_2$-2-nC$_{10}$-Ind)(2-Et-4-(3',5'-tBu$_2$Ph)-Ind)ZrCl$_2$; Me$_2$Si(4-oPh$_2$-2-nC$_6$-Ind)(2-Et-4-(3',5'-tBu$_2$-4'-OMe-Ph)-Ind)ZrCl$_2$; Me$_2$Si(4-oPh$_2$-2-nBu-Ind)(2-Et-4-(3',5'-tBu$_2$-4'-OMe-Ph)-Ind)ZrCl$_2$; Me$_2$Si(4-oPh$_2$-2-nC$_5$-Ind)(2-Et-4-(3',5'-tBu$_2$-4'-OMe-Ph)-Ind)ZrCl$_2$; Me$_2$Si(4-oPh$_2$-2-nC$_7$-Ind)(2-Et-4-(3',5'-tBu$_2$-4'-OMe-Ph)-Ind)ZrCl$_2$; Me$_2$Si(4-oPh$_2$-2-nC$_8$-Ind)(2-Et-4-(3',5'-tBu$_2$-4'-OMe-Ph)-Ind)ZrCl$_2$; Me$_2$Si(4-oPh$_2$-2-nC$_9$-Ind)(2-n-propyl-4-(3',5-tBu$_2$-4'-OMe-Ph)-Ind)ZrCl$_2$; Me$_2$Si(4-oPh$_2$-2-nC$_{10}$-Ind)(2-nC$_{3-4}$-(3',5'-tBu$_2$-4'-OMe-Ph)-Ind)ZrCl$_2$; Me$_2$Si(4-oPh$_2$-2-nC$_6$-Ind)(2-nC$_{3-4}$-(3',5'-tBu$_2$Ph)-Ind)ZrCl$_2$; Me$_2$Si(4-oPh$_2$-2-nBu-Ind)(2-nPr-4-(3',5'-tBu$_2$Ph)-Ind)ZrCl$_2$; Me$_2$Si(4-oPh$_2$-2-nC$_5$-Ind)(2-nPr-4-(3',5'-tBu$_2$Ph)-Ind)ZrCl$_2$; Me$_2$Si(4-oPh$_2$-2-nC$_7$-Ind)(2-n-propyl-4-(3',5'-tBu$_2$Ph)-Ind)ZrCl$_2$; Me$_2$Si(4-oPh$_2$-2-nC$_8$-Ind)(2-n-propyl-4-(3',5'-tBu$_2$Ph)-Ind)ZrCl$_2$; Me$_2$Si(4-oPh$_2$-2-nC$_9$-Ind)(2-nC$_{3-4}$-(3'1,5'-tBu$_2$Ph)-Ind)ZrCl$_2$; Me$_2$Si(4-oPh$_2$-2-nC$_{10}$-Ind)(2-n-propyl-4-(3',5'-tBu$_2$Ph)-Ind)ZrCl$_2$; Me$_2$Si(4-oPh$_2$-2-nC$_6$-Ind)$_2$ZrCl$_2$; Me$_2$Si(4-oPh$_2$-2-nC$_5$-Ind)$_2$ZrCl$_2$; Me$_2$Si(4-oPh$_2$-2-nBu-Ind)$_2$ZrCl$_2$; Me$_2$Si(4-oPh$_2$-2-nC$_7$-Ind)$_2$ZrCl$_2$; Me$_2$Si$_2$(4-oPh$_2$-2-nC$_8$-Ind)$_2$ZrCl$_2$; Me$_2$Si(4-oPh$_2$-2-nC$_9$-Ind)$_2$ZrCl$_2$; Me$_2$Si(4-oPh$_2$-2-nC$_{10}$-Ind)$_2$ZrCl$_2$; Me$_2$Si(2-nBu-4-(3',5'-tBu$_2$-4'-OMe-Ph)-Ind)$_2$ZrCl$_2$; Me$_2$Si(2-nC$_5$-4-(3',5'-tBu$_2$-4'-OMe-Ph)-Ind)$_2$ZrCl$_2$; Me$_2$Si$_2$(2-n-hexyl-4-(3',5'-tBu$_2$-4'-OMe-Ph)-Ind)$_2$ZrCl$_2$; Me$_2$Si(2-nC$_7$-4-(3',5'-tBu$_2$-4'-OMe-Ph)-Ind)$_2$ZrCl$_2$; Me$_2$Si(2-nC$_8$-4-(3',5'-tBu$_2$-4'-OMe-Ph)-Ind)$_2$ZrCl$_2$; Me$_2$Si(2-nC$_9$-4-(3',5'-tBu$_2$-4'-OMe-Ph)-Ind)$_2$ZrCl$_2$; Me$_2$Si(2-nC$_{10}$-4-(3',5'-tBu$_2$-4'-OMe-Ph)-Ind)$_2$ZrCl$_2$; Me$_2$Si(2-nBu-4-(3',5'-tBu$_2$Ph)-Ind)$_2$ZrCl$_2$; Me$_2$Si(2-nC$_5$-4-(3',5'-tBu$_2$Ph)-Ind)$_2$ZrCl$_2$; Me$_2$Si(2-n-hexyl-4-(3',5'-tBu$_2$Ph)-Ind)$_2$ZrCl$_2$; Me$_2$Si(2-nC$_7$-4-(3',5'-tBu$_2$Ph)-Ind)$_2$ZrCl$_2$; Me$_2$Si(2-nC$_8$-4-(3',5'-tBu$_2$Ph)-Ind)$_2$ZrCl$_2$; Me$_2$Si(2-nC$_9$-4-(3',5'-tBu$_2$Ph)-Ind)$_2$ZrCl$_2$; Me$_2$Si(2-nC$_{10}$-4-(3',5'-tBu$_2$Ph)-Ind)$_2$ZrCl$_2$; Me$_2$Si(2-Me-4-(3',5'-tBu$_2$-4'-OMe-Ph)-Ind)(2-nBu-4-(3',5'-tBu$_2$-4'-OMe-Ph)-Ind)ZrCl$_2$; Me$_2$Si(2-Me-4-(3',5'-tBu$_2$-4'-OMe-Ph)-Ind)(2-nC$_5$-4-(3',5'-tBu$_2$-4'-OMe-Ph)-Ind)ZrCl$_2$; Me$_2$Si(2-Me-4-(3',5'-tBu$_2$-4'-OMe-Ph)-Ind)(2-n-hexyl-4-(3',5'-tBu$_2$-4'-OMe-Ph)-Ind)ZrCl$_2$; Me$_2$Si(2-Me-4-(3',5'-tBu$_2$-4'-OMe-Ph)-Ind)(2-nC$_7$-4-(3',5'-tBu$_2$-4'-OMe-Ph)-Ind)ZrCl$_2$; Me$_2$Si(2-Me-4-(3',5'-tBu$_2$-4'-OMe-Ph)-Ind)(2-nC$_8$-4-(3',5'-tBu$_2$-4'-OMe-Ph)-Ind)ZrCl$_2$; Me$_2$Si(2-Me-4-(3',5'-tBu$_2$-4'-OMe-Ph)-Ind)(2-nC$_9$-4-(3',5'-tBu$_2$-4'-OMe-Ph)-Ind)ZrCl$_2$; Me$_2$Si(2-Me-4-(3',5'-tBu$_2$-4'-OMe-Ph)-Ind)(2-nC$_{10}$-4-(3',5'-tBu$_2$-4'-OMe-Ph)-Ind)ZrCl$_2$; Me$_2$Si(2-Me-4-(3',5'-tBu$_2$Ph)-Ind)(2-nBu-4-(3',5'-tBu$_2$Ph)-Ind)ZrCl$_2$; Me$_2$Si(2-Me-4-(3',5'-tBu$_2$Ph)-Ind)(2-nC$_5$-4-(3',5'-tBu$_2$Ph)-Ind)ZrCl$_2$; Me$_2$Si(2-Me-4-(3',5'-tBu$_2$Ph)-Ind)(2-n-hexyl-4-(3',5'-tBu$_2$Ph)-Ind)ZrCl$_2$; Me$_2$Si(2-Me-4-(3',5'-tBu$_2$Ph)-Ind)(2-nC$_7$-4-(3',5'-tBu$_2$Ph)-Ind)ZrCl$_2$; Me$_2$Si(2-Me-4-(3',5'-tBu$_2$Ph)-Ind)(2-nC$_8$-4-(3',5'-tBu$_2$Ph)-Ind)ZrCl$_2$; Me$_2$Si(2-Me-4-(3',5'-tBu$_2$Ph)-Ind)(2-nC$_9$-4-(3',5'-tBu$_2$Ph)-Ind)ZrCl$_2$; Me$_2$Si(2-Me-4-(3',5'-tBu$_2$Ph)-Ind)(2-nC$_{10}$-4-(3',5'-tBu$_2$Ph)-Ind)ZrCl$_2$; Me$_2$Si(4-oPh$_2$-2-Me-Ind)(4-oPh$_2$-2-nBu-Ind)ZrCl$_2$; Me$_2$Si(4-oPh$_2$-2-Me-Ind)(4-oPh$_2$-2-nC$_5$-Ind)ZrCl$_2$; Me$_2$Si(4-oPh$_2$-2-Me-Ind)(4-oPh$_2$-2-nC$_6$-Ind)ZrCl$_2$; Me$_2$Si(4-oPh$_2$-2-Me-Ind)(4-oPh-2-nC$_7$-Ind)ZrCl$_2$; Me$_2$Si(4-oPh$_2$-2-Me-Ind)(4-oPh$_2$-2-nC$_8$-Ind)ZrCl$_2$; Me$_2$Si(4-oPh$_2$-2-Me-Ind)(4-oPh$_2$-2-nC$_9$-Ind)ZrCl$_2$; Me$_2$Si(4-oPh$_2$-2-Me-Ind)(4-oPh$_2$-2-nC$_{10}$-Ind)ZrCl$_2$; Me$_2$Si(4-oPh$_2$-2-Et-Ind)(4-oPh$_2$-2-nBu-Ind)ZrCl$_2$; Me$_2$Si(4-oPh$_2$-2-Et-Ind)(4-oPh$_2$-2-nC$_5$-Ind)ZrCl$_2$; Me$_2$Si(4-oPh$_2$-2-Et-Ind)(4-oPh$_2$-2-nC$_6$-Ind)ZrCl$_2$; Me$_2$Si(4-oPh$_2$-2-Et-Ind)(4-oPh$_2$-2-nC$_7$-Ind)ZrCl$_2$; Me$_2$Si(4-oPh$_2$-2-Et-Ind)(4-oPh$_2$-2-nC$_8$-Ind)ZrCl$_2$; Me$_2$Si(4-oPh$_2$-2-Et-Ind)(4-oPh$_2$-2-nC$_9$-Ind)ZrCl$_2$; Me$_2$Si(4-oPh$_2$-2-Et-Ind)(4-oPh$_2$-2-nC$_{10}$-Ind)ZrCl$_2$; Me$_2$Si(4-oPh$_2$-2-n-propyl-Ind)(4-oPh$_2$-2-nBu-Ind)ZrCl$_2$; Me$_2$Si(4-oPh$_2$-2-n-propyl-Ind)(4-oPh$_2$-2-nC$_5$-Ind)ZrCl$_2$; Me$_2$Si(4-oPh$_2$-2-n-propyl-Ind)(4-oPh$_2$-2-nC$_6$-Ind)ZrCl$_2$; Me$_2$Si(4-oPh$_2$-2-n-propyl-Ind)(4-oPh$_2$-2-nC$_7$-Ind)ZrCl$_2$; Me$_2$Si(4-oPh$_2$-2-n-propyl-Ind)(4-oPh-2-nC$_8$-Ind)ZrCl$_2$; Me$_2$Si(4-oPh$_2$-2-nPr-Ind))(4-oPh$_2$-2-nC$_9$-Ind)ZrCl$_2$; Me$_2$Si(4-oPh$_2$-2-nPr-Ind)(4-oPh-2-nC$_{10}$-Ind)ZrCl$_2$; Me$_2$Si(4-oPh$_2$-2-nC$_6$-Ind)$_2$ZrCl$_2$; Me$_2$Si(4-oPh$_2$-2-nC$_5$-Ind)$_2$ZrCl$_2$; Me$_2$Si(4-oPh$_2$-2-nBu-Ind)$_2$ZrCl$_2$; Me$_2$Si(4-oPh$_2$-2-nC$_{10}$-Ind)$_2$ZrCl$_2$; Me$_2$Si(4-oPh$_2$-2-nC$_8$-Ind)$_2$ZrCl$_2$; Me$_2$Si(4-oPh$_2$-2-nC$_9$-Ind)$_2$ZrCl$_2$; Me$_2$Si(4-oPh$_2$-2-nC$_{10}$-Ind)$_2$ZrCl$_2$; Me$_2$Si(4-oPh$_2$-2-nBu-Ind)(4-(3',5'-tBu$_2$-4'-OMePh)-2-Me-THI)ZrCl$_2$; Me$_2$Si(4-oPh$_2$-2-nC$_5$-Ind)(4-(3',5'-tBu$_2$-4'-OMePh)-2-Me-THI)ZrCl$_2$; Me$_2$Si(4-oPh$_2$-2-nC$_6$-Ind)(4-(3',5'-tBu$_2$-4'-OMePh)-2-Me-THI)ZrCl$_2$; Me$_2$Si(4-oPh$_2$-2-nC$_7$-Ind)(4-(3',5'-tBu$_2$-4'-OMePh)-2-Me-THI)ZrCl$_2$; Me$_2$Si(4-oPh$_2$-2-nC$_8$-Ind)(4-(3',5'-tBu$_2$-

4'-OMePh)-2-Me-THI)ZrCl$_2$; Me$_2$Si(4-oPh$_2$-2-nC$_9$-Ind)(4-(3',5'-tBu$_2$-4'-OMePh)-2-Me-THI)ZrCl$_2$; Me$_2$Si(4-oPh$_2$-2-nC$_{10}$-Ind)(4-(3',5'-tBu$_2$-4'-OMePh)-2-Me-THI)ZrCl$_2$; Me$_2$Si(4-oPh$_2$-2-nBu-Ind)(4-(3',5'-tBu$_2$-4'-OMePh)-2-Me-THI)ZrCl$_2$; Me$_2$Si(4-oPh$_2$-2-nC$_5$-Ind)(4-(3',5'-tBu$_2$-4'-OMePh)-2-Me-THI)ZrCl$_2$; Me$_2$Si(4-oPh$_2$-2-nC$_6$-Ind)(4-(3',5'-tBu$_2$-4'-OMePh)-2-Me-THI)ZrCl$_2$; Me$_2$Si(4-oPh$_2$-2-nC$_7$-Ind)(4-(3',5'-tBu$_2$-4'—OMePh)-2-Me-THI)ZrCl$_2$; Me$_2$Si(4-oPh$_2$-2-nC$_8$-Ind)(4-(3',5'-tBu$_2$-4'-OMePh)-2-Me-THI) ZrCl$_2$; Me$_2$Si(4-oPh$_2$-2-nC$_9$-Ind)(4-(3',5'-tBu$_2$-4'-OMePh)-2-Me-THI)ZrCl$_2$; Me$_2$Si(4-oPh$_2$-2-nBu-Ind)(4-(3',5'-tBu$_2$)-2-Me-THI)ZrCl$_2$; Me$_2$Si(4-oPh$_2$-2-nC$_5$-Ind)(4-(3',5'-tBu$_2$)-2-Me-THI)ZrCl$_2$; Me$_2$Si(4-oPh$_2$-2-nC$_6$-Ind)(4-(3',5'-tBu$_2$)-2-Me-THI)ZrCl$_2$; Me$_2$Si(4-oPh$_2$-2-nC$_7$-Ind)(4-(3',5'-tBu$_2$)-2-Me-THI)ZrC$_2$; Me$_2$Si(4-oPh$_2$-2-nC$_8$-Ind)(4-(3',5'-tBu$_2$)-2-Me-THI)ZrCl$_2$; Me$_2$Si(4-oPh$_2$-2-nC$_9$-Ind)(4-(3',5'-tBu$_2$)-2-Me-THI)ZrCl$_2$; Me$_2$Si(4-oPh$_2$-2-nC$_{10}$-Ind)(4-(3',5'-tBu$_2$)-2-Me-THI)ZrCl$_2$; Me$_2$Si(4-oPh$_2$-2-nBu-Ind)(4-(3',5'-tBu$_2$)-2-Me-THI)ZrCl$_2$; Me$_2$Si(4-oPh$_2$-2-nC$_5$-Ind)(4-(3',5'-tBu$_2$)-2-Me-THI)ZrCl$_2$; Me$_2$Si(4-oPh$_2$-2-nC$_6$-Ind)(4-(3',5'-tBu$_2$)-2-Me-THI)ZrCl$_2$; Me$_2$Si(4-oPh$_2$-2-nC$_7$-Ind)(4-(3',5'-tBu$_2$)-2-Me-THI)ZrCl$_2$; Me$_2$Si(4-oPh$_2$-2-nC$_8$-Ind)(4-(3',5'-tBu$_2$)-2-Me-THI)ZrCl$_2$; Me$_2$Si(4-oPh$_2$-2-nC$_9$-Ind)(4-(3',5'-tBu$_2$)-2-Me-THI)ZrCl$_2$; Me$_2$Si(4-oPh$_2$-2-nBu-Ind)(4-(3',5'-tBu$_2$-4'-OMePh)-2-Et-THI)ZrCl$_2$; Me$_2$Si(4-oPh$_2$-2-nC$_5$-Ind)(4-(3',5'-tBu$_2$-4'-OMePh)-2-Et-THI)ZrCl$_2$; Me$_2$Si(4-oPh$_2$-2-nC$_6$-Ind)(4-(3',5'-tBu$_2$-4'-OMePh)-2-Et-THI)ZrCl$_2$; Me$_2$Si(4-oPh$_2$-2-nC$_7$-Ind)(4-(3',5'-tBu$_2$-4'-OMePh)-2-Et-THI)ZrCl$_2$; Me$_2$Si(4-oPh$_2$-2-nC$_8$-Ind)(4-(3',5'-tBu$_2$-4'-OMePh)-2-Et-THI)ZrCl$_2$; Me$_2$Si(4-oPh$_2$-2-nC$_9$-Ind)(4-(3',5'-tBu$_2$-4'-OMePh)-2-Et-THI)ZrCl$_2$; Me$_2$Si(4-oPh$_2$-2-nBu-Ind)(4-(3',5'-tBu$_2$-4'-OMePh)-2-n-propyl-THI)ZrCl$_2$; Me$_2$Si(4-oPh$_2$-2-nC$_5$-Ind)(4-(3',5'-tBu$_2$-4'-OMePh)-2-n-propyl-THI)ZrCl$_2$; Me$_2$Si(4-oPh$_2$-2-nC$_6$-Ind)(4-(3',5'-tBu$_2$-4'-OMePh)-2-n-propyl-THI)ZrCl$_2$; Me$_2$Si(4-oPh$_2$-2-nC$_7$-Ind)(4-(3',5'-tBu$_2$-4'-OMePh)-2-n-propyl-THI) ZrCl$_2$; Me$_2$Si(4-oPh$_2$-2-nC$_8$-Ind)(4-(3',5'-tBu$_2$-4'-OMePh)-2-n-propyl-THI) ZrCl$_2$; Me$_2$Si(4-oPh$_2$-2-nC$_9$-Ind)(4-(3',5'-tBu$_2$-4'-OMePh)-2-n-propyl-THI) ZrCl$_2$; Me$_2$Si(4-oPh$_2$-2-Me-Ind)(4-(3',5'-tBu$_2$-4'-OMePh)-2-nBu-THI) ZrCl$_2$; Me$_2$Si(4-oPh$_2$-2-Me-Ind)(4-(3',5'-tBu$_2$-4'-OMePh)-2-nC$_5$-THI) ZrCl$_2$; Me$_2$Si(4-oPh$_2$-2-Me-Ind)(4-(3',5'-tBu$_2$-4'-OMePh)-2-n-hexyl-THI) ZrCl$_2$; Me$_2$Si(4-oPh$_2$-2-Me-Ind)(4-(3',5'-tBu$_2$-4'-OMePh)-2-nC$_7$-THI) ZrCl$_2$; Me$_2$Si(4-oPh$_2$-2-Me-Ind)(4-(3',5'-tBu$_2$-4'-OMePh)-2-nC$_8$-THI) ZrCl$_2$; Me$_2$Si(4-oPh$_2$-2-Me-Ind)(4-(3',5'-tBu$_2$-4'-OMePh)-2-nC$_9$-THI) ZrCl$_2$; Me$_2$Si(4-oPh$_2$-2-Me-Ind)(4-(3',5'-tBu$_2$-4'-OMePh)-2-nC$_{10}$-THI) ZrCl$_2$; Me$_2$Si(4-oPh$_2$-2-nBu-Ind)(4-(3',5'-tBu$_2$-4'-OMePh)-2-nBu-THI)ZrCl$_2$; Me$_2$Si(4-oPh$_2$-2-nC$_5$-Ind)(4-(3',5'-tBu$_2$-4'-OMePh)-2-nC$_5$-THI) ZrCl$_2$; Me$_2$Si(4-oPh$_2$-2-n-hexyl-Ind)(4-(3',5'-tBu$_2$-4'-OMePh)-2-n-hexyl-THI) ZrCl$_2$; Me$_2$Si(4-oPh$_2$-2-nBu-Ind)(4-(3',5'-tBu$_2$-4'-OMePh)-2-nC$_7$-THI) ZrCl$_2$; and Me$_2$Si(4-oPh$_2$-2-n-hexyl-Ind)(4-(3',5'-tBu$_2$-4'-OMePh)-2-nC$_8$-THI)ZrCl$_2$, where oPh is orthophenyl, nC$_6$ is n-hexyl, t-Bu$_2$ and tBu$_2$ are di-tertiary butyl, nBu is n-butyl, OMe is methoxy, Ind is indenyl, Ph is phenyl, nC$_3$ and nPr are n-propyl, oPh$_2$ is ortho-biphenyl, nC$_5$ is n-pentyl, nC$_7$ is n-heptyl, nC$_8$ is n-octyl, nC$_9$ is n-nonyl, nC$_{10}$ is n-decyl, Me is methyl, Et is ethyl, THI is 1,5,6,7-tetrahydros-indacenyl, and OMe-Ph and OMePh are methoxyphenyl.

Activators

The terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal complex cationic and providing a charge-balancing noncoordinating or weakly coordinating anion.

In one embodiment, alumoxane activators are utilized as an activator in the catalyst composition. Alumoxanes are generally oligomeric compounds containing —Al(R$^1$)—O— sub-units, where R$^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

When the activator is an alumoxane (modified or unmodified), some embodiments select the maximum amount of activator at a 5000-fold molar excess Al/M over the catalyst compound (per metal catalytic site). The minimum activator-to-catalyst-compound is a 1:1 molar ratio. Alternate preferred ranges include from 1:1 to 1000:1, alternately from 1:1 to 500:1 alternately from 1:1 to 200:1, alternately from 1:1 to 100:1, or alternately from 1:1 to 50:1.

In an alternate embodiment, little or no alumoxane is used in the polymerization processes described herein. Preferably, alumoxane is present at zero mole %, alternately the alumoxane is present at a molar ratio of aluminum to catalyst compound transition metal less than 500:1, preferably less than 300:1, preferably less than 100:1, preferably less than 1:1.

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization.

It is within the scope of this invention to use an ionizing or stoichiometric activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of this invention to use neutral or ionic activators alone or in combination with alumoxane or modified alumoxane activators.

Examples of neutral stoichiometric activators include tri-substituted boron, tellurium, aluminum, gallium, and indium, or mixtures thereof. The three substituent groups are each independently selected from alkyls, alkenyls, halogens, substituted alkyls, aryls, arylhalides, alkoxy, and halides. Preferably, the three groups are independently selected from halogen, mono or multicyclic (including halosubstituted) aryls, alkyls, and alkenyl compounds, and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, naphthyl, or mixtures thereof. Even more preferably, the three groups are halogenated, preferably fluorinated, aryl groups. A preferred neutral stoichiometric activator is tris perfluorophenyl boron or tris perfluoronaphthyl boron.

Ionic stoichiometric activator compounds may contain an active proton, or some other cation associated with, but not coordinated to, or only loosely coordinated to, the remaining ion of the ionizing compound. Such compounds and the like are described in European publications EP 0 570 982 A; EP 0 520 732 A; EP 0 495 375 A; EP 0 500 944 B1; EP 0 277 003 A; EP 0 277 004 A; U.S. Pat. Nos. 5,153,157; 5,198,401; 5,066,741; 5,206,197; 5,241,025; 5,384,299; 5,502,124; and U.S. Ser. No. 08/285,380, filed Aug. 3, 1994; all of which are herein fully incorporated by reference.

Preferred compounds useful as an activator in the process of this invention comprise a cation, which is preferably a Bronsted acid capable of donating a proton, and a compatible non-coordinating anion which anion is relatively large (bulky), capable of stabilizing the active catalyst species (the Group 4 cation) which is formed when the two compounds are combined and said anion will be sufficiently labile to be displaced by olefinic, diolefinic and acetylenically unsaturated substrates or other neutral Lewis bases, such as ethers, amines, and the like. Two classes of useful compatible non-coordinating anions have been disclosed in EP 0 277, 003 A1, and EP 0 277,004 A1: 1) anionic coordination complexes comprising a plurality of lipophilic radicals covalently coordinated to and shielding a central charge-bearing metal or metalloid core; and 2) anions comprising a plurality of boron atoms such as carboranes, metallacarboranes, and boranes.

In a preferred embodiment, the stoichiometric activators include a cation and an anion component, and are preferably represented by the following formula (II):

$$(Z)_d^+(A^{d-}) \qquad (II)$$

wherein Z is (L-H) or a reducible Lewis Acid, L is an neutral Lewis base; H is hydrogen; (L-H)$^+$ is a Bronsted acid; $A^{d-}$ is a non-coordinating anion having the charge d−; and d is an integer from 1 to 3.

When Z is (L-H) such that the cation component is (L-H)$_d^+$, the cation component may include Bronsted acids such as protonated Lewis bases capable of protonating a moiety, such as an alkyl or aryl, from the bulky ligand metallocene containing transition metal catalyst precursor, resulting in a cationic transition metal species. Preferably, the activating cation (L-H)$_d^+$ is a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid it is preferably represented by the formula: (Ar$_3$C$^+$), where Ar is aryl or aryl substituted with a heteroatom, a $C_1$ to $C_{40}$ hydrocarbyl, or a substituted $C_1$ to $C_{40}$ hydrocarbyl, preferably the reducible Lewis acid is represented by the formula: (Ph$_3$C$^+$), where Ph is phenyl or phenyl substituted with a heteroatom, a $C_1$ to $C_{40}$ hydrocarbyl, or a substituted $C_1$ to $C_{40}$ hydrocarbyl. In a preferred embodiment, the reducible Lewis acid is triphenyl carbenium.

The anion component $A^{d-}$ include those having the formula [$M^k$+$Q_n$]$^{d-}$ wherein k is 1, 2, or 3; n is 1, 2, 3, 4, 5, or 6, preferably 3, 4, 5 or 6; n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide, and two Q groups may form a ring structure. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ components also include diboron compounds as disclosed in U.S. Pat. No. 5,447,895, which is fully incorporated herein by reference.

In a preferred embodiment, this invention relates to a method to polymerize olefins comprising contacting olefins (preferably ethylene) with a catalyst compound and a boron containing NCA activator represented by the formula (14):

$$Z_d^+(A^{d-}) \qquad (14)$$

where: Z is (L-H) or a reducible Lewis acid; L is an neutral Lewis base (as further described above); H is hydrogen; (L-H) is a Bronsted acid (as further described above); $A^{d-}$ is a boron containing non-coordinating anion having the charge d (as further described above); d is 1, 2, or 3.

In a preferred embodiment in any NCA represented by Formula 14 described above, the reducible Lewis acid is represented by the formula: (Ar$_3$C$^+$), where Ar is aryl or aryl substituted with a heteroatom, a $C_1$ to $C_{40}$ hydrocarbyl, or a substituted $C_1$ to $C_{40}$ hydrocarbyl, preferably the reducible Lewis acid is represented by the formula: (Ph$_3$C$^+$), where Ph is phenyl or phenyl substituted with a heteroatom, a $C_1$ to $C_{40}$ hydrocarbyl, or a substituted $C_1$ to $C_{40}$ hydrocarbyl.

In a preferred embodiment in any of the NCAs represented by Formula 14 described above, $Z_d^+$ is represented by the formula: (L-H)$_d^+$, wherein L is an neutral Lewis base; H is hydrogen; (L-H) is a Bronsted acid; and d is 1, 2, or 3, preferably (L-H)$_d^+$ is a Bronsted acid selected from ammoniums, oxoniums, phosphoniums, silyliums, and mixtures thereof.

In a preferred embodiment in any of the NCAs represented by Formula 14 described above, the anion component $A^{d-}$ is represented by the formula [M*k*+Q*n*]d*− wherein k* is 1, 2, or 3; n* is 1, 2, 3, 4, 5, or 6 (preferably 1, 2, 3, or 4); n*−k*=d*; M* is boron; and Q* is independently selected from hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q* having up to 20 carbon atoms with the proviso that in not more than 1 occurrence is Q* a halide.

This invention also relates to a method to polymerize olefins comprising contacting olefins (such as ethylene) with a catalyst compound and an NCA activator represented by the formula (I):

$$R_nM^{**}(ArNHal)_{4-n} \quad (I)$$

where R is a monoanionic ligand; M** is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3. Typically the NCA comprising an anion of Formula I also comprises a suitable cation that is essentially non-interfering with the ionic catalyst complexes formed with the transition metal compounds, preferably the cation is $Z_d^+$ as described above.

In a preferred embodiment in any of the NCAs comprising an anion represented by Formula I described above, R is selected from the group consisting of substituted or unsubstituted $C_1$ to $C_{30}$ hydrocarbyl aliphatic or aromatic groups, where substituted means that at least one hydrogen on a carbon atom is replaced with a hydrocarbyl, halide, halocarbyl, hydrocarbyl or halocarbyl substituted organometalloid, dialkylamido, alkoxy, aryloxy, alkysulfido, arylsulfido, alkylphosphido, arylphosphide, or other anionic substituent; fluoride; bulky alkoxides, where bulky means $C_4$ to $C_{20}$ hydrocarbyl groups; —SR¹, —NR²², and —PR³², where each R¹, R², or R³ is independently a substituted or unsubstituted hydrocarbyl as defined above; or a $C_1$ to $C_{30}$ hydrocarbyl substituted organometalloid.

In a preferred embodiment in any of the NCAs comprising an anion represented by Formula I described above, the NCA also comprises cation comprising a reducible Lewis acid represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl, preferably the reducible Lewis acid represented by the formula: $(Ph_3C^+)$, where Ph is phenyl or phenyl substituted with a heteroatom, a $C_1$ to $C_{40}$ hydrocarbyl, or a substituted $C_1$ to $C_{40}$ hydrocarbyl.

In a preferred embodiment in any of the NCAs comprising an anion represented by Formula I described above, the NCA also comprises a cation represented by the formula, $(L-H)_d^+$, wherein L is an neutral Lewis base; H is hydrogen; (L-H) is a Bronsted acid; and d is 1, 2, or 3, preferably $(L-H)_d^+$ is a Bronsted acid selected from ammoniums, oxoniums, phosphoniums, silyliums, and mixtures thereof.

Further examples of useful activators include those disclosed in U.S. Pat. Nos. 7,297,653 and 7,799,879.

Another activator useful herein comprises a salt of a cationic oxidizing agent and a noncoordinating, compatible anion represented by the formula (16):

$$(OX^{e+})_d(A^{d-})_e \quad (16)$$

wherein $OX^{e+}$ is a cationic oxidizing agent having a charge of e+; e is 1, 2, or 3; d is 1, 2 or 3; and $A^{d-}$ is a non-coordinating anion having the charge of d− (as further described above).

Examples of cationic oxidizing agents include: ferrocenium, hydrocarbyl-substituted ferrocenium, $Ag^+$, or $Pb^{+2}$. Preferred embodiments of $A^{d-}$ include tetrakis(pentafluorophenyl)borate.

In another embodiment, the catalyst compounds described herein can be used with Bulky activators. A "Bulky activator" as used herein refers to anionic activators represented by the formula:

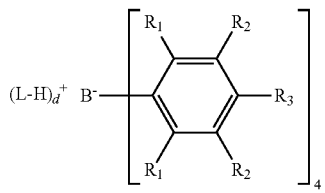

where:
each $R_1$ is, independently, a halide, preferably a fluoride;
each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_2$ is a fluoride or a perfluorinated phenyl group); each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring);
L is an neutral Lewis base; $(L-H)^+$ is a Bronsted acid; d is 1, 2, or 3;
wherein the anion has a molecular weight of greater than 1020 g/mol; and
wherein at least three of the substituents on the B atom each have a molecular volume of greater than 250 cubic Å, alternately greater than 300 cubic Å, or alternately greater than 500 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," Journal of Chemical Education, Vol. 71, No. 11, November 1994, pp. 962-964.

Molecular volume (MV), in units of cubic Å, is calculated using the formula: $MV=8.3V_s$, where $V_s$ is the scaled volume. $V_s$ is the sum of the relative volumes of the constituent atoms, and is calculated from the molecular formula of the substituent using the following table of relative volumes. For fused rings, the $V_s$ is decreased by 7.5% per fused ring.

| Element | Relative Volume |
|---|---|
| H | 1 |
| 1st short period, Li to F | 2 |
| 2nd short period, Na to Cl | 4 |
| 1st long period, K to Br | 5 |
| 2nd long period, Rb to I | 7.5 |
| 3rd long period, Cs to Bi | 9 |

Exemplary bulky substituents of activators suitable herein and their respective scaled volumes and molecular volumes are shown in the table at column 20, line 35 et seq. of U.S. Pat. No. 9,266,977.

For a list of particularly useful Bulky activators please see U.S. Pat. No. 8,658,556, which is incorporated by reference herein.

In another embodiment, one or more of the NCA activators is chosen from the activators described in U.S. Pat. No. 6,211,105.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, $[Ph_3C+][B(C_6F_5)_4^-]$, $[Me_3NH^+]$ $[B(C_6F_5)_4^-]$; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, di-(i-propyl)ammonium tetrakis(pentafluorophenyl)borate, (where alkyl is methyl, ethyl, propyl, n-butyl, sec-butyl, or t-butyl).

In a preferred embodiment, any of the activators described herein may be mixed together before or after combination with the catalyst compound, preferably before being mixed with the catalyst compound.

In some embodiments two NCA activators may be used in the polymerization and the molar ratio of the first NCA activator to the second NCA activator can be any ratio. In some embodiments, the molar ratio of the first NCA activator to the second NCA activator is 0.01:1 to 10,000:1, preferably 0.1:1 to 1000:1, preferably 1:1 to 100:1.

Further, the typical activator-to-catalyst ratio, e.g., all NCA activators-to-catalyst ratio is a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

It is also within the scope of this invention that the catalyst compounds can be combined with combinations of alumoxanes and NCAs (see, for example, U.S. Pat. Nos. 5,153,157, 5,453,410, EP 0 573 120 B1, WO 94/07928, and WO 95/14044 which discuss the use of an alumoxane in combination with an ionizing activator).

Optional Scavengers or Co-Activators

In addition to these activator compounds, scavengers or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

Chain Transfer Agents

This invention further relates to methods to polymerize olefins using the above catalsyts in the presence of a chain transfer agent.

A "chain transfer agent" is any agent capable of hydrocarbyl and/or polymeryl group exchange between a coordinative polymerization catalyst and the metal center of the chain transfer agent during a polymerization process. The chain transfer agent can be any desirable chemical compound such as those disclosed in WO 2007/130306. Preferably, the chain transfer agent is selected from Group 2, 12 or 13 alkyl or aryl compounds; preferably zinc, magnesium or aluminum alkyls or aryls; preferably where the alkyl is a C1 to C30 alkyl, alternately a C2 to C20 alkyl, alternately a C3 to 12 alkyl, typically selected independently from methyl, ethyl, propyl, butyl, isobutyl, tertbutyl, pentyl, hexyl, cyclohexyl, phenyl, octyl, nonyl, decyl, undecyl, and dodecyl; and where di-ethylzinc is particularly preferred.

In a particularly useful embodiment, this invention relates to a catalyst system comprising activator, catalyst compound as described herein and chain transfer agent wherein the chain transfer agent is selected from Group 2, 12 or 13 alkyl or aryl compounds.

In a particularly useful embodiment, the chain transfer agent is selected from dialkyl zinc compounds, where the alkyl is selected independently from methyl, ethyl, propyl, butyl, isobutyl, tertbutyl, pentyl, hexyl, cyclohexyl, and phenyl.

In a particularly useful embodiment, the chain transfer agent is selected from trialkyl aluminum compounds, where the alkyl is selected independently from methyl, ethyl, propyl, butyl, isobutyl, tertbutyl, pentyl, hexyl, cyclohexyl, and phenyl.

Useful chain transfer agents are typically present at from 10 or 20 or 50 or 100 equivalents to 600 or 700 or 800 or 1000 equivalents relative to the catalyst component. Alternately the chain transfer agent ("CTA") is preset at a catalyst complex-to-CTA molar ratio of from about 1:3000 to 10:1; alternatively 1:2000 to 10:1; alternatively 1:1000 to 10:1; alternatively, 1:500 to 1:1; alternatively 1:300 to 1:1; alternatively 1:200 to 1:1; alternatively 1:100 to 1:1; alternatively 1:50 to 1:1; alternatively 1:10 to 1:1.

Useful chain transfer agents include diethylzinc, tri-n-octyl aluminum, trimethylaluminum, triethylaluminum, triisobutylaluminum, tri-n-hexylaluminum, diethyl aluminum chloride, dibutyl zinc, di-n-propylzinc, di-n-hexylzinc, di-n-pentylzinc, di-n-decylzinc, di-n-dodecylzinc, di-n-tetradecylzinc, di-n-hexadecylzinc, di-n-octadecylzinc, diphenylzinc, diisobutylaluminum hydride, diethylaluminum hydride, di-n-octylaluminum hydride, dibutylmagnesium, diethylmagnesium, dihexylmagnesium, and triethylboron.

Optional Support Materials

In embodiments herein, the catalyst system may comprise an inert support material. Preferably the supported material is a porous support material, for example, talc, and inorganic oxides. Other support materials include zeolites, clays, organoclays, or any other organic or inorganic support material and the like, or mixtures thereof.

Preferably, the support material is an inorganic oxide in a finely divided form. Suitable inorganic oxide materials for use in metallocene catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably $SiO_2$, $Al_2O_3$, or $SiO_2/Al_2O_3$.

It is preferred that the support material, most preferably an inorganic oxide, has a surface area in the range of from about 10 to about 700 $m^2/g$, pore volume in the range of from about 0.1 to about 4.0 cc/g and average particle size in the range of from about 5 to about 500 m. More preferably, the surface area of the support material is in the range of from about 50 to about 500 $m^2/g$, pore volume of from about 0.5 to about 3.5 cc/g and average particle size of from about 10 to about 200 m. Most preferably the surface area of the support material is in the range is from about 100 to about 400 $m^2/g$, pore volume from about 0.8 to about 3.0 cc/g and average particle size is from about 5 to about 100 m. The average pore size of the support material useful in the invention is in the range of from 10 to 1000 Å, preferably 50 to about 500 Å, and most preferably 75 to about 350 Å. In some embodiments, the support material is a high surface area, amorphous silica (surface area=300 $m^2/gm$; pore volume of 1.65 $cm^3/gm$). Preferred silicas are marketed under the tradenames of DAVISON 952 or DAVISON 955 by the Davison Chemical Division of W.R. Grace and Company. In other embodiments DAVISON 948 is used.

The support material should be dry, that is, free of absorbed water. Drying of the support material can be effected by heating or calcining at about 100° C. to about 1000° C., preferably at least about 600° C. When the support material is silica, it is heated to at least 200° C., preferably about 200° C. to about 850° C., and most preferably at about 600° C.; and for a time of about 1 minute to about 100 hours, from about 12 hours to about 72 hours, or from about 24 hours to about 60 hours. The calcined support material must have at least some reactive hydroxyl (OH) groups to produce supported catalyst systems of this invention. The calcined support material is then contacted with at least one polymerization catalyst comprising at least one metallocene compound and an activator.

The support material, having reactive surface groups, typically hydroxyl groups, is slurried in a non-polar solvent and the resulting slurry is contacted with a solution of a metallocene compound and an activator. In some embodiments, the slurry of the support material is first contacted with the activator for a period of time in the range of from about 0.5 hours to about 24 hours, from about 2 hours to about 16 hours, or from about 4 hours to about 8 hours. The solution of the metallocene compound is then contacted with the isolated support/activator. In some embodiments, the supported catalyst system is generated in situ. In alternate embodiment, the slurry of the support material is first contacted with the catalyst compound for a period of time in the range of from about 0.5 hours to about 24 hours, from about 2 hours to about 16 hours, or from about 4 hours to about 8 hours. The slurry of the supported metallocene compound is then contacted with the activator solution.

The mixture of the metallocene, activator and support is heated to about 0° C. to about 70° C., preferably to about 23° C. to about 60° C., preferably at room temperature. Contact times typically range from about 0.5 hours to about 24 hours, from about 2 hours to about 16 hours, or from about 4 hours to about 8 hours.

Suitable non-polar solvents are materials in which all of the reactants used herein, i.e., the activator, and the metallocene compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

Polymerization Processes

In embodiments herein, the invention relates to polymerization processes where monomer (such as propylene), and optionally comonomer, are contacted with a catalyst system comprising an activator and at least one metallocene compound, as described above. The catalyst compound and activator may be combined in any order, and are combined typically prior to contacting with the monomer.

Monomers useful herein include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene and isomers thereof. In a preferred embodiment of the invention, the monomer comprises propylene and an optional comonomers comprising one or more of ethylene or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In another preferred embodiment, the monomer comprises ethylene and an optional comonomers comprising one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbomene, norbomadiene, dicyclopentadiene, cyclopentene, cycloheptene, cyclooctene, cyclooctadiene, cyclododecene, 7-oxanorbomene, 7-oxanorbomadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbomene, norbomadiene, and their respective homologs and derivatives, preferably norbornene, norbomadiene, and dicyclopentadiene.

Polymerization processes of this invention can be carried out in any manner known in the art. Any suspension, homogeneous, bulk, solution (including supercritical), slurry, or gas phase polymerization process known in the art can be used. Such processes can be run in a batch, semi-batch, or continuous mode. Homogeneous polymerization processes and slurry processes are preferred. (A homogeneous polymerization process is defined to be a process where at least 90 wt % of the product is soluble in the reaction media.) A bulk homogeneous process is particularly preferred. (A bulk process is typically a process where monomer concentration in all feeds to the reactor is 70 volume % or more.) Alternately, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4\text{-}10}$ alkanes, chlorobenzene, and aromatic and alkyl substituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents.

In a preferred embodiment, the feed concentration of the monomers and comonomers for the polymerization is 60 vol % solvent or less, preferably 40 vol % or less, or preferably 20 vol % or less, based on the total volume of the feedstream. Preferably the polymerization is run in a bulk process.

Preferred polymerizations can be run at any temperature and/or pressure suitable to obtain the desired polymers. Typical temperatures and/or pressures include a temperature in the range of from about 0° C. to about 300° C., preferably about 20° C. to about 200° C., preferably about 35° C. to about 150° C., preferably from about 40° C. to about 120° C., preferably from about 70° C. to about 120° C., preferably from about 80° C. to about 120° C., preferably from about 90° C. to about 120° C., preferably from about 95° C. to about 110° C.; and at a pressure in the range of from about 0.35 MPa to about 10 MPa, preferably from about 0.45 MPa to about 6 MPa, or preferably from about 0.5 MPa to about 4 MPa.

In a typical polymerization, the run time of the reaction is up to 300 minutes, preferably in the range of from about 5 to 250 minutes, or preferably from about 10 to 120 minutes.

In another embodiment of the invention, the polymerization temperature is preferably from about 70° C. to about 130° C., preferably from about 80° C. to about 125° C., preferably from about 90° C. to about 120° C., preferably from about 95° C. to about 110° C. and the polymerization process is a homogeneous process, preferably a solution process.

In some embodiments hydrogen is present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa). In some embodiments hydrogen is not added the polymerization reactor, i.e. hydrogen may be present from other sources, such as a hydrogen generating catalyst, but none is added to the reactor.

In an embodiment of the invention, the activity of the catalyst is at least 50 g/mmol/hour, preferably 500 g/mmol/hour or more, preferably 5000 g/mmol/hr or more, preferably 50,000 g/mmol/hr or more, preferably 100,000 g/mmol/hr or more, preferably 150,000 g/mmol/hr or more, preferably 200,000 g/mmol/hr or more, preferably 250,000 g/mmol/hr or more, preferably 300,000 g/mmol/hr or more, preferably 350,000 g/mmol/hr or more. In an alternate embodiment, the conversion of olefin monomer is at least 10%, based upon polymer yield and the weight of the monomer entering the reaction zone, preferably 20% or more, preferably 30% or more, preferably 50% or more, preferably 80% or more.

In a preferred embodiment, little or no scavenger is used in the process to produce the ethylene polymer. Preferably, scavenger (such as tri alkyl aluminum) is present at zero mol %, alternately the scavenger is present at a molar ratio of scavenger metal to transition metal of less than 100:1, preferably less than 50:1, preferably less than 15:1, preferably less than 10:1.

In a preferred embodiment, the polymerization: 1) is conducted at temperatures of 0 to 300° C. (preferably 90 to 150° C., preferably 95 to 120° C.); 2) is conducted at a pressure of atmospheric pressure to 10 MPa (preferably 0.35 to 10 MPa, preferably from 0.45 to 6 MPa, preferably from 0.5 to 4 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably where aromatics are preferably present in the solvent at less than 1 wt %, preferably less than 0.5 wt %, preferably at 0 wt % based upon the weight of the solvents); 4) the polymerization preferably occurs in one reaction zone; 5) the productivity of the catalyst compound is at least 80,000 g/mmol/hr (preferably at least 150,000 g/mmol/hr, preferably at least 200,000 g/mmol/hr, preferably at least 250,000 g/mmol/hr, preferably at least 300,000 g/mmol/hr); 6) optionally scavengers (such as trialkyl aluminum compounds) are absent (e.g., present at zero mol %, alternately the scavenger is present at a molar ratio of scavenger metal to transition metal of less than 100:1, preferably less than 50:1, preferably less than 15:1, preferably less than 10:1); and 7) optionally hydrogen is present in the polymerization reactor at a partial pressure of 0.001 to 50 psig (0.007 to 345 kPa) (preferably from 0.01 to 25 psig (0.07 to 172 kPa), more preferably 0.1 to 10 psig (0.7 to 70 kPa)). In a preferred embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone. Room temperature is 23° C. unless otherwise noted.

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

In particularly useful embodiments, this invention relates to a process to polymerize olefins comprising: 1) contacting, at a temperature of 60° C. or more (alternately 80° C. or more, alternately 90° C. or more, alternately 95° C. or more), one or more olefins with the catalyst system described herein (preferably the catalyst compound is present in a rac:meso ratio of at least 7:1); and 2) obtaining polymer having a g'vis of 0.97 or less (alternately 0.95 or less, alternately 0.90 or less) and an Mw of 200,000 g/mol or more, as determined by GPC-DRI (Alternately 300,000 g/mol or more, alternately 400,000 g/mol or more).

Preferably, the process occurs at a temperature of from about 90° C. to about 200° C., at a pressure in the range of from about 0.35 MPa to about 10 MPa, and at a time up to 300 minutes in the solution slurry or gas phase.

Preferably when the polymer produced by the process herein has an ethylene content of 10%, the polymer also has an Mw that is ≥0.9 times the Mw of a propylene ethylene copolymer having 40 wt % ethylene produced at the under the same polymerization conditions (except for ethylene and propylene monomer concentrations) using the same catalyst system and both Mw's are 200,000 g/mol (GPC-DRI) or more.

In a particularly preferred embodiment, this invention relates to a process to polymerize olefins comprising: 1) contacting, at a temperature of 95° C. or more, ethylene and propylene with a catalyst system described herein; 2) obtaining polymer having: a) from 0 to 20 weight % ethylene, based upon the weight of the copolymer; b) an Mw of 50,000 g/mol or more (preferably 200,000 g/mol or more), as determined by GPC-DRI; c) a melting point of X° C. or more, where X=(the Tm of the polymer made under the same conditions except that the polymerization temperature is 70° C.) minus 10° C., and optionally the polymer has an Mw that is ≥0.9 times the Mw of a propylene ethylene copolymer having 40 wt % ethylene produced at the under the same polymerization conditions (except for ethylene and propylene monomer concentrations) using the same catalyst system, the propylene ethylene copolymer having 40 wt % ethylene has an Mw of 200,000 g/mol (GPC-DRI) or more.

Gas Phase Polymerization

Generally, in a fluidized gas phase process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. Illustrative gas phase polymerization processes can be as discussed and described in U.S. Pat. Nos. 4,543,399; 4,588,790; 5,028,670; 5,317,036; 5,352,749; 5,405,922; 5,436,304; 5,453,471; 5,462,999; 5,616,661; and 5,668,228.

The reactor pressure in a gas phase process can vary from about 69 kPa to about 3,450 kPa, about 690 kPa to about 3,450 kPa, about 1,380 kPa to about 2,759 kPa, or about 1,724 kPa to about 2,414 kPa.

The reactor temperature in the gas phase process can vary from about 30° C. to about 120° C., preferably from about 60° C. to about 115° C., more preferably in the range of from about 65° C. to about 110° C., and most preferably in the range of from about 70° C. to about 95° C. In another embodiment, when high density polyethylene is desired the reactor temperature is typically between about 70° C. and about 105° C.

The productivity of the catalyst or catalyst system in a gas phase system is influenced by the partial pressure of the main monomer. The preferred mole percent of the main monomer, ethylene or propylene, preferably ethylene, is from about 25 mol % to about 90 mol % and the comonomer partial pressure is from about 138 kPa to about 5,000 kPa, preferably about 517 kPa to about 2,069 kPa, which are typical conditions in a gas phase polymerization process. Also in some systems the presence of comonomer can increase productivity.

In a preferred embodiment, the reactor can be capable of producing more than 227 kilograms polymer per hour (kg/hr) to about 90,900 kg/hr or higher, preferably greater than 455 kg/hr, more preferably greater than 4,540 kg/hr, even more preferably greater than 11,300 kg/hr, still more preferably greater than 15,900 kg/hr, still even more preferably greater than 22,700 kg/hr, and preferably greater than 29,000 kg/hr to greater than 45,500 kg/hr, and most preferably over 45,500 kg/hr.

The polymerization in a stirred bed can take place in one or two horizontal stirred vessels according to the polymerization mode. The reactors can be subdivided into individually gas-composition-controllable and/or polymerization-temperature-controllable polymerization compartments. With continuous catalyst injection, essentially at one end of the reactor, and powder removal at the other end, the residence time distribution approaches that of plug flow reactor. Preferably the fluorocarbon, if present, is introduced into the first stirred vessel.

Other gas phase processes contemplated by the processes discussed and described herein can include those described in U.S. Pat. Nos. 5,627,242; 5,665,818; 5,677,375; EP-A-0 794 200; EP-A-0 802 202; and EP-B-634 421.

In another preferred embodiment the catalyst system is in liquid, suspension, dispersion, and/or slurry form and can be introduced into the gas phase reactor into a resin particle lean zone. Introducing a liquid, suspension, dispersion, and/or slurry catalyst system into a fluidized bed polymerization into a particle lean zone can be as discussed and described in U.S. Pat. No. 5,693,727.

In some embodiments, the gas phase polymerization can operate in the absence of fluorocarbon. In some embodiments, the gas phase polymerization can be conducted in the presence of a fluorocarbon. Generally speaking the fluorocarbons can be used as polymerization media and/or as condensing agents.

Slurry Phase Polymerization

A slurry polymerization process generally operates at a pressure range between about 103 kPa to about 5,068 kPa or even greater and a temperature from about 0° C. to about 120° C. In a slurry polymerization, a suspension of solid, particulate polymer is formed in a liquid polymerization diluent medium to which monomer and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane medium having from about 3 to about 7 carbon atoms, preferably a branched alkane. The medium employed can be liquid under the conditions of polymerization and relatively inert. When a propane medium is used the process can be operated above the reaction diluent critical temperature and pressure. Preferably, a hexane or an isobutane medium is employed.

In one embodiment, a preferred polymerization technique, referred to as a particle form polymerization or a slurry process, can include maintaining the temperature below the temperature at which the polymer goes into solution. Such technique is well known in the art, and can be as discussed and described in U.S. Pat. No. 3,248,179. The preferred temperature in the particle form process can be from about 20° C. to about 110° C. Two preferred polymerization processes for the slurry process can include those employing a loop reactor and those utilizing a plurality of stirred reactors in series, parallel, or combinations thereof. Non-limiting examples of slurry processes include continuous loop or stirred tank processes. Also, other examples of slurry processes can be as discussed and described in U.S. Pat. No. 4,613,484.

In another embodiment, the slurry process can be carried out continuously in a loop reactor. The catalyst, as a slurry in mineral oil and/or paraffinic hydrocarbon or as a dry, free flowing powder, can be injected regularly to the reactor loop, which can be filled with a circulating slurry of growing polymer particles in a diluent containing monomer and comonomer. Hydrogen, optionally, can be added as a molecular weight control. The reactor can be operated at a pressure of about 3,620 kPa to about 4,309 kPa and at a temperature from about 60° C. to about 115° C. depending on the desired polymer melting characteristics. Reaction heat can be removed through the loop wall since much of the reactor is in the form of a double-jacketed pipe. The slurry is allowed to exit the reactor at regular intervals or continuously to a heated low pressure flash vessel, rotary dryer, and a nitrogen purge column in sequence for removal of the diluent and at least a portion of any unreacted monomer and/or comonomers. The resulting hydrocarbon free powder can be compounded for use in various applications.

The reactor used in the slurry process can produce greater than 907 kg/hr, more preferably greater than 2,268 kg/hr, and most preferably greater than 4,540 kg/hr polymer. In another embodiment the slurry reactor can produce greater than 6,804 kg/hr, preferably greater than 11,340 kg/hr to about 45,500 kg/hr. The reactor used in the slurry process can be at a pressure from about 2,758 kPa to about 5,516 kPa, preferably about 3,103 kPa to about 4,827 kPa, more preferably from about 3,448 kPa to about 4,482 kPa, most preferably from about 3,620 kPa to about 4,309 kPa.

The concentration of the predominant monomer in the reactor liquid medium in the slurry process can be from about 1 wt % to about 30 wt %, preferably from about 2 wt % to about 15 wt %, more preferably from about 2.5 wt % to about 10 wt %, most preferably from about 3 wt % to about 20 wt %.

In one or more embodiments, the slurry and/or gas phase polymerization can be operated in the absence of or essentially free of any scavengers, such as triethylaluminum, trimethylaluminum, tri-isobutylaluminum and tri-n-hexyl-aluminum and diethyl aluminum chloride, dibutyl zinc and the like. Operation of the slurry and/or gas phase reactors in the absence or essentially free of any scavengers can be as discussed and described in WO 96/08520 and U.S. Pat. No. 5,712,352. In another embodiment the polymerization processes can be run with scavengers. Typical scavengers include trimethyl aluminum, tri-ethyl aluminum, tri-isobutyl aluminum, tri-n-octyl aluminum, and an excess of alumoxane and/or modified alumoxane.

In some embodiments, the slurry phase polymerization can operate in the absence of a fluorocarbon. In some embodiments, the slurry phase polymerization can be conducted in the presence of a fluorocarbon. Generally speaking the fluorocarbons can be used as polymerization media.

Solution Phase Polymerization

As used herein, the phrase "solution phase polymerization" refers to a polymerization system where the polymer produced is soluble in the polymerization medium. Generally this involves polymerization in a continuous reactor in which the polymer formed and the starting monomer and catalyst materials supplied, are agitated to reduce or avoid concentration gradients and in which the monomer acts as a diluent or solvent or in which a hydrocarbon is used as a diluent or solvent. Suitable processes typically operate at temperatures from about 0° C. to about 250° C., preferably from about 50° C. to about 200° C., preferably from about 80° C. to about 150° C., more preferably from about 90° C. to about 140° C., more preferably from about 95° C. to about 120° C. and at pressures of about 0.1 MPa or more, preferably 2 MPa or more. The upper pressure limit is not critically constrained but typically can be about 200 MPa or less, preferably, 120 MPa or less. Temperature control in the reactor can generally be obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds can also be used. The purity, type, and amount of solvent can be optimized for the maximum catalyst productivity for a particular type of polymerization. The solvent can be also introduced as a catalyst carrier. The solvent can be introduced as a gas phase or as a liquid phase depending on the pressure and temperature. Advantageously, the solvent can be kept in the liquid phase and introduced as a liquid. Solvent can be introduced in the feed to the polymerization reactors.

In a preferred embodiment, the polymerization process can be described as a continuous, non-batch process that, in its steady state operation, is exemplified by removal of amounts of polymer made per unit time, being substantially equal to the amount of polymer withdrawn from the reaction vessel per unit time. By "substantially equal" we intend that these amounts, polymer made per unit time, and polymer withdrawn per unit time, are in ratios of one to other, of from 0.9:1; or 0.95:1; or 0.97:1; or 1:1. In such a reactor, there will be a substantially homogeneous monomer distribution.

Preferably in a continuous process, the mean residence time of the catalyst and polymer in the reactor generally can be from about 5 minutes to about 8 hours, and preferably from about 10 minutes to about 6 hours, more preferably from 10 minutes to 1 hour. In some embodiments, comonomer (such as ethylene) can be added to the reaction vessel in an amount to maintain a differential pressure in excess of the combined vapor pressure of the main monomer (such as a propylene) and any optional diene monomers present.

In another embodiment, the polymerization process can be carried out at a pressure of ethylene of from about 68 kPa to about 6,800 kPa, most preferably from about 272 to about 5,440 kPa). The polymerization is generally conducted at a temperature of from about 25° C. to about 250° C., preferably from about 75° C. to about 200° C., and most preferably from about 95° C. to about 200° C.

The addition of a small amount of hydrocarbon to a typical solution phase process can cause the polymer solution viscosity to drop and or the amount of polymer solute to increase. Addition of a larger amount of solvent in a traditional solution process can cause the separation of the polymer into a separate phase (which can be solid or liquid, depending on the reaction conditions, such as temperature or pressure).

The processes discussed and described herein can be carried out in continuous stirred tank reactors, batch reactors, or plug flow reactors. One reactor can be used even if sequential polymerizations are being performed, preferably as long as there is separation in time or space of the two reactions. Likewise two or more reactors operating in series or parallel can also be used. These reactors can have or not have internal cooling and the monomer feed may or may not be refrigerated. See the general disclosure of U.S. Pat. No. 5,001,205 for general process conditions. See also, WO 96/33227 and WO 97/22639.

Supercritical or Supersolution Polymerization

In aspects of the invention, the processes and or catalyst compositions disclosed herein may be used in a supercritical or super solution phase. A supercritical polymerization means a polymerization process in which the polymerization system is in a dense fluid (i.e., its density is 300 kg/m$^3$ or higher), supercritical state. The terms "dense fluid" and "supercritical state" are defined in U.S. Pat. No. 7,812,104. A super solution polymerization is one where the polymerization occurs at a temperature of 65° C. to 150° C., preferably from about 75° C. to about 140° C., preferably from about 90° C. to about 140° C., more preferably from about 100° C. to about 140° C., and at pressures of between 1.72 MPa and 35 MPa, preferably between 5 and 30 MPa. For further information on supercritical and super solution polymerizations, please see U.S. Pat. Nos. 7,812,104; 8,008, 412; 7,812,104; 9,249,239; 7,729,536; 8,058,371; and US 2008/0153997.

Polyolefin Products

This invention also relates to compositions of matter produced by the methods described herein.

In a preferred embodiment, the process described herein produces propylene homopolymers or propylene copolymers, such as propylene-ethylene and/or propylene-alphaolefin (preferably $C_3$ to $C_{20}$) copolymers (such as propylene-hexene copolymers or propylene-octene copolymers), preferably having: a Mw/Mn of greater than 1 to 4 (preferably greater than 1 to 3).

Likewise, the process of this invention produces olefin polymers, preferably polyethylene and polypropylene homopolymers and copolymers. In a preferred embodiment, the polymers produced herein are homopolymers of ethylene or propylene, are copolymers of ethylene preferably having from 0 to 50 mole % (alternately from 0.5 to 25 mole %, alternately from 0.5 to 20 mol %, alternately from 1 to 15 mole %, preferably from 3 to 10 mole %) of one or more $C_3$ to $C_{20}$ olefin comonomer (preferably $C_3$ to $C_{12}$ alpha-olefin, preferably propylene, butene, hexene, octene, decene, dodecene, preferably propylene, butene, hexene, octene), or are copolymers of propylene preferably having from 0 to 25 mole % (alternately from 0.5 to 20 mole %, alternately from 1 to 15 mole %, preferably from 3 to 10 mole %) of one or more of $C_2$ or $C_4$ to $C_{20}$ olefin comonomer (preferably ethylene or $C_4$ to $C_{12}$ alpha-olefin, preferably ethylene, butene, hexene, octene, decene, dodecene, preferably ethylene, butene, hexene, octene).

In a preferred embodiment, the monomer is ethylene and the comonomer is hexene, preferably from 1 to 15 mole % hexene, alternately 1 to 10 mole %.

In a preferred embodiment, the monomer is propylene and the comonomer is ethylene, preferably from 0.5 to 99.5 wt % ethylene, alternately 1 to 65 wt % ethylene, alternately 1 to 60 wt % ethylene, alternately 2 to 50 wt % ethylene, alternately 3 to 30 wt % ethylene, alternately 4 to 20 wt % ethylene, based upon the weight of the copolymer.

Typically, the polymers produced herein have an Mw (as measured by GPC-DRI) from 5,000 to 1,000,000 g/mol, alternately from 200,000 to 1,000,000 g/mol, alternately 250,000 to 800,000 g/mol, alternately 300,000 to 600,000 g/mol, alternately from 300,000 to 500,000 g/mol.

Typically, the polymers produced herein have an Mw/Mn (as measured by GPC-DRI) of greater than 1 to 40, preferably 1 to 20, preferably 1.1 to 15, preferably 1.2 to 10, preferably 1.3 to 5, preferably 1.4 to 4.

Typically, the polymers produced herein (typically propylene-ethylene copolymers) have an Mw (as measured by GPC-DRI) of 5,000 to 1,000,000 g/mol (preferably 200,000 to 750,000 g/mol, preferably 250,000 to 500,000 g/mol, preferably 250,000 to 300,000 g/mol, preferably 250,000 to 350,000 g/mol), and/or an Mw/Mn of greater than 1 to 40 (alternately 1.1 to 20, alternately 1.2 to 10, alternately 1.3 to 5, 1.4 to 4, alternately 1.4 to 3).

In a preferred embodiment the polymer produced herein has a unimodal or multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versus).

The polymer produced herein can have a melting point (Tm, DSC peak second melt) of at least 145° C., or at least 150° C., or at least 152° C., or at least 153° C., or at least 154° C. For example, the polymer can have a melting point from at least 145° C. to about 175° C., about 150° C. to about 165° C., about 152° C. to about 160° C.

The polymer produced herein can have a 1% secant flexural modulus from a low of about 1100 MPa, about 1200 MPa, about 1250 MPa, about 1300 MPa, about 1400 MPa, or about 1,500 MPa to a high of about 1,800 MPa, about 2,100 MPa, about 2,600 MPa, or about 3,000 MPa, as measured according to ASTM D 790 (A, 1.0 mm/min). For example, the polymer can have a flexural modulus from about 1100 MPa to about 2,200 MPa, about 1200 MPa to about 2,000 MPa, about 1400 MPa to about 2,000 MPa, or about 1500 MPa or more, as measured according to ASTM D 790 (A, 1.0 mm/min).

The polymer produced herein can have a melt flow rate (MFR, ASTM 1238, 2.16 kg, 230° C.) from a low of about 0.1 dg/min, about 0.2 dg/min, about 0.5 dg/min, about 1 dg/min, about 15 dg/min, about 30 dg/min, or about 45 dg/min to a high of about 75 dg/min, about 100 dg/min, about 200 dg/min, or about 300 dg/min.

The polymer produced herein can have a branching index (g'vis) of 0.95 or less, preferably 0.93 or less, preferably 0.90 or less, preferably 0.88 or less.

Interestingly, the polymers produced herein have high Mw at both higher and lower comonomer incorporation. For example see FIG. 3, where Catalysts A, B and C show that the polymers with lower ethylene content have Mw's that are near the Mw's of copolymers made with the same catalyst having higher ethylene content.

In an embodiment of the invention, the polymer produced herein is a propylene ethylene copolymer having an ethylene content of 10 to less than 40 wt % mol or wt %) and an Mw that is ≥0.9 (alternately 1.0, alternately 1.1, alternately 1.25, alternately 1.5) times the Mw of a propylene ethylene copolymer having 40 wt % ethylene produced at the under the same polymerization conditions (except for ethylene monomer concentration) using the same catalyst system and both Mw's are 200,000 g/mol (GPC-DRI) or more, preferably 250,000 g/mol or more, preferably 300,000 g/mol or more, preferably 350,000 g/mol or more.

Advantageously, the polymer produced is a propylene ethylene copolymer having an Mw that is ≥0.9 times (alternately 1.0 times) the Mw of a propylene ethylene copolymer having 40 wt % ethylene produced at the under the same polymerization conditions (except for ethylene and propylene monomer concentrations) using the same catalyst system, preferably the Mw is 200,000 g/mol (GPC-DRI) or more.

In an embodiment of the invention, any polymer produced herein at a polymerization temperature of 80° C. or more (preferably at 90° C. or more, preferably 95° C. or more, preferably at 100° C. or more) has a melting point of X° C. or more (alternately X° C.+1° C. or more, alternately X° C.+2° C. or more, alternately X° C.+3° C. or more, alternately X° C.+4° C. or more, alternately X° C.+5° C. or more, alternately X° C.+6° C. or more, alternately X° C.+7° C. or more) where X=(the Tm of the polymer made under the same conditions except that the polymerization temperature is 70° C.) minus 10° C. For example if the Tm of the polymer made at 70° C. is 155° C., then the Tm of the polymer made at 80° C. or more, is 145° C. or more.

Blends

In another embodiment, the polymer (preferably the polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In a preferred embodiment, the polymer (preferably the polyethylene or polypropylene) is present in the above blends, at from 10 to 99 wt %, based upon the weight of the polymers in the blend, preferably 20 to 95 wt %, even more preferably at least 30 to 90 wt %, even more preferably at least 40 to 90 wt %, even more preferably at least 50 to 90 wt %, even more preferably at least 60 to 90 wt %, even more preferably at least 70 to 90 wt %.

The blends described above may be produced by mixing the polymers of the invention with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Films

Specifically, any of the foregoing polymers, such as the foregoing polypropylenes or blends thereof, may be used in a variety of end-use applications. Such applications include, for example, mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble processes and may occur before or after the individual layers are brought together.

For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15, preferably 7 to 9. However, in another embodiment the film is oriented to the same extent in both the MD and TD directions.

The films may vary in thickness depending on the intended application; however, films of a thickness from 1 to 50 μm are usually suitable. Films intended for packaging are usually from 10 to 50 μm thick. The thickness of the sealing layer is typically 0.2 to 50 μm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In a preferred embodiment, one or both of the surface layers is modified by corona treatment.

Experimental

MAO is methyl alumoxane (30 wt % in toluene) obtained from Albemarle.

TONAL is tri-n-octyl aluminum.

Me$_2$Si(2-iPr,4-3'5'di-t-BuPhInd)(2-Me,4-2Ph-PhInd)ZrCl$_2$ and Me$_2$Si(2-iPr,4-3'5'di-t-BuPhInd)(2-Me,4-4-3'5'di-t-BuPhInd)ZrCl$_2$ are produced as described in US 2015/0025208.

MCN1 is dimethylsilyl (4-oPh.2.-2-n-hexyl-indenyl) (2-methyl-4-(3',5'-di-tert-butyl-4'-methoxy-phenyl)-indenyl) zirconium dichloride.

MCN2 is dimethylsilyl bis(4-oPh. 2.-2-n-hexyl-indenyl) zirconium dichloride.

MCN3 is dimethylsilyl bis(4-oPh. 2.-2-n-butyl-indenyl) zirconium dichloride.

MCN4 is dimethylsilyl (4-oPh.2.-2-n-butyl-indenyl) (2-methyl-4-(3',5'-di-tert-butyl-4'-methoxy-phenyl)-indacenyl) zirconium dichloride.

MCN5 is dimethylsilyl (4-oPh. 2.-2-c-propyl-indenyl) (2-methyl-4-(3',5'-di-tert-butyl-4'-methoxy-phenyl)-indenyl) zirconium dichloride.

MNC6 is dimethylsilyl (4-oPh. 2.-2-c-propyl-indenyl) (2-methyl-4-(3',5'-di-tert-butyl-phenyl)-indenyl) zirconium dichloride.

MCN7 is dimethylsilyl (4-oPh.2.-2-methyl-indenyl) (2-isopropyl-4-(3',5'-di-tert-butyl-4'-methoxy-phenyl)-indenyl) zirconium dichloride.

MCN8 is dimethylsilyl bis (2-c-propyl-4-(3',5'-di-tert-butyl-phenyl)-indenyl) zirconium dichloride.

MCN9 is dimethylsilyl bis(2-methyl-4-(3',5'-di-tert-butyl-4'-methoxy-phenyl)-indenyl) zirconium dichloride.

MCN10 is dimethylsilyl (4(4'-tert-butyl-phenyl)-2-methyl-indenyl) (2-isopropyl-4-(4'-tert-butyl-phenyl)-indenyl) zirconium dimethyl.

MCN11 is dimethylsilyl (4-phenyl-2-methyl-indacenyl) (2-isopropyl-4-(4-tert-butyl-phenyl)-indenyl) zirconium dimethyl.

MCN12 is dimethylsilyl bis(4-phenyl-2-n-butyl-indenyl) zirconium dichloride (6:1 rac:meso ratio).

MCN13 is dimethylsilyl bis(4-phenyl-2-n-butyl-indenyl) zirconium dichloride (1:2 rac:meso ratio).

MCN14 is dimethylsilyl (4-oPh.2.-2-n-hexyl-indenyl) (2-methyl-4-(3',5'-di-tert-butyl-4'-methoxy-phenyl)-indenyl) zirconium dimethyl.

Catalyst A is MCN1 supported on SMAO.

Catalyst B is MCN2 supported on SMAO.

Catalyst C is MCN3 supported on SMAO.

Catalyst D (Comparative) is MCN8 supported on SMAO.

Catalyst E (Comparative) is MCN10 supported on SMAO.

Catalyst F (Comparative) is MCN9 supported on SMAO.

Metallocene Synthesis:

MCN1

4-([1,1'-Biphenyl]-2-yl)-2-$^n$Hex-1H-indene

A solution of compound 4-([1,1'-Biphenyl]-2-yl)-2-bromo-1H-indene (15 g, 43.2 mmol, 1 equiv.) and anhydrous toluene (150 mL) was treated with bis(triphenylphosphine)palladium(II)-dichloride (3.5 g, 4.3 mmol, 0.1 equiv.). After stirring for 10 minutes, 2 M hexylmagnesium bromide in diethyl ether (112 mL, 224.6 mmol, 5.2 equiv.) was added dropwise. The reaction was heated at 60° C. for 5 hours. The reaction was cooled with an ice bath, acidified with 1NHCl to pH 3 and extracted with ethyl acetate (3×500 mL). The combined organic layers were washed with saturated brine (800 mL), dried over sodium sulfate, and concentrated under reduced pressure. The residue was purified over silica gel (200 g) eluting with heptanes to give compound 7 (7 g, 46% yield) as a light yellow oil.

Lithium {1-[4-(3',5'-di-tert-4'-methoxybutylphenyl)-2-methyl indenide]}

A precooled solution of 4-(3,5-di-tert-butyl-4-methoxyphenyl)-2-methyl-indene (15.0 g, 43.1 mmol) in diethyl ether (200 mL) was treated with nBuLi (2.5 M in hexane, 18.1 mL, 45.3 mmol). The reaction was stirred at room temperature for 15 h. Then all volatiles were evaporated. The residue was washed with pentane (10 mL) and dried under vacuum to yield a white solid (15.15 g).

Chlorodimethyl [4-(3',5'-di-tert-butyl-4'-methoxyphenyl)-2-methyl-indenyl] silane A precooled solution of lithium 1-[4-(3,5-di-tert-4-methoxybutylphenyl)-2-methyl indenide](15.1 g, 42.8 mmol) in diethyl ether (100 mL) was treated with Me$_2$SiCl$_2$ (27.4 g, 214.0 mmol), and the white slurry was stirred at room temperature for 5 h. All volatiles were evaporated under reduced pressure. The residue was extracted with hexane (100 mL×2), and the combined filtrate was concentrated to dryness under vacuum to give white foam (18.36 g).

Dimethylsilyl [4-(3',5'-di-tert-butyl-4'-methoxyphenyl)-2-methyl-indenyl]trifluoromethane-sulfonate A solution of chlorodimethyl[4-(3,5-di-tert-butyl-4-methoxyphenyl)-2-methyl-indenyl]silane (18.34 g, 41.7 mmol) in toluene (100 mL) was treated with silver trifluoromethanesulfonate (11.2 g, 43.8 mmol) while stirring. The white slurry was stirred at room temperature for 5 h. Toluene was removed under vacuum and the residue was extracted with hexane (100 mL×2). The collected filtrate was concentrated under vacuum to give colorless foam as the product (22.82 g).

Lithium [1-(4-oPh.2.)-2-hexyl-indenide]

A precooled solution of 4-oPh.2.-2-hexyl-indene (15.0 g, 42.6 mmol) in diethyl ether (100 mL) was treated with nBuLi (2.5 M in hexane, 17.9 mL, 44.7 mmol). The reaction was stirred at room temperature for 3 h. Then all volatiles were evaporated. The residue was washed with hexane (20 mL×2) and dried under vacuum to yield a white solid as the product (14.21 g).

(4-oPh.2.-2-hexyl-indenyl) (4-(3',5'-di-tert-butyl-4'-methoxyphenyl)-2-methyl-indenyl) dimethylsilane A precooled solution of dimethylsilyl[4-(3,5-di-tert-butyl-4-methoxyphenyl)-2-methyl-indenyl] trifluoromethanesulfonate (22.73 g, 39.2 mmol) in diethyl ether (100 mL) was treated with lithium [1-(4-oPh.2.-2-hexyl indenide)] (14.03 g, 39.2 mmol). The solution was stirred at room temperature overnight. Diethyl ether was evaporated. The residue was purified by flash chromatography (silica gel, eluent: hexane) to give a pale yellow oil (13.24 g).

Dilithium dimethylsilyl (4-oPh.2.-2-hexyl indenide) (4-(3',5'-di-tert-butyl-4'-methoxyphenyl)-2-methyl indenide)

$^n$BuLi (2.5 M, 14.3 mL, 35.79 mmol) was added to a precooled solution of the above product (13.20 g, 17.46 mmol) in diethyl ether (100 mL). The solution was stirred at room temperature for 3 h. All volatiles were removed under vacuum. The residue was washed with pentane (15 mL×2) and dried under vacuum to give the dilithium compound (12.11 g).

Dimethylsilyl (4-oPh.2.-2-hexyl indenyl) (4-(3',5'-di-tert-butyl-4'-methoxyphenyl)-2-methyl indenyl) zirconium dichloride A precooled solution of dilithium dimethylsilyl (4-oPh.2.-2-cyclopropyl indenide) (4-(3,5-di-tert-butylphenyl)-2-methyl indenide (12.06 g, 15.7 mmol) in toluene (100 mL) was treated with $ZrCl_4$ (3.79 g, 1.17 mmol). The mixture was stirred at room temperature overnight. The mixture was filtered through Celite to get rid of LiCl and evaporated to dryness. The residue was washed with hexane (50 mL) to get a solid as a mixture of two isomers. The mixture was recrystallized toluene (20 mL, 100° C. to 40° C.) to get the corresponding meso-isomer metallocene (361 mg, ratio of rac/meso=1:22). The combined filtrate was concentrated and recrystallized (10 mL of toluene and 5 mL of hexane, refluxed to room temperature) to afford mixture with rac/meso-ratio=15:1. The mixture was further recrystallized (10 mL of toluene and 6 mL of hexane, refluxed to room temperature) to obtain the rac-isomer (623 mg, ratio of rac/meso=22:1). $^1$H NMR (400 MHz, $C_6D_6$, 23° C.), rac-form isomer: δ 8.26 (dd, 1H), 7.91 (s, 2H), 7.51 (d, 1H), 7.43 (dd, 1H), 7.36-7.32 (m, 1H), 7.29 (d, 1H), 7.25 (td, 1H), 7.18-7.09 (m, 5H), 6.95-6.83 (m, 5H), 6.69 (dd, 1H), 3.41 (s, 3H), 2.76-2.66 (m, 1H), 2.48-2.38 (m, 1H), 1.96 (s, 3H), 1.57 (s, 18H), 1.47-1.13 (m, 8H), 0.93-0.87 (m, 6H), 0.65 (s, 3H); meso-form isomer: $^1$H NMR (400 MHz, $C_6D_6$, 23° C.) δ 8.22-8.18 (m, 1H), 7.90 (s, 2H), 7.38 (dd, 2H), 7.31-7.28 (m, 2H), 7.19-7.09 (m, 2H), 7.05-7.71 (m, 3H), 6.96-6.78 (m, 4H), 6.75 (dd, 1H), 6.67 (s, 1H), 6.58 (dd, 1H), 3.39 (s, 3H), 2.81-2.71 (m, 1H), 2.66-2.56 (m, 1H), 2.18 (s, 3H), 1.54 (s, 18H), 1.40-1.12 (m, 8H), 0.91 (t, 3H), 0.81 (s, 3H), 0.76 (s, 3H).

MCN2

Lithium {1-[(4-oPh.2.-2-"hexyl) indenide]}

"BuLi (2.5 M, 8.2 mL, 20.5 mmol) was added to a stirring precooled solution of 4-([1,1'-Biphenyl]-2-yl)-2-"Hex-1H-indene (6.55 g, 18.58 mmol) in diethyl ether (100 mL). The solution was stirred at room temperature for 19 hours. All volatiles were evaporated. The residue was dried under vacuum to give a crude product containing 0.08 equiv. of $Et_2O$ (6.07 g). The product was used without further purification.

Chlorodimethyl[4-oPh.2.-2-"hexyl-indenyl]silane $Me_2SiCl_2$ (10 g, 77.48 mmol) was added to a precooled solution of above lithium salts (1.97 g, 5.40 mmol) in diethyl ether (60 mL). Additional diethyl ether (10 mL) was added. The white slurry was stirred at room temperature for 17 h. All volatiles were removed in vacuo. The residue was extracted with hexane (50 mL once, 10 mL once) and the filtrate was concentrated under vacuum to give the product (2.19 g). The product was used without further purification.

Dimethylsilyl [4-oPh.2.-2-"hexyl-indenyl] trifluoromethanesulfonate

Silver trifluoromethanesulfonate (1.31 g, 5.098 mmol) was added to a stirring solution of above product (2.16 g, 4.853 mmol) in toluene (25 mL). Additional toluene (10 mL) was added. The slurry was stirred at room temperature for 1 h. Toluene was removed under vacuum and the residue was extracted with hexane (40 mL once, 10 mL once). The hexane filtrate was concentrated under vacuum to give the product (2.55 g). The product was used without further purification.

Bis(4-oPh.2.-2-"hexyl-indenyl) dimethylsilane

Lithium {1-[1-[(4-oPh.2.-2-"hexyl) indenide]}$(Et_2O)_{0.08}$ (1.62 g, 4.446 mmol) was added to a precooled solution of dimethylsilyl[4-oPh.2.-2-"hexyl-indenyl] trifluoromethanesulfonate (2.48 g, 4.439 mmol) in diethyl ether (40 mL). Additional diethyl ether (10 mL) was added. The reaction was stirred at room temperature for 19 h. All volatiles were evaporated. The residue was extracted with hexane (50 mL once, 10 mL once) and the filtrate was concentrated under vacuum to give the crude product (3.28 g). The product was used without further purification.

Dilithium dimethylsilyl bis(4-oPh.2.-2-"hexyl-indenide)

nBuLi (2.5 M, 3.5 mL, 8.75 mmol) was added to a precooled solution of the above crude product (3.22 g) in diethyl ether (30 mL) and hexane (15 mL). The solution was stirred at room temperature for 24 h. All volatiles were removed under vacuum. The residue was washed with hexane (20 mL twice) and dried under vacuum to give the crude product containing 0.54 equiv. of $Et_2O$ (3.29 g).

Dimethylsilyl bis(4-oPh.2.-2-"hexyl-indenyl) zirconium dichloride $ZrCl_4$ (0.96 g, 4.119 mmol) was added to a precooled solution of the above crude product (3.27 g) in toluene (40 mL). Additional toluene (10 mL) was added. The mixture was stirred at room temperature for 18 h. All volatiles were removed under vacuum. The residue was extracted with hexane (60 mL once, 10 mL once). The hexane insolubles were then extracted into toluene (40 mL once, 10 mL once). Toluene filtrates were concentrated to dryness under vacuum to give crude product as a rac/meso mixture in 1/1.2 ratio (1.15 g). Toluene (4 mL) and hexane (32 mL) were added. The slurry was heated to reflux and then was cooled back to room temperature. The mixture was stirred at room temperature for 3 days. The precipitates were separated, washed with hexane (5 mL twice) and were dried in vacuo to give a solid with rac/meso ratio of 1/1.6 (0.99 g). Further multiple fractional crystallizations from diethyl ether afforded a crude product (0.28 g) with rac/meso ratio of about 50/1 plus some insoluble impurities. To this crude product was added $CH_2Cl_2$ (18 mL). The mixture was filtered and the insolubles were washed with additional $CH_2Cl_2$ (18 mL once, 5 mL once). The filtrate and washings were combined and evaporated to dryness. The solid obtained was washed with diethyl ether (5 mL) and dried in vacuo to afford the product (0.15 g, rac/meso=40/1). $^1$H NMR (400 MHz, $CD_2Cl_2$, 23° C.): rac: δ 7.64 (m, 2H), 7.49 (m, 2H), 7.40-7.46 (m, 6H), 7.11 (m, 2H), 7.04-7.08 (m, 10H), 6.91 (m, 2H), 6.32 (s, 2H), 2.54 (m, 2H), 2.10 (m, 2H), 1.32-1.08 (m, 22H), 0.88 (t, 6H).

MCN 3

Lithium [1-(4-oPh.2.)-2-butyl-indenide]

A precooled solution of 4-oPh.2.-2-butyl-indene (7.80 g, 24.1 mmol) in diethyl ether (50 mL) was treated with nBuLi (2.5 M in hexane, 10.1 mL, 25.3 mmol). The reaction was stirred at room temperature for 3 h. Then all volatiles were evaporated. The residue was washed with hexane (10 mL×2) and dried under vacuum to yield an off-white solid as the product (7.09 g).

Chlorodimethyl [(4-oPh.2.)-2-butyl-indenyl] silane

A precooled solution of lithium [1-(4-oPh.2.)-2-butyl-indenide] (3.30 g, 10.0 mmol) in diethyl ether (50 mL) was treated with Me$_2$SiCl$_2$ (6.50 g, 50.0 mmol), and the resulting white slurry was stirred at room temperature overnight. All volatiles were evaporated under reduced pressure. The residue was extracted with hexane (30 mL×2), and the combined filtrate was concentrated to dryness under vacuum to give colorless oil (2.94 g).

Dimethylsilyl (4-oPh.2.-2-butyl-indenyl) trifluoromethanesulfonate

A solution of chlorodimethyl (4-oPh.2.-2-butyl-indenyl) silane (2.90 g, 6.97 mmol) in toluene (30 mL) was treated with silver trifluoromethanesulfonate (1.96 g, 7.67 mmol) while stirring. The white slurry was stirred at room temperature for 5 h. Toluene was evaporated under vacuum and the residue was extracted with hexane (30 mL×2). The filtrate was concentrated under vacuum to give colorless oil as the product (3.60 g).

Bis(4-oPh.2.-2-butyl-indenyl) dimethylsilane

A precooled solution of dimethylsilyl (4-oPh.2.-2-butyl-indenyl) trifluoromethanesulfonate (3.50 g, 6.60 mmol) in diethyl ether (30 mL) was treated with lithium [1-(4-oPh.2.)-2-butyl-indenide] (2.18 g, 6.60 mmol). The solution was stirred for 3 hours at room temperature. Diethyl ether was evaporated. The residue was extracted with solvents (mixed with 30 mL of toluene and 30 mL of hexane). The combined filtrate was concentrated and further dried over vacuum to get an off-white solid as the product (3.24 g).

Dilithium dimethylsilyl bis(4-oPh.2.-2-butyl-indenide)

"BuLi (2.5 M, 3.7 mL, 9.26 mmol) was added to a precooled solution of bis(4-oPh.2.-2-butyl-indenyl) dimethylsilane (3.18 g, 4.52 mmol) in diethyl ether (30 mL). The solution was stirred at room temperature for 3 h. All volatiles were removed under vacuum. The residue was washed with hexane (10 mL×2) and dried under vacuum to give pale yellow foam (2.45 g).

Dimethylsilyl bis(4-oPh.2.-2-butyl-indenyl) zirconium dichloride

A precooled solution of dilithium dimethylsilyl bis(4-oPh.2.-2-butyl-indenide) (2.37 g, 3.31 mmol) in toluene (30 mL) was treated with ZrCl$_4$ (0.76 g, 3.31 mmol). The mixture was stirred at room temperature overnight. The mixture was evaporated to dryness. The residue was extracted with hot cyclohexane (50 mL). The combined filtrate was concentrated under reduced pressure and washed with hexane (20 mL) to get an orange solid as a mixture of two isomers. The mixture was recrystallized (2 mL of toluene and 18 mL hexane, refluxed to room temperature) to afford mixture (520 mg, wet, ratio of rac/meso=10:1). Then the mixture was further recrystallized (1.5 mL of toluene and 13.5 mL hexane, refluxed to room temperature) to afford the rac-isomer (100 mg, ratio of rac/meso=68:1). $^1$H NMR (400 MHz, C$_6$D6, 23° C.), rac-form isomer: δ 8.26-8.23 (m, 2H), 7.39 (s, 1H), 7.36 (s, 1H), 7.35 (d, 1H), 7.33 (d, 1H), 7.22-7.12 (m, 4H), 7.10-7.05 (m, 6H), 6.90-6.78 (m, 8H), 6.70 (dd, 2H), 2.66-2.55 (m, 2H), 2.41-2.30 (m, 2H), 1.29-1.19 (m, 4H), 1.13-1.02 (m, 4H), 0.81 (t, 6H), 0.75 (s, 6H). MCN 4

Chlorodimethyl (4-oPh.2.-2-butyl-inden-1-yl) silane

A precooled solution of lithium [1-(4-oPh.2.)-2-butyl-indenide] (3.30 g, 10.0 mmol) in diethyl ether (50 mL) was treated with Me$_2$SiCl$_2$ (6.45 g, 50.0 mmol), and the resulting white slurry was stirred over night at room temperature. All volatiles were evaporated. The residue was extracted with hexane (20 mL×2), and the combined filtrate was concentrated under reduced pressure to get colorless oil (3.91 g).

Dimethylsilyl (4-oPh.2.-2-butyl-inden-1-yl) trifluoromethanesulfonate

A precooled solution of chlorodimethyl (4-oPh.2.-2-butyl-inden-1-yl) silane (3.90 g, 9.4 mmol) in toluene (30 mL) was treated with silver trifluoromethanesulfonate (2.64 g, 10.3 mmol) while stirring. The white slurry was stirred for 3 hours at room temperature. Toluene was removed under reduced pressure, and the residue was extracted with hexane (20 mL×2). The collected filtrate was concentrated under reduced pressure to colorless oil as the product (4.88 g).

Lithium {4-(3',5'-di-tert-butyl-4'-methoxyphenyl)-2-methyl-1,5,6,7-tetrahydro-s-indacenide}

A precooled solution of 8-(3,5-di-tert-butyl-4-methoxyphenyl)-6-methyl-1,2,3,5-tetrahydro-s-indacene (3.88 g, 10.0 mmol) in diethyl ether (20 mL) was treated with "BuLi (2.5 M in hexane, 4.2 mL, 10.5 mmol). The reaction was stirred over night at room temperature. Then all volatiles were evaporated. The residue was washed with hexane (20 mL×2) and dried under vacuum to yield an orange solid (3.60 g).

(4-oPh.2.-2-butyl-indenyl)(4-(3',5'-di-tert-butyl-4'-methoxyphenyl)-2-methyl-1,5,6,7-tetrahydro-s-indacenyl) dimethylsilane:

A precooled solution of dimethylsilyl (4-oPh.2.-2-butyl-inden-1-yl) trifluoromethanesulfonate (4.80 g, 9.06 mmol) in diethyl ether (30 mL) was treated with a solid of lithium 1-[4-(3,5-di-tert-butyl-4-methoxyphenyl)-2-methyl-1,5,6,7-tetrahydro-s-indacenide] (3.57 g, 9.06 mmol). The solution was stirred overnight at room temperature. Diethyl ether was evaporated. The residue was extracted with hexane (30 mL×2). The combined filtrate was concentrated to dryness and dried over vacuum to get colorless foam (6.70 g).

Dilithium dimethylsilyl (4-oPh.2.-2-butyl indenide) (4-(3',5'-di-tert-butyl-4'-methoxyphenyl)-2-methyl-1,5,6,7-tetrahydro-s-indacenide)

"BuLi (2.5 M, 7.1 mL, 17.83 mmol) was added to a precooled solution of (4-oPh.2.-2-butyl-indenyl)(4-(3,5-di-tert-butyl-4-methoxyphenyl)-2-methyl-1,5,6,7-tetrahydro-s-indacenyl) dimethylsilane (6.68 g, 8.70 mmol) in diethyl ether (50 mL). The mixture was stirred for 3 hours at room temperature. All volatiles were removed under reduced pressure. The residue was washed with cool hexane (30 mL) and dried under vacuum to yield an orange solid (6.247 g).

Dimethylsilyl (4-oPh.2.-2-butyl indenyl) (4-(3',5'-di-tert-butyl-4'-methoxyphenyl)-2-methyl-1,5,6,7-tetrahydro-s-indacenyl) zirconium dichloride A precooled solution of dilithium dimethylsilyl (4-oPh.2.-2-butyl indenide) (4-(3,5-di-tert-butyl-4-methoxyphenyl)-2-methyl-1,5,6,7-tetrahydro-s-indacenide) (6.20 g, 7.95 mmol) in toluene (50 mL) was treated with a powder of $ZrCl_4$ (1.83 g, 7.95 mmol). The mixture was stirred for 5 hours at room temperature. Then the mixture was concentrated under reduced pressure, and the residue was extracted with solvents (mixed with 25 mL of toluene and 20 mL of hexane). The combined filtrate was concentrated. The resulting residue was recrystallized (10 mL of toluene and 50 mL of hexane, refluxed to room temperature). Then the collected solid was further recrystallized (30 mL of toluene, refluxed to room temperature) to get the meso-isomer (853 mg, ratio of rac/meso <1:100). The filtrate from the first recrystallization was concentrated and the residue was recrystallized (10 mL of toluene and 50 mL of hexane, refluxed to room temperature) to afford rac-isomer (351 mg, ratio of rac/meso=39:1). $^1H$ NMR (400 MHz, $C_6D_6$, 23° C.), meso-form isomer: δ 8.23-8.17 (m, 1H), 7.83 (bs, 1H), 7.52 (d, 1H), 7.38 (s, 1H), 7.32-7.28 (m, 1H), 7.22-7.10 (m, 3H), 7.07-7.03 (m, 2H), 6.97 (dd, 1H), 6.88-6.77 (m, 4H), 6.63-6.57 (m, 2H), 3.45 (s, 3H), 3.08-2.55 (m, 6H), 2.16 (s, 3H), 1.85-1.65 (m, 2H), 1.55 (s, 18H), 1.45-1.16 (m, 2H), 1.16-1.08 (m, 2H), 0.91 (s, 3H), 0.85 (t, 3H), 0.76 (s, 3H); rac-form isomer: δ 8.28 (dd, 1H), 7.84 (bs, 1H), 7.46 (s, 1H), 7.37-7.23 (m, 3H), 7.19-7.08 (m, x H), 6.97 (s, 1H), 6.94-6.83 (m, 4H), 6.68 (dd, 1H), 3.47 (s, 3H), 3.12-3.02 (m, 1H), 2.98-2.72 (m, 4H), 2.50-2.40 (m, 1H), 1.95 (s, 3H), 1.84-1.72 (m, 2H), 1.59 (s, 18H), 3.08-2.55 (m, 6H), 2.16 (s, 3H), 1.85-1.65 (m, 2H), 1.55 (s, 18H), 1.38-1.10 (m, 4H), 0.94 (s, 3H), 0.87 (t, 3H), 0.69 (s, 3H).

MCN12 and MNC13

4-Phenyl-1H-indene

A 250 mL flask was charged with 4-bromo-1H-indene (10.00 g, 51.55 mmol), phenylboronic acid (6.60 g, 54.12 mmol), potassium carbonate (10.67 g, 77.33 mmol), tetrabutylammonium bromide (3.42 g, 10.31 mmol), bis(triphenylphosphine) palladium(II) dichloride (1.80 g, 2.50 mmol), water (150 mL) and ethanol (15 mL). The reaction was refluxed for 3 hours under $N_2$ atmosphere. The reaction was cooled down and extracted with hexane (3×100 mL). The combined organic layers were dried over $Na_2SO_4$ and concentrated under reduced pressure. The resulting residue was purified by flash chromatography over silica gel (eluent: hexane) to get the product (8.21 g) as colorless oil.

2-Bromo-7-phenyl-2,3-dihydro-1H-inden-1-ol

A pre-cooled (5° C.) solution of 4-phenyl-1H-indene (8.10 g, 42.2 mmol) in dimethyl sulfoxide (50 mL) and water (1 mL) was treated in one portion with N-bromosuccinimide (8.26 g, 46.4 mmol), and the reaction was allowed to warm up to room temperature naturally and stirred for 3 hours. The mixture was poured into water (500 mL) and extracted with toluene (3×50 mL). The combined organic phases were washed with water (100 mL) and dried over $Na_2SO_4$. The crude product in toluene was used for next step without further purification.

2-Bromo-4-phenyl-1H-indene

The solution from previous step was treated with p-toluenesulfonoc acid monohydrate (0.4 g, 6.3 mmol) and the mixture was refluxed for 6 hours while removing water with a Dean-Stark trap. The mixture was cooled down and concentrated under reduced pressure. The residue was purified by flash chromatography over silica gel (eluent: hexane) to get 2-bromo-4-phenyl-1H-indene (7.36 g) as white solid.

2-Butyl-4-phenyl-1H-indene

In glove box, n-butylmagnesium chloride (15.0 mL, 2.0 M in THF, 29.54 mmol) was added to a solution of 2-bromo-4-phenyl-1H-indene (7.25 g, 26.85 mmol) and $PdCl_2$(dppf) DCM (1.10 g, 1.34 mmol) in 30 mL of THF. The reaction was heated up to 45° C. and stirred at this temperature for 3 hours. The reaction was moved out the glove box and quenched with 200 mL of water. The mixture was extracted with hexane (50 mL×2). The combined organic phases were dried over $Na_2SO_4$ and concentrated under reduced pressure. The residue was purified by silica gel chromatography (eluent: hexane) to get product as colorless oil (2.93 g).

Lithium [1-(4-phenyl-2-butyl indenide)]

A precooled solution of 2-butyl-4-phenyl-1H-indene (2.71 g, 10.9 mmol) in diethyl ether (20 mL) was treated with nBuLi (2.5 M in hexane, 5.7 mL, 11.4 mmol). The reaction was stirred at room temperature for 3 h. Then all volatiles were evaporated. The residue was washed with hexane (20 mL) and dried under vacuum to yield a green-yellow solid as the product (2.700 g).

Chlorodimethyl (4-phenyl-2-butyl-indenyl) silane

A precooled solution of lithium [1-(4-phenyl-2-butyl indenide)] (1.35 g, 5.31 mmol) in diethyl ether (20 mL) was treated with Me2SiCl2 (3.43 g, 26.57 mmol), and the resulting white slurry was stirred at room temperature overnight. After 19 hours stirring, all volatiles were evaporated under reduced pressure. The residue was extracted with hexane (20 mL×2), and the combined filtrate was concentrated to dryness under vacuum to give colorless oil as product (1.79 g).

Dimethylsilyl (4-phenyl-2-butyl-indenyl) trifluoromethanesulfonate

A solution of chlorodimethyl (4-phenyl-2-butyl-indenyl) silane (1.78 g, 5.26 mmol) in toluene (20 mL) was treated with silver trifluoromethanesulfonate (1.48 g, 5.78 mmol) while stirring. The white slurry was stirred at room temperature for 3 h. Toluene was evaporated under vacuum and the residue was extracted with hexane (10 mL×2). The filtrate was concentrated in vacuo to give colorless oil as the product (2.17 g).

Bis(4-phenyl-2-butyl-indenyl) dimethylsilane

A precooled solution of dimethylsilyl (4-phenyl-2-butyl-indenyl) trifluoromethanesulfonate (2.10 g, 4.62 mmol) in diethyl ether (20 mL) was treated with lithium [1-(4-phenyl-2-butyl indenide)] (1.17 g, 4.62 mmol). The solution was stirred for 5 hours at room temperature. Diethyl ether was evaporated. The residue was extracted with hexane (2×10 mL). The combined filtrate was concentrated and further dried in vacuo to get off-white foam as the product (2.56 g).

Dilithium dimethylsilyl bis(4-phenyl-2-butyl indenide)

nBuLi (2.5 M in hexane, 3.7 mL, 9.28 mmol) was added to a precooled solution of bis(4-phenyl-2-butyl-indenyl) dimethylsilane (2.50 g, 4.53 mmol) in diethyl ether (20 mL). The solution was stirred at room temperature for 3 h. All volatiles were removed under vacuum. The residue was washed with hexane (10 mL×2) and dried in vacuo to give pale pink solid as the desired dilithium salt (2.38 g).

Dimethylsilyl bis(4-phenyl-2-butyl-indenyl) zirconium dichloride

A precooled solution of dilithium dimethylsilyl bis(4-phenyl-2-butyl indenide) (2.30 g, 4.08 mmol) in toluene (30 mL) was treated with ZrCl4 (0.938 g, 4.08 mmol). The mixture was stirred at room temperature over weekend. After 64 hours stirring, the mixture was concentrated to dryness. The residue was extracted with toluene (30 mL×2). The combined filtrate was concentrated under reduced pressure and washed with hexane (20 mL) to get an orange solid as a mixture of two isomers. The mixture was recrystallized (20 mL of dichloromethene and 10 mL of diethyl ether, refluxed to room temperature, aged for 16 hours). The slurry was filtered and the pancake was washed with hexane (10 mL) to afford the rac-isomer (yellow, 433 mg, ratio of rac/meso=6.7:1, MNC12). The filtrate was concentrated under reduced pressure and the residue was washed with diethyl ether (30 mL) to obtain meso-isomer rich mixture (orange, 651 mg, ratio of rac/meso=1:1.8, MCN13). 1H NMR (400 MHz, $C_6D_6$, 23° C.), rac-form isomer: δ 7.88 (dd, 4H), 7.57 (d, 2H), 7.30 (dd, 2H), 7.27 (s, 2H), 7.21 (t, 4H), 7.10-7.04 (m, 2H), 6.90 (dd, 2H), 2.76-2.66 (m, 2H), 2.50-2.40 (m, 2H), 1.36-1.22 (m, 4H), 1.19-1.10 (m, 4H), 0.96 (s, 6H), 0.75 (t, 6H); meso-form isomer (identified from rac/meso=1:1.8 mixture): δ 7.83 (dd, 4H), 7.55 (d, 2H), 7.21 (dd, 6H), 7.13-6.99 (m, 4H), 6.75 (dd, 2H), 2.85-2.70 (m, 4H), 1.40-1.05 (m, 8H), 1.10 (s, 3H), 0.96 (s, 3H), 0.75 (t, 6H).

MCN 14

Dimethylsilyl (4-oPh.2.-2-hexyl indenyl) (4-(3',5'-di-tert-butyl-4'-methoxyphenyl)-2-methyl indenyl) zirconium dimethyl A solution of rac-dimethylsilyl (4-oPh.2.-2-hexyl indenyl) (4-(3,5-di-tert-butyl-4-methoxyphenyl)-2-methyl indenyl) zirconium dichloride (MCN1) (with 0.5 equiv. of toluene) (1.1 g) in diethyl ether (100 mL) was precooled at −35° C. for 15 min. MeMgBr (3.5 mL of 3M solution in diethyl ether) was added and the reaction was stirred at room temperature for 70 h. All volatiles were evaporated. The residue was extracted with hexane (60 mL once, 20 mL three times). Filtrates were combined and were evaporated to dryness. Hexane (15 mL) was added and the slurry was left at −35° C. for 1 d to give 0.35 g of dimethylsilyl (4-oPh.2.-2-hexyl indenyl) (4-(3,5-di-tert-butyl-4-methoxyphenyl)-2-methyl indenyl) zirconium dimethyl, rac/meso: ~44/1 (MCN14). $^1$H NMR (400 MHz, C6D6, 23° C.), rac-isomer: δ 7.85 (m, 3H), 7.52 (d, 1H), 7.42-7.40 (m, 2H), 7.31 (d, 1H), 7.25-7.22 (m, 3H), 7.12-7.18 (m, 3H), 6.99-6.88 (m, 4H), 6.77 (s, 1H), 6.72 (dd, 1H), 3.41 (s, 3H), 2.65-2.59 (m, 1H), 2.17-2.09 (m, 1H), 1.92 (s, 3H), 1.52 (s, 18H), 1.45-1.18 (m, 8H), 0.94 (t, 3H), 0.86 (s, 3H), 0.66 (s, 3H), −0.54 (s, 3H), −0.61 (s, 3H).

Supported Methylalumoxane (SMAO)

SMAO was prepared as follows: Davison 948™ Silica (20.8606 g, calcined at 130° C.) was slurried in 121 mL of toluene and chilled in the freezer (−35° C.). MAO (50.5542 g of a 30% wt solution in toluene) was added slowly in 3 parts with the silica slurry returned to the freezer for a few minutes (approx. 2 min) between additions. The slurry was stirred at room temperature for 2 hours, filtered with a fine glass frit filter, reslurried in 80 mL of toluene for 15 min at room temperature, and then filtered again. The solid was reslurried in 80 mL of toluene at 80° C. for 30 min and then filtered. The solid was reslurried in 80 mL of toluene at 80° C. for 30 min and then filtered a final time. The celstir and solid were washed out with 40 mL of toluene. The solid was then washed with pentane and dried under vacuum for 24 hours. Collected 28.9406 g of a free flowing white powder.

Preparation of Supported Catalysts

Supported Catalyst A: MCN1 (26.4 mg, 0.0288 mmol) and MAO (0.2409 g of a 30% by weight toluene solution) were combined together in a 20 mL vial along with 2 mL of toluene and stirred for 1 hr. SMAO (0.7200 g) was slurried in 20 mL of toluene and chilled to −35° C. for a few minutes. The catalyst solution was added to the slurry. The slurry stirred for 1 hr, occasionally being placed in the freezer to maintain a temperature slightly below RT. The slurry was then stirred at 40° C. for 2 hr. The slurry was filtered and the solid reslurried in 20 mL of toluene at 60° C. for 30 min before being filtered again. The solid was reslurried twice more at 60° C. The celstir was then washed out with 20 mL of toluene which was also used to wash the solid. The solid was washed twice with pentane and dried under vacuum to give 0.6000 g of pink solid.

Supported Catalyst B: MCN2 (28.8 mg, 0.0313 mmol) and MAO (0.2620 g of a 30% by weight toluene solution) were combined together in a 20 mL vial along with 2 mL of toluene and stirred for 1 hr. SMAO (0.7885 g) was slurried in 15 mL of toluene and chilled to −35° C. for a minute. The catalyst solution was added to the slurry. The slurry stirred for 1 hr, occasionally being placed in the freezer to maintain a temperature slightly below RT. The slurry was then stirred at 40° C. for 2 hr. The slurry was filtered and the solid reslurried in 15 mL of toluene at 60° C. for 30 min before being filtered again. The solid was reslurried twice more at 60° C. The celstir was then washed out with 15 mL of toluene which was also used to wash the solid. The solid was washed twice with pentane and dried under vacuum to give 0.7054 g of pink solid.

Catalysts C, D, and F were prepared by analogous methodology.

Supported Catalyst E (Comparative): MCN10 (29.3 mg, 0.0402 mmol) and MAO (0.3316 g of a 30% by weight toluene solution) were combined together in a 20 mL vial along with 2 mL of toluene and stirred for 1 hr. SMAO (1.0079 g) was slurried in 15 mL of toluene and chilled to −35° C. for a few minutes. The catalyst solution was added to the slurry. The slurry stirred for 1 hr, occasionally being placed in the freezer to maintain a temperature slightly below RT. The slurry was then stirred at 40° C. for 2 hr. The slurry was filtered and the solid reslurried in 15 mL of toluene at 60° C. for 30 min before being filtered again. The solid was reslurried twice more at 60° C. The celstir was then washed out with 15 mL of toluene which was also used to wash the solid. The solid was washed twice with pentane and dried under vacuum to give 0.9041 g of pink solid.

General Procedure for Small Scale Polymerization

Unless stated otherwise propylene homopolymerization and ethylene-propylene copolymerizations are carried out in a parallel pressure reactor, as generally described in U.S. Pat. Nos. 6,306,658; 6,455,316; WO 00/09255; and Murphy et al., J. Am. Chem. Soc., 2003, 125, pp. 4306-4317, each of which is incorporated by reference herein in its entirety. Although specific quantities, temperatures, solvents, reactants, reactants ratios, pressures, and other variables may need to be adjusted from one reaction to the next, the following describes a typical polymerization performed in a parallel, pressure reactor.

For propylene polymerization and ethylene propylene copolymerization with unsupported metallocene catalysts, the following procedure was used:

A pre-weighed glass vial insert and disposable stirring paddle were fitted to each reaction vessel of the reactor, which contains 48 individual reaction vessels. The reactor was then closed and propylene gas was introduced to each vessel to purge the nitrogen out of the system. If any modules receive hydrogen, it was added in during the purge process. The solvent (typically isohexane) was added next according to the set total reaction volume, including the following additions, to 5 mL usually. At this time scavenger and/or co-catalyst and/or a chain transfer agent, such as tri-n-octylaluminum in toluene (100-1000 nmol) was added. The contents of the vessels were stirred at 800 rpm. The propylene was added as gas to a set pressure. The reactor vessels were heated to their set run temperature (usually between 50° C. and 110° C.). If any modules receive ethylene, it was added as a gas to a pre-determined pressure (typically 40-220 psi) above the pressure of the propylene while the reactor vessels were heated to a set run temperature.

A toluene solution of catalyst (typically at a concentration of 0.2 mmol/L in toluene which usually provides about 15 nmol of catalyst) was injected into the reactors. The reaction was then allowed to proceed until a pre-determined amount of pressure had been taken up by the reaction. Alternatively, the reaction may be allowed to proceed for a set amount of time. The reaction was quenched by pressurizing the vessel with compressed air. After the polymerization reaction, the glass vial insert containing the polymer product and solvent was removed from the pressure cell and the inert atmosphere glove box, and the volatile components were removed using a Genevac HT-12 centrifuge and Genevac VC3000D vacuum evaporator operating at elevated temperature and reduced pressure. The vial was then weighed to determine the yield of the polymer product. The resultant polymer was analyzed by Rapid GPC (see below) to determine the molecular weight and by DSC (see below) to determine melting point.

For ethylene propylene copolymerization with supported metallocene catalysts, the following procedure was used: A pre-weighed glass vial insert and disposable stirring paddle were fitted to each reaction vessel of the reactor, which contained 48 individual reaction vessels. The reactor was then closed and propylene gas was introduced to each vessel to purge the nitrogen out of the system. If any modules receive hydrogen, it was added during the purge process. The solvent (typically isohexane) was added next according to the set total reaction volume, including the following additions, to 5 mL usually. At this time scavenger and/or co-catalyst and/or a chain transfer agent, such as tri-n-octylaluminum in toluene (100-1000 nmol) was added. The contents of the vessels were stirred at 800 rpm. The propylene was added as gas to a set pressure. The reactor vessels were heated to their set run temperature (usually between 50° C. and 110° C.). The ethylene was added as a gas to a pre-determined pressure (typically 40-220 psi) above the pressure of the propylene while the reactor vessels were heated to a set run temperature. The catalyst slurry was vortexed to suspend the catalyst particles into a solution. The buffer toluene (typically 100 microliters), the toluene solution of catalyst (typically 3 mg/ml concentration), and another aliquot of toluene (500 microliters) was then injected into the reactors. The reaction was then allowed to proceed until a pre-determined amount of pressure had been taken up by the reaction. Alternatively, the reaction may be allowed to proceed for a set amount of time. At this point, the reaction was quenched by pressurizing the vessel with compressed air. After the polymerization reaction, the glass vial insert containing the polymer product and solvent was removed from the pressure cell and the inert atmosphere glove box, and the volatile components were removed using a Genevac HT-12 centrifuge and Genevac VC3000D vacuum evaporator operating at elevated temperature and reduced pressure. The vial was then weighed to determine the yield of the polymer product. The resultant polymer was analyzed by Rapid GPC (see below) to determine the molecular weight and by DSC (see below) to determine melting point. Data are reported in Table 1 to 4.

To determine various molecular weight related values by GPC, high temperature size exclusion chromatography was performed using an automated "Rapid GPC" system as generally described in U.S. Pat. Nos. 6,491,816; 6,491,823; 6,475,391; 6,461,515; 6,436,292; 6,406,632; 6,175,409; 6,454,947; 6,260,407; and 6,294,388; each of which is fully incorporated herein by reference for US purposes. This apparatus has a series of three 30 cm×7.5 mm linear columns, each containing PLgel 10 um, Mix B. The GPC system was calibrated using polystyrene standards ranging from 580-3,390,000 g/mol. The system was operated at an eluent flow rate of 2.0 mL/minutes and an oven temperature of 165° C. 1,2,4-trichlorobenzene was used as the eluent. The polymer samples were dissolved in 1,2,4-trichlorobenzene at a concentration of 0.1-0.9 mg/mL. 250 uL of a polymer solution was injected into the system. The concentration of the polymer in the eluent was monitored using a Polymer Char IR4 detector. The molecular weights presented are relative to linear polystyrene standards and are uncorrected. For purposes of this invention only, the Rapid-GPC Mw (weight average molecular weight) data can be divided by 1.9 to approximate GPC-3D Mw results for ethylene-propylene copolymers. Likewise, purposes of this invention only, the Rapid-GPC Mw data for propylene homopolymers can be divided by 1.5 to approximate GPC-3D Mw results.

Differential Scanning Calorimetry (DSC Procedure-1) measurements were performed on a TA-Q200 instrument to determine the melting point of the polymers. Samples were pre-annealed at 220° C. for 15 minutes and then allowed to cool to room temperature overnight. The samples were then heated to 220° C. at a rate of 100° C./minutes and then cooled at a rate of 50° C./min. Melting points were collected during the heating period.

The amount of ethylene incorporated in the polymers (weight %) was determined by rapid FT-IR spectroscopy on a Bruker Vertex 70 IR in reflection mode. Samples were prepared in a thin film format by evaporative deposition techniques. Weight percent ethylene was obtained from the ratio of peak heights at 729.8 and 1157.9 cm-1. This method was calibrated using a set of ethylene/propylene copolymers with a range of known wt % ethylene content.

General Procedure for Solution Polymerization in Coninuous Stirred Tank Reactor (Table 5, Examples 162-167)

Polymerizations were carried out in a continuous stirred tank reactor system. A 1-liter Autoclave reactor was equipped with a stirrer, a pressure controller, and a water cooling/steam heating element with a temperature controller. The reactor was operated in liquid fill condition at a reactor pressure in excess of the bubbling point pressure of the reactant mixture, keeping the reactants in liquid phase. All feeds (solvent and monomers) were pumped into the reactors using Pulsa feed pumps and the flow rates were controlled using Coriolis mass flow controller (Quantim series from Brooks) except for the ethylene, which flowed as a gas under its own pressure through a Brooks flow controller. Ethylene and propylene feeds were combined into one stream and then mixed with a pre-chilled isohexane stream that had been cooled to at least 0° C. The mixture was then fed to the reactor through a single line. Scavenger solution was added to the combined solvent and monomer stream just before it entered the reactor to further reduce any catalyst poisons. Similarly, catalyst solution was fed to the reactor using an ISCO syringe pump through a separated line. Isohexane (used as solvent), and monomers (e.g., ethylene and propylene) were purified over beds of alumina and molecular sieves. Toluene for preparing catalyst solutions was purified using the same technique. An isohexane solution of tri-n-octyl aluminum (TNOA) (25 wt % in hexane, Sigma Aldrich) was used as scavenger solution. The catalyst MTC14 was activated with N,N-dimethyl anilinium tetrakis (pentafluorophenyl) borate at a molar ratio of about 1:1 in 900 ml of toluene.

The polymer produced in the reactor exited through a back pressure control valve that reduced the pressure to atmospheric. This caused the unconverted monomers in the solution to flash into a vapor phase which was vented from the top of a vapor liquid separator. The liquid phase, comprising mainly polymer and solvent, was collected for polymer recovery. The collected samples were first air-dried in a hood to evaporate most of the solvent, and then dried in a vacuum oven at a temperature of about 90° C. for about 12 hours. The vacuum oven dried samples were weighed to obtain yields. Conversion was calculated basing on the yield and feed rate of all monomers.

The detailed polymerization process conditions and some characteristic properties are listed in Table 5. The scavenger feed rate was adjusted to optimize the catalyst efficiency and the feed rate varied from 0 (no scavenger) to 15 tmol/min. The catalyst feed rates may also be adjusted according to the level of impurities in the system to reach the targeted conversions listed. Isohexane was used as the solvent for polymerization and its feed rate was 56.7 gram/min. All the reactions were carried out at a pressure of about 2.4 MPa/g unless otherwise mentioned. Additional processing conditions for the polymerization process of Example 162-167, and the properties of the polymers produced are included below in Table 5.

Ethylene content is determined using FTIR according the ASTM D3900.

Melt flow rate (MFR) was determined according to ASTM D1238 using a load of 2.16 kg and at a temperature of 230° C. High Load Melt Index (also referred to as 121) is the melt flow rate measured according to ASTM D-1238 at 190° C., under a load of 21.6 kg. The units for HLMI are g/10 min or dg/min. Melt Index Ratio (MIR) is the ratio of the high load melt index to the melt index, or I21/I2.

The number of vinyl chain ends, vinylidene chain ends and vinylene chain ends is determined using $^1$H NMR using 1,1,2,2-tetrachloroethane-d2 as the solvent on an at least 400 MHz NMR spectrometer. Proton NMR data is collected at 120° C. in a 5 mm probe using a Varian spectrometer with a 1H frequency of 400 MHz. Data is recorded using a maximum pulse width of 45°, 5 seconds between pulses and signal averaging 120 transients. Spectral signals are integrated and the number of unsaturation types per 1000 carbons are calculated by multiplying the different groups by 1000 and dividing the result by the total number of carbons.

The chain end unsaturations are measured as follows. The vinyl resonances of interest are between from 5.0 to 5.1 ppm (VRA), the vinylidene resonances between from 4.65 to 4.85 ppm (VDRA), the vinylene resonances from 5.31 to 5.55 ppm (VYRA), the trisubstituted unsaturated species from 5.11 to 5.30 ppm (TSRA) and the aliphatic region of interest between from 0 to 2.1 ppm (IA).

The number of vinyl groups/1000 Carbons is determined from the formula: (VRA*500)/((IA+VRA+VYRA+VDRA)/2)+TSRA). Likewise, the number of vinylidene groups/1000 Carbons is determined from the formula: (VDRA*500)/((IA+VRA+VYRA+VDRA)/2)+TSRA), the number of vinylene groups/1000 Carbons from the formula (VYRA*500)/((IA+VRA+VYRA+VDRA)/2) 25+TSRA) and the number of trisubstituted groups from the formula (TSRA*1000)/((IA+VRA+VYRA+VDRA)/2)+TSRA).
VRA, VDRA, VYRA, TSRA and IA are the integrated normalized signal intensities in the chemical shift regions defined above. Vinyl chain ends are reported as a molar percentage of the total number of moles of unsaturated polymer end-groups (that is, the sum of vinyl chain ends, vinylidene chain ends, vinylene chain ends, and trisubstituted olefinic chain ends).

Small Amplitude Oscillatory Shear (SAOS): Dynamic shear melt rheological data was measured with an Advanced Rheometrics Expansion System (ARES) using parallel plates (diameter=25 mm) in a dynamic mode under nitrogen atmosphere. For all experiments, the rheometer was thermally stable at 190° C. for at least 30 minutes before inserting compression-molded sample of resin (polymer composition) onto the parallel plates. To determine the samples' viscoleastic behavior, frequency sweeps in the range from 0.01 to 385 rad/s were carried out at a temperature of 190° C. under constant strain of 10%. A nitrogen stream was circulated through the sample oven to minimize chain extension or cross-linking during the experiments. A sinusoidal shear strain is applied to the material. If the strain amplitude is sufficiently small the material behaves linearly. As those of ordinary skill in the art will be aware, the resulting steady-state stress will also oscillate sinusoidally at the same frequency but will be shifted by a phase angle δ with respect to the strain wave. The stress leads the strain by δ. For purely elastic materials δ=0° (stress is in phase with strain) and for purely viscous materials, δ=90° (stress leads the strain by 90° although the stress is in phase with the strain rate). For viscoleastic materials, 0<δ<90. Complex shear viscosity, loss modulus (G") and storage modulus (G') as function of frequency are provided by the small amplitude oscillatory shear test. Dynamic viscosity is also referred to as complex viscosity or dynamic shear viscosity. The phase or the loss angle δ, is the inverse tangent of the ratio of G" (shear loss modulus) to G' (shear storage modulus).

Differential Scanning Calorimetry (for larger scale products) (DSC-Procedure-2). Peak melting point, (Tm, also referred to as melting point), peak crystallization temperature (Tc, also referred to as crystallization temperature), glass transition temperature (Tg), heat of fusion (Hf), and percent crystallinity were determined using the following DSC procedure according to ASTM D3418-03. Differential scanning calorimetric (DSC) data were obtained using a TA Instruments model Q2100 machine. Samples weighing approximately 5-10 mg were sealed in an aluminum hermetic sample pan. The DSC data were recorded by first gradually heating the sample to 200° C. at a rate of 10° C./minute. The sample was kept at 200° C. for 2 minutes, then cooled to −70° C. at a rate of 10° C./minute, followed by an isothermal for 2 minutes and heating to 200° C. at 10° C./minute. Both the first and second cycle thermal events were recorded. Areas under the endothermic peaks were measured and used to determine the heat of fusion and the percent of crystallinity. The percent crystallinity is calculated using the formula, [area under the melting peak (Joules/gram)/B (Joules/gram)]*100, where B is the heat of fusion for the 100% crystalline homopolymer of the major monomer component. These values for B are to be obtained from the Polymer Handbook, Fourth Edition, published by John Wiley and Sons, New York 1999, provided, however, that a value of 189 J/g is used as the heat of fusion for 100% crystalline polypropylene, a value of 290 J/g is used for the heat of fusion for 100% crystalline polyethylene. The melting and crystallization temperatures reported here were obtained during the first cooling/second heating cycle unless otherwise noted.

In the event of conflict between the DSC Procedure-1 and DSC procedure-2, DSC procedure-2 shall be used.

Gel Permeation Chromotography with Three Detectors (GPC-3D)

Mw, Mn and Mw/Mn are determined by using a High Temperature Gel Permeation Chromatography (Agilent PL-220), equipped with three in-line detectors, a differential refractive index detector (DRI), a light scattering (LS) detector, and a viscometer.

Experimental details, including detector calibration, are described in: T. Sun, P. Brant, R. R. Chance, and W. W. Graessley, Macromolecules, Volume 34, Number 19, pp. 6812-6820, (2001) and references therein. Three Agilent PLgel 10 μm Mixed-B LS columns are used. The nominal flow rate is 0.5 mL/min, and the nominal injection volume is 300 μL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 μm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for about 2 hours. All quantities are measured gravimetrically. The TCB densities used to express the polymer concentration in mass/volume units are 1.463 g/ml at room temperature and 1.284 g/ml at 145° C. The injection concentration is from 0.5 to 2.0 mg/ml, with lower concentrations being used for higher molecular weight samples. Prior to running each sample the DRI detector and the viscometer are purged. Flow rate in the apparatus is then increased to 0.5 ml/minute, and the DRI is allowed to stabilize for 8 hours before injecting the first sample. The LS laser is turned on at least 1 to 1.5 hours before running the samples. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 145° C. and λ=690 nm. Units on parameters throughout this description of the GPC-3D method are such that concentration is expressed in g/cm³, molecular weight is expressed in g/mole, and intrinsic viscosity is expressed in dL/g.

The LS detector is a Wyatt Technology High Temperature DAWN HELEOS. The molecular weight, M, at each point in the chromatogram is determined by analyzing the LS output using the Zimm model for static light scattering (M. B. Huglin, Light Scattering from Polymer Solutions, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient. $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system, which take the same value as the one obtained from DRI method. The refractive index, n=1.500 for TCB at 145° C. and λ=657 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c is concentration and was determined from the DRI output.

The branching index ($g'_{vis}$) is calculated using the output of the GPC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index $g'_{vis}$ is defined as:

$$g'vis = \frac{[\eta]_{avg}}{k M_v^\alpha}$$

$M_v$ is the viscosity-average molecular weight based on molecular weights determined by LS analysis. Z average branching index ($g'_{Zave}$) is calculated using Ci=polymer concentration in the slice i in the polymer peak times the mass of the slice squared, $Mi^2$ The Mark-Houwink parameters used in the data processing for the tested samples are: 1) for ethylene polymers: K/a=0.000579/0.695; and 2) for propylene polymers: K/a=0.0002288/0.705).

All molecular weights are weight average unless otherwise noted. All molecular weights are reported in g/mol unless otherwise noted.

In the event of conflict between the GPC-3D procedure and the "Rapid GPC," the GPC-3D procedure immediately above shall be used. Further details regarding methods of determining Mw, Mn, MWD are described in US 2006/0173123 pages 24-25, paragraphs [0334] to [0341].

1% Secant flexural modulus is measured using an ISO 37-Type 3 bar, with a crosshead speed of 1.0 mm/min and a support span of 30.0 mm using an Instron machine according to ASTM D 790 (A, 1.0 mm/min).

TABLE 1

Small Scale Ethylene Propylene Copolymerization with unsupported Metallocene Catalysts. Catalyst = 0.015 μmol, MAO = 500 equiv., isohexane solvent, 115 psi propylene, total volume = 5 mL, $T_p$ = 70° C.

| Ex. | Catalyst | C2 (psi) | C2 wt % | Mw (g/mol) | Mw/Mn | Rxn Time(s) | Yield (g) | Activity (kg Polymer/mmol cat.h) | Average Mw (kg/mol) | Average Activity (kg Polymer/mmol cat.h) |
|---|---|---|---|---|---|---|---|---|---|---|
| 1 | MCN1 | 80 | 21.6 | 459420 | 1.8 | 51 | 0.175 | 825 | 559 | 615 |
| 2 | | 120 | 28.9 | 423657 | 2.0 | 60 | 0.2748 | 1096 | 416 | 1277 |
| 3 | | 160 | 48.7 | 376825 | 2.2 | 61 | 0.3387 | 1339 | 399 | 1555 |
| 4 | | 80 | 18.9 | 561347 | 1.7 | 69 | 0.177 | 618 | | |
| 5 | | 120 | 30.5 | 408237 | 1.8 | 64 | 0.2877 | 1081 | | |
| 6 | | 160 | 36.3 | 388266 | 2.2 | 62 | 0.3522 | 1357 | | |
| 7 | | 80 | 21 | 657550 | 1.8 | 96 | 0.1598 | 402 | | |
| 8 | | 120 | 29 | 417125 | 2.9 | 53 | 0.3643 | 1656 | | |
| 9 | | 160 | 39 | 432858 | 2.8 | 45 | 0.3661 | 1970 | | |
| 10 | MCN5 | 80 | 24 | 351890 | 1.9 | 64 | 0.2067 | 778 | 347 | 849 |
| 11 | | 120 | 33 | 259567 | 2.6 | 27 | 0.3586 | 3176 | 267 | 3052 |
| 12 | | 160 | 41 | 251166 | 3.2 | 29 | 0.3641 | 3066 | 272 | 2744 |
| 13 | | 80 | 25 | 342108 | 2.0 | 61 | 0.2332 | 921 | | |
| 14 | | 120 | 33 | 275379 | 2.2 | 28 | 0.3367 | 2928 | | |
| 15 | | 160 | 40 | 293719 | 2.4 | 35 | 0.3573 | 2422 | | |
| 16 | MCN6 | 80 | 26.2 | 289457 | 1.8 | 48 | 0.2241 | 1128 | 284 | 1188 |
| 17 | | 120 | 30.4 | 259386 | 1.8 | 48 | 0.2815 | 1416 | 252 | 1385 |
| 18 | | 160 | 41.2 | 241206 | 2.0 | 43 | 0.2847 | 1596 | 238 | 1802 |
| 19 | | 80 | 22.0 | 278571 | 1.8 | 51 | 0.2637 | 1248 | | |
| 20 | | 120 | 31.8 | 245195 | 1.9 | 48 | 0.2702 | 1354 | | |
| 21 | | 160 | 38.5 | 234337 | 1.9 | 35 | 0.2885 | 2007 | | |
| 22 | MCN7 | 80 | 21.9 | 267204 | 1.7 | 90 | 0.1605 | 429 | 267 | 424 |
| 23 | | 120 | 30.6 | 295011 | 1.9 | 77 | 0.1747 | 546 | 295 (one datum) | 546 (one datum) |
| 24 | | 160 | 38.4 | 284000 | 2.3 | 69 | 0.2704 | 941 | 280 | 963 |
| 25 | | 80 | 20.8 | 267041 | 1.7 | 87 | 0.1516 | 419 | | |
| 26 | | 160 | 34.0 | 276333 | 2.0 | 70 | 0.2864 | 985 | | |

TABLE 2

Small Scale Propylene Polymerization and Ethylene Propylene Copolymerization Using 0.39 mg of Supported Catalysts. Conditions: isohexane solvent, 115 psi propylene, TONAL = 4 μmol, total volume = 5 mL, $T_p$ = 70° C.

| Ex. | Catalyst | C2 (psi) | Run Time(s) | Yield (mg) | Activity (gPolymer/gcat-sup.hr) | Mw (kg/mol) | Mw/Mn | C2 wt % | Tm (° C.) |
|---|---|---|---|---|---|---|---|---|---|
| 27 | A | | 2700 | 32.7 | 112 | 1006 | 2.5 | 0.0 | 151.5 |
| 28 | | 40 | 2700 | 66.3 | 227 | 595 | 2.0 | 10.5 | |
| 29 | | 120 | 1649 | 87.2 | 488 | 535 | 1.8 | 29.4 | |
| 30 | | 160 | 318 | 87.7 | 2546 | 500 | 1.7 | 36.4 | |
| 31 | | 220 | 153 | 97.4 | 5876 | 479 | 1.7 | 48 | |
| 32 | | | 2701 | 31.1 | 106 | 1012 | 2.6 | 0.0 | 151.7 |
| 33 | | 40 | 2701 | 66.3 | 227 | 574 | 1.8 | 12.8 | |
| 34 | | 120 | 815 | 90.7 | 1027 | 510 | 1.9 | 27.9 | |
| 35 | | 160 | 442 | 80.9 | 1690 | 486 | 2.2 | 34.4 | |
| 36 | | 220 | 196 | 86.7 | 4083 | 540 | 1.8 | 42.3 | |
| 37 | B | | 2701 | 40.0 | 137 | 1233 | 2.3 | 0.0 | 150.8 |
| 38 | | 40 | 2701 | 60.4 | 206 | 779 | 2.0 | 10.1 | |
| 39 | | 120 | 2079 | 80.0 | 355 | 725 | 1.9 | 24.2 | |
| 40 | | 160 | 797 | 81.7 | 946 | 676 | 1.8 | 34.6 | |

TABLE 2-continued

Small Scale Propylene Polymerization and Ethylene Propylene Copolymerization Using 0.39 mg of Supported Catalysts. Conditions: isohexane solvent, 115 psi propylene, TONAL = 4 µmol, total volume = 5 mL, $T_p$ = 70° C.

| Ex. | Catalyst | C2 (psi) | Run Time(s) | Yield (mg) | Activity (gPolymer/ gcat-sup.hr) | Mw (kg/mol) | Mw/ Mn | C2 wt % | Tm (° C.) |
|---|---|---|---|---|---|---|---|---|---|
| 41 | | 220 | 237 | 82.2 | 3202 | 655 | 1.8 | 43 | |
| 42 | | | 2700 | 40.6 | 139 | 1055 | 2.3 | 0.0 | 151.2 |
| 43 | | 40 | 2700 | 64.3 | 220 | 818 | 1.9 | 9.7 | |
| 44 | | 120 | 1281 | 88.7 | 639 | 737 | 1.9 | 23.9 | |
| 45 | | 160 | 723 | 84.5 | 1079 | 658 | 2.1 | 29.2 | |
| 46 | | 220 | 260 | 81.2 | 2883 | 604 | 2.1 | 44.3 | |
| 47 | C | | 2701 | 49.3 | 168 | 1112 | 2.6 | 0.0 | 151 |
| 48 | | 40 | 2701 | 75.1 | 257 | 816 | 1.9 | 10.1 | |
| 49 | | 120 | 242 | 99.4 | 3791 | 606 | 2.4 | 23.2 | |
| 50 | | 160 | 194 | 112.1 | 5334 | 608 | 2.2 | 27.2 | |
| 51 | | 220 | 143 | 124.7 | 8049 | 534 | 2.3 | 39.4 | |
| 52 | | | 2700 | 38.0 | 130 | 1174 | 3.0 | 0.0 | 150.8 |
| 53 | | 40 | 2700 | 59.0 | 202 | 677 | 2.4 | 10.4 | |
| 54 | | 120 | 257 | 100.8 | 3620 | 590 | 2.4 | 23.2 | |
| 55 | | 160 | 186 | 110.5 | 5484 | 554 | 2.0 | 26.1 | |
| 56 | | 220 | 142 | 117.0 | 7606 | 526 | 1.9 | 36.6 | |
| 57 | D | | 2701 | 37.1 | 127 | 449 | 2.9 | 0.0 | 153.3 |
| 58 | | 40 | 533 | 126.1 | 2184 | 86 | 2.0 | 12 | |
| 59 | | 80 | 280 | 126.5 | 4170 | 77 | 2.4 | 19.3 | |
| 60 | | 120 | 287 | 139.3 | 4480 | 82 | 2.2 | 28.3 | |
| 61 | | 160 | 165 | 152.9 | 8554 | 99 | 2.6 | 34.4 | |
| 62 | | 220 | 110 | 192.2 | 16129 | 136 | 2.0 | 46.8 | |
| 63 | | | 2700 | 36 | 123 | 433 | 2.5 | 0.0 | 152.6 |
| 64 | | 40 | 509 | 125.8 | 2281 | 90 | 2.8 | 14.4 | |
| 65 | | 80 | 306 | 143.6 | 4332 | 81 | 1.9 | 20.3 | |
| 66 | | 120 | 238 | 150.9 | 5853 | 85 | 2.1 | 26.6 | |
| 67 | | 160 | 188 | 194.2 | 9535 | 99 | 2.3 | 30.9 | |
| 68 | | 220 | 108 | 185.5 | 15855 | 131 | 2.0 | 42 | |
| 69 | E | | 2700 | 25.3 | 86 | 294 | 2.3 | 0.0 | 148.8 |
| 70 | | 40 | 2472 | 112.6 | 420 | 226 | 1.8 | 10.3 | |
| 71 | | 120 | 508 | 98.4 | 1788 | 397 | 1.9 | 24.8 | |
| 72 | | 160 | 370 | 92.6 | 2310 | 453 | 1.7 | 34.5 | |
| 73 | | 220 | 224 | 92.8 | 3824 | 584 | 1.8 | 46.2 | |
| 74 | | | 2701 | 25.2 | 86 | 293 | 2.5 | 0.0 | 149.8 |
| 75 | | 40 | 2700 | 88.1 | 301 | 238 | 1.9 | 11.5 | |
| 76 | | 120 | 2527 | 90.1 | 329 | 413 | 1.8 | 27.8 | |
| 77 | | 160 | 608 | 89.9 | 1365 | 483 | 1.9 | 32.4 | |
| 78 | | 220 | 287 | 91.9 | 2956 | 569 | 2.0 | 38 | |
| 79 | F | | 2700 | 18.8 | 64 | 1073 | 3.4 | 0 | 153.9 |
| 80 | | 40 | 2701 | 73.8 | 252 | 364 | 2.4 | 13.7 | |
| 81 | | 80 | 2700 | 85.8 | 293 | 306 | 2.5 | 20.5 | |
| 82 | | 120 | 345 | 98.3 | 2630 | 272 | 2.5 | 25.9 | |
| 83 | | 160 | 176 | 95 | 4983 | 315 | 2.1 | 34.7 | |
| 84 | | 220 | 2701 | 64.1 | 219 | 347 | 2.1 | 46.8 | |
| 85 | | | 2700 | 15.4 | 53 | 1078 | 3 | 0 | 153.7 |
| 86 | | 40 | 2701 | 32.8 | 112 | 339 | 2.4 | 13.7 | |
| 87 | | 80 | 2700 | 33.2 | 114 | 318 | 2.3 | 24.4 | |
| 88 | | 120 | 221 | 98.8 | 4127 | 280 | 2.9 | 25.5 | |
| 89 | | 160 | 1673 | 76.3 | 421 | 339 | 2.3 | 35.7 | |
| 90 | | 220 | 131 | 90.7 | 6391 | 355 | 2.3 | 37.5 | |

TABLE 3

Small Scale Propylene Polymerization and Ethylene Propylene Copolymerization with Unsupported Metallocene Catalysts: Catalyst = 0.015 µmol, MAO = 500 equiv., isohexane solvent, 115 psi propylene, total volume = 5 mL, $T_p$ = 70° C.

| Ex. | Catalyst | C2 feed (psi) | Tm (° C.) | C2 wt % | Mw (g/mol) | Mn (g/Mol) | Mw/ Mn | run time (s) | yield (g) | Activity (kg Polymer/mmol cat.h) |
|---|---|---|---|---|---|---|---|---|---|---|
| 91 | MCN 11 (Comparative) | 0 | 157.1 | 0.0 | 184861 | 110586 | 1.7 | 265 | 0.0415 | 38 |
| 92 | | 40 | | 14.6 | 279427 | 152312 | 1.8 | 74 | 0.1035 | 338 |
| 93 | | 80 | | 22.0 | 325857 | 149374 | 2.2 | 67 | 0.1622 | 580 |
| 94 | | 120 | | 32.8 | 354517 | 164011 | 2.2 | 57 | 0.1948 | 819 |
| 95 | | 160 | | 41.2 | 395939 | 152487 | 2.6 | 54 | 0.295 | 1321 |
| 96 | | 220 | | 46.7 | 457238 | 123981 | 3.7 | 43 | 0.3524 | 1953 |

TABLE 3-continued

Small Scale Propylene Polymerization and Ethylene Propylene Copolymerization with Unsupported Metallocene Catalysts: Catalyst = 0.015 μmol, MAO = 500 equiv., isohexane solvent, 115 psi propylene, total volume = 5 mL, $T_p$ = 70° C.

| Ex. | Catalyst | C2 feed (psi) | Tm (° C.) | C2 wt % | Mw (g/mol) | Mn (g/Mol) | Mw/Mn | run time (s) | yield (g) | Activity (kg Polymer/mmol cat.h) |
|---|---|---|---|---|---|---|---|---|---|---|
| 97 |  | 0 | 157.3 | 0.0 | 209743 | 110975 | 1.9 | 315 | 0.0536 | 41 |
| 98 |  | 40 |  | 13.9 | 285770 | 159029 | 1.8 | 104 | 0.13 | 300 |
| 99 |  | 80 |  | 19.9 | 337130 | 173287 | 1.9 | 80 | 0.1699 | 513 |
| 100 |  | 120 |  | 31.6 | 337589 | 142080 | 2.4 | 62 | 0.2007 | 773 |
| 101 |  | 160 |  | 36.8 | 369463 | 137742 | 2.7 | 55 | 0.2717 | 1188 |
| 102 |  | 220 |  | 47.6 | 419041 | 112517 | 3.7 | 48 | 0.3633 | 1813 |
| 103 | MCN4 | 0 | 156.5 | 0.0 | 625197 | 243080 | 2.6 | 109 | 0.2104 | 463 |
| 104 |  | 40 |  | 13.3 | 512041 | 144269 | 3.5 | 75 | 0.3493 | 1119 |
| 105 |  | 80 |  | 17.9 | 517318 | 144917 | 3.6 | 53 | 0.3592 | 1624 |
| 106 |  | 120 |  | 22.9 | 611592 | 200172 | 3.1 | 58 | 0.34 | 1412 |
| 107 |  | 160 |  | 30.7 | 545897 | 173431 | 3.1 | 43 | 0.3617 | 2023 |
| 108 |  | 220 |  | 48.0 | 531302 | 154863 | 3.4 | 26 | 0.4121 | 3761 |
| 109 |  | 0 | 158.2 | 0.0 | 697661 | 336538 | 2.1 | 90 | 0.1717 | 457 |
| 110 |  | 40 |  | 12.5 | 537170 | 163253 | 3.3 | 73 | 0.3195 | 1055 |
| 111 |  | 80 |  | 18.3 | 454159 | 112961 | 4.0 | 61 | 0.3722 | 1476 |
| 112 |  | 120 |  | 25.1 | 482617 | 111828 | 4.3 | 36 | 0.3379 | 2278 |
| 113 |  | 160 |  | 31.9 | 597393 | 241896 | 2.5 | 50 | 0.3572 | 1721 |
| 114 |  | 220 |  | 45.5 | 468942 | 78908 | 5.9 | 24 | 0.4351 | 4297 |

TABLE 4

Small Scale Propylene Polymerization and Ethylene Propylene Copolymerization with Unsupported Metallocene Catalysts. Catalyst = 0.015 μmol, MAO = 500 equiv., isohexane solvent, total volume = 5 mL. $T_p$ = 70° C., 115 psi propylene $T_p$ = 100° C., 160 psi propylene.

| Ex. | Catalyst | $T_p$ (° C.) | C2 feed (psi) | run time (s) | yield (g) | Activity (kg Polymer/mmol cat.h) | Mw (g/mol) | Mn (g/mol) | Mw/Mn | Tm (° C.) | C2 wt % | Average (kg Polymer/mmol cat.h) | Average Mw (kg/mol) | Average Tm (° C.) |
|---|---|---|---|---|---|---|---|---|---|---|---|---|---|---|
| 115 | MCN1 | 70 |  | 123 | 0.1468 | 286 | 638251 | 320351 | 1.99 | 158.1 |  | 321 | 616 | 157.2 |
| 116 | MCN1 | 70 | 40 | 50 | 0.1448 | 691 | 530555 | 262300 | 2.02 |  | 12.6 | 759 | 492 |  |
| 117 | MCN1 | 70 | 80 | 41 | 0.1222 | 708 | 592607 | 324278 | 1.83 |  | 15.9 | 991 | 498 |  |
| 118 | MCN1 | 70 | 120 | 40 | 0.3687 | 2196 | 349989 | 128391 | 2.73 |  | 26.8 | 1957 | 353 |  |
| 119 | MCN1 | 70 | 160 | 32 | 0.399 | 2965 | 350848 | 96373 | 3.64 |  | 30.9 | 2728 | 394 |  |
| 120 | MCN1 | 100 |  | 100 | 0.0835 | 201 | 203677 | 104256 | 1.95 | 154.0 |  | 217 | 199 | 154.0 |
| 121 | MCN1 | 70 |  | 125 | 0.1866 | 357 | 592988 | 253392 | 2.34 | 156.3 |  |  |  |  |
| 122 | MCN1 | 70 | 40 | 74 | 0.2536 | 828 | 453878 | 164790 | 2.75 |  | 11.4 |  |  |  |
| 123 | MCN1 | 70 | 80 | 57 | 0.3011 | 1274 | 403790 | 165781 | 2.44 |  | 16.4 |  |  |  |
| 124 | MCN1 | 70 | 120 | 47 | 0.3381 | 1719 | 356927 | 139351 | 2.56 |  | 25.0 |  |  |  |
| 125 | MCN1 | 70 | 160 | 32 | 0.3269 | 2491 | 438004 | 159199 | 2.75 |  | 31.2 |  |  |  |
| 126 | MCN1 | 100 |  | 105 | 0.1016 | 233 | 194069 | 90182 | 2.15 | 154.0 |  |  |  |  |
| 127 | MCN3 | 70 |  | 97 | 0.1411 | 351 | 342613 | 161455 | 2.12 | 157.4 |  | 326 | 336 | 157.5 |
| 128 | MCN3 | 70 | 40 | 63 | 0.2216 | 848 | 319020 | 142080 | 2.25 |  | 9.4 | 729 | 329 |  |
| 129 | MCN3 | 70 | 80 | 68 | 0.2616 | 926 | 327786 | 152535 | 2.15 |  | 16.6 | 926 (1 data) | 328 (1 data) |  |
| 130 | MCN3 | 70 | 120 | 47 | 0.3152 | 1616 | 311449 | 129634 | 2.40 |  | 24.1 | 1530 | 298 |  |
| 131 | MCN3 | 70 | 160 | 37 | 0.3008 | 1951 | 299965 | 101396 | 2.96 |  | 30.3 | 1706 | 292 |  |
| 132 | MCN3 | 100 |  | 86 | 0.1023 | 285 | 94499 | 49523 | 1.91 | 154.4 |  | 277 | 95 | 154.5 |
| 133 | MCN3 | 70 |  | 106 | 0.1334 | 301 | 330271 | 153923 | 2.15 | 157.6 |  |  |  |  |
| 134 | MCN3 | 70 | 40 | 72 | 0.1819 | 609 | 338657 | 161551 | 2.10 |  | 10.7 |  |  |  |
| 135 | MCN3 | 70 | 120 | 55 | 0.3313 | 1443 | 283640 | 93431 | 3.04 |  | 23.4 |  |  |  |
| 136 | MCN3 | 70 | 160 | 42 | 0.2567 | 1460 | 283476 | 70895 | 4.00 |  | 29.3 |  |  |  |
| 137 | MCN3 | 100 |  | 99 | 0.1107 | 269 | 95569 | 46739 | 2.04 | 154.6 |  |  |  |  |
| 138 | MCN12 (Comparative) | 70 |  | 163 | 0.0972 | 143 | 319652 | 175225 | 1.82 | 156.6 |  | 147 | 321 | 156.7 |
| 139 | MCN12 (Comparative) | 70 | 40 | 101 | 0.1256 | 298 | 243944 | 145030 | 1.68 |  | 10.7 | 307 | 236 |  |
| 140 | MCN12 (Comparative) | 70 | 80 | 65 | 0.1449 | 535 | 219419 | 117694 | 1.86 |  | 18.4 | 511 | 223 |  |
| 141 | MCN12 (Comparative) | 70 | 120 | 55 | 0.2117 | 927 | 217947 | 134045 | 1.63 |  | 25.6 | 936 | 216 |  |
| 142 | MCN12 (Comparative) | 70 | 160 | 41 | 0.2161 | 1256 | 235345 | 122332 | 1.92 |  | 37.6 | 1243 | 235 |  |
| 143 | MCN12 (Comparative) | 100 |  | 151 | 0.0776 | 123 | 77779 | 41803 | 1.86 | 149.8 |  | 117 | 75 | 149.9 |
| 144 | MCN12 (Comparative) | 70 |  | 154 | 0.096 | 150 | 321603 | 180173 | 1.78 | 156.8 |  |  |  |  |
| 145 | MCN12 (Comparative) | 70 | 40 | 96 | 0.1254 | 315 | 227950 | 124343 | 1.83 |  | 9.3 |  |  |  |

TABLE 4-continued

Small Scale Propylene Polymerization and Ethylene Propylene Copolymerization with Unsupported Metallocene Catalysts. Catalyst = 0.015 μmol, MAO = 500 equiv., isohexane solvent, total volume = 5 mL. $T_p$ = 70° C., 115 psi propylene $T_p$ = 100° C., 160 psi propylene.

| Ex. | Catalyst | $T_p$ (° C.) | C2 feed (psi) | run time (s) | yield (g) | Activity (kg Polymer/ mmol cat.h) | Mw (g/mol) | Mn (g/mol) | Mw/ Mn | Tm (° C.) | C2 wt % | Average Activity (kg Polymer/ mmol cat.h) | Average Mw (kg/mol) | Average Tm (° C.) |
|---|---|---|---|---|---|---|---|---|---|---|---|---|---|---|
| 146 | MCN12 (Comparative) | 70 | 80 | 76 | 0.1542 | 488 | 227108 | 132918 | 1.71 | | 16.9 | | | |
| 147 | MCN12 (Comparative) | 70 | 120 | 55 | 0.2178 | 945 | 214841 | 120123 | 1.79 | | 27.3 | | | |
| 148 | MCN12 (Comparative) | 70 | 160 | 43 | 0.222 | 1230 | 233690 | 124533 | 1.88 | | 35.7 | | | |
| 149 | MCN12 (Comparative) | 100 | | 165 | 0.076 | 111 | 71668 | 42195 | 1.70 | 150.0 | | | | |
| 150 | MCN13 (Comparative) | 70 | | 318 | 0.0536 | 40 | 333392 | 179386 | 1.86 | 152.5 | | 42 | 326 | 152.5 |
| 151 | MCN13 (Comparative) | 70 | 40 | 146 | 0.0602 | 99 | 244292 | 98731 | 2.47 | | 12.1 | 96 | 250 | |
| 152 | MCN13 (Comparative) | 70 | 80 | 109 | 0.0725 | 159 | 226541 | 97037 | 2.33 | | 23.0 | 154 | 226 | |
| 153 | MCN13 (Comparative) | 70 | 120 | 87 | 0.0951 | 263 | 214864 | 95954 | 2.24 | | 29.4 | 243 | 210 | |
| 154 | MCN13 (Comparative) | 70 | 160 | 75 | 0.1069 | 343 | 231798 | 112833 | 2.05 | | 41.4 | 327 | 236 | |
| 155 | MCN13 (Comparative) | 100 | | 272 | 0.0477 | 42 | 73399 | 34040 | 2.16 | 147.7 | | 48 | 72 | 147.7 |
| 156 | MCN13 (Comparative) | 70 | | 246 | 0.0457 | 45 | 318266 | 169933 | 1.87 | 152.5 | | | | |
| 157 | MCN13 (Comparative) | 70 | 40 | 134 | 0.0515 | 93 | 254881 | 124105 | 2.05 | | 11.8 | | | |
| 158 | MCN13 (Comparative) | 70 | 80 | 104 | 0.0646 | 149 | 226121 | 102127 | 2.21 | | 21.0 | | | |
| 159 | MCN13 (Comparative) | 70 | 120 | 87 | 0.0811 | 223 | 205506 | 80948 | 2.54 | | 29.7 | | | |
| 160 | MCN13 (Comparative) | 70 | 160 | 76 | 0.0988 | 310 | 240107 | 120258 | 2.00 | | 42.2 | | | |
| 161 | MCN13 (Comparative) | 100 | | 159 | 0.0362 | 55 | 71599 | 38520 | 1.86 | 147.8 | | | | |

TABLE 5

Continuous Propylene-Ethylene Solution Copolymerization with MCN14/N,N-dimethylanilinium tetrakis(perfluorophenyl)borate, in 1 L reactor: TNOAL 25 wt %, 7.43E−06, mol/min; isohexane, 56.7 g/min

| | Ex. | | | | | |
|---|---|---|---|---|---|---|
| | 162 | 163 | 164 | 165 | 166 | 167 |
| Polymerization temp. (° C.) | 70 | 120 | 120 | 70 | 70 | 70 |
| Ethylene feed rate (g/min) | 0.57 | 6.79 | 6.79 | 3.39 | 2.26 | 1.70 |
| Propylene feed rate (g/min) | 14.0 | 6.0 | 1.0 | 14.0 | 14.0 | 14.0 |
| MTC14 feed rate (mol/min) | 2.662E−07 | 2.282E−07 | 1.521E−07 | 6.085E−08 | 6.085E−08 | 6.085E−08 |
| Polymer made (gram) | 185 | 111.8 | 71 | 605.6 | 413.6 | 398.5 |
| Conversion (%) | 31.8% | 41.6% | 29.4% | 87.0% | 84.8% | 84.6% |
| Complex shear viscosity at 0.1 rad/sec and 190° C. (Pa · s) | | 81,021 | 1,140,890 | | | |
| Complex shear viscosity at 100 rad/sec and 190° C. (Pa · s) | | 2,107 | 6,703 | | | |
| Phase angle at complex modulus G* = 10,000 Pa (degree) | | 48.7 | | | | |
| Phase angle at complex modulus G* = 100,000 Pa (degree) | | 41.0 | 19.3 | | | |
| MFR (g/10 min) | 5.50 | 0.27 | | 33.89 | 43.74 | 42.41 |
| I21 (g/10 min) | | | 0.36 | | | |
| Mn_DRI (g/mol) | 175,749 | 50,650 | 80,583 | | | |
| Mw_DRI (g/mol) | 362,988 | 138,672 | 253,017 | | | |
| Mz_DRI (g/mol) | 590,173 | 256,227 | 505,327 | | | |
| Mw/Mn | | 2.07 | 2.74 | 2.81 | | |
| g'$_{vis}$ | | 1.036 | 0.935 | 0.886 | | |
| Tc (° C.) | 85.8 | | 77.7 | | 8.5 | 37.8 |
| Tm (° C.) | 128.5 | | 92.6 | | 57.1 | 78.6 |

TABLE 5-continued

Continuous Propylene-Ethylene Solution Copolymerization with MCN14/N,N-
dimethylanilinium tetrakis(perfluorophenyl)borate, in 1 L reactor: TNOAL 25 wt %, 7.43E–06,
mol/min; isohexane, 56.7 g/min

| | Ex. | | | | | |
|---|---|---|---|---|---|---|
| | 162 | 163 | 164 | 165 | 166 | 167 |
| Tg (° C.) | | | | −41.6 | −34.5 | −34.9 |
| Heat of fusion (J/g) | 79.8 | | 102.7 | | 25.8 | 40.2 |
| Ethylene content (wt %) | 3.42 | 64.07 | 90.28 | 21.05 | 16.22 | 14.28 |
| Vinyl chain ends/1000 Carbon | 0.11 | 0.13 | 0.04 | | | |
| Vinyl chain end (%) | 21.6% | 31.0% | 40.0% | | | |

Figure 2:
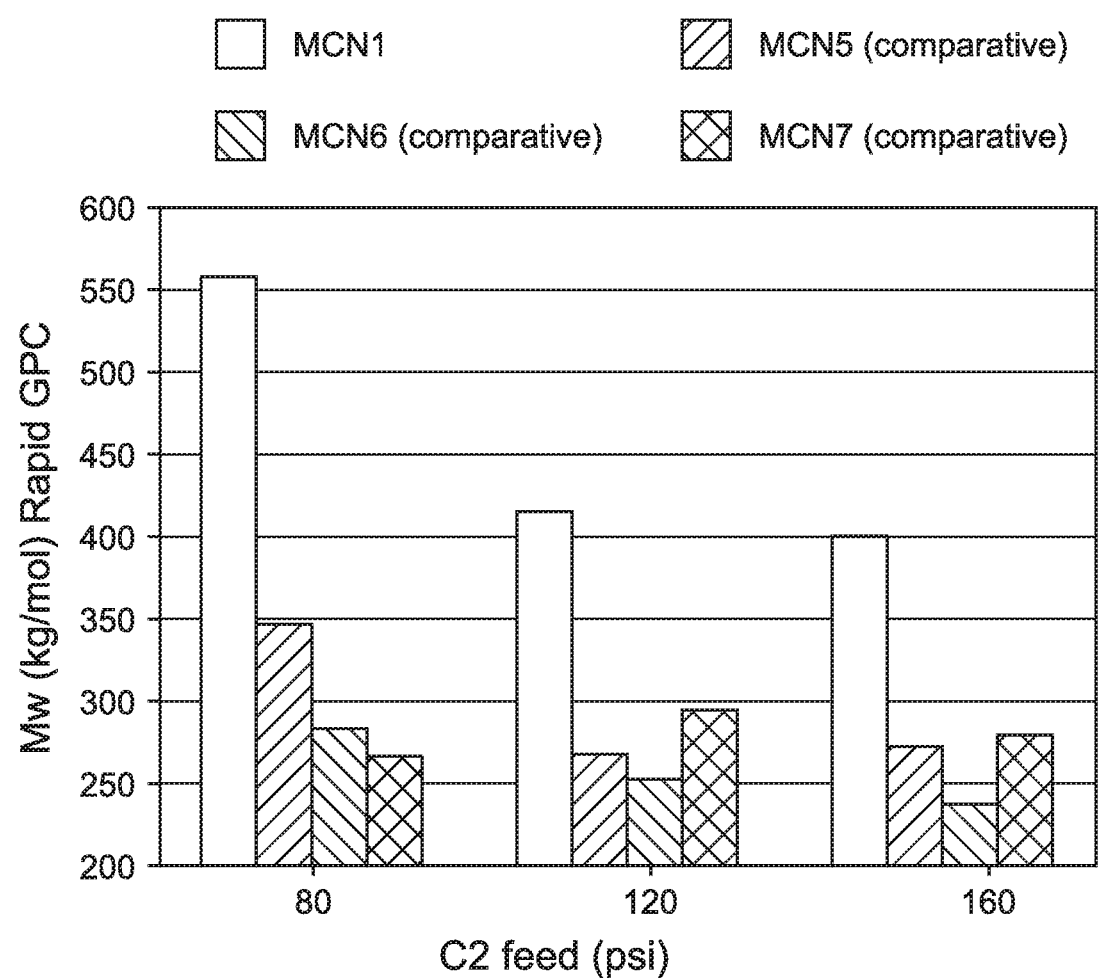
FIG. 2 is a graph of Mw versus ethylene feed pressure from Table 1 (data averaged over two runs except for condition "MNC7, 120 psi C2").

As shown in Table 1 and FIG. 2, MTC1 with 2-hexyl substitution has shown higher Mw capabilities than MTC5 (comparative) and MTC6 (comparative) with 2-Cyclopropyl substitution as well as MTC7 (comparative) with 2-iPr substitution in propylene-ethylene copolymerization under similar conditions.

Figure 3:
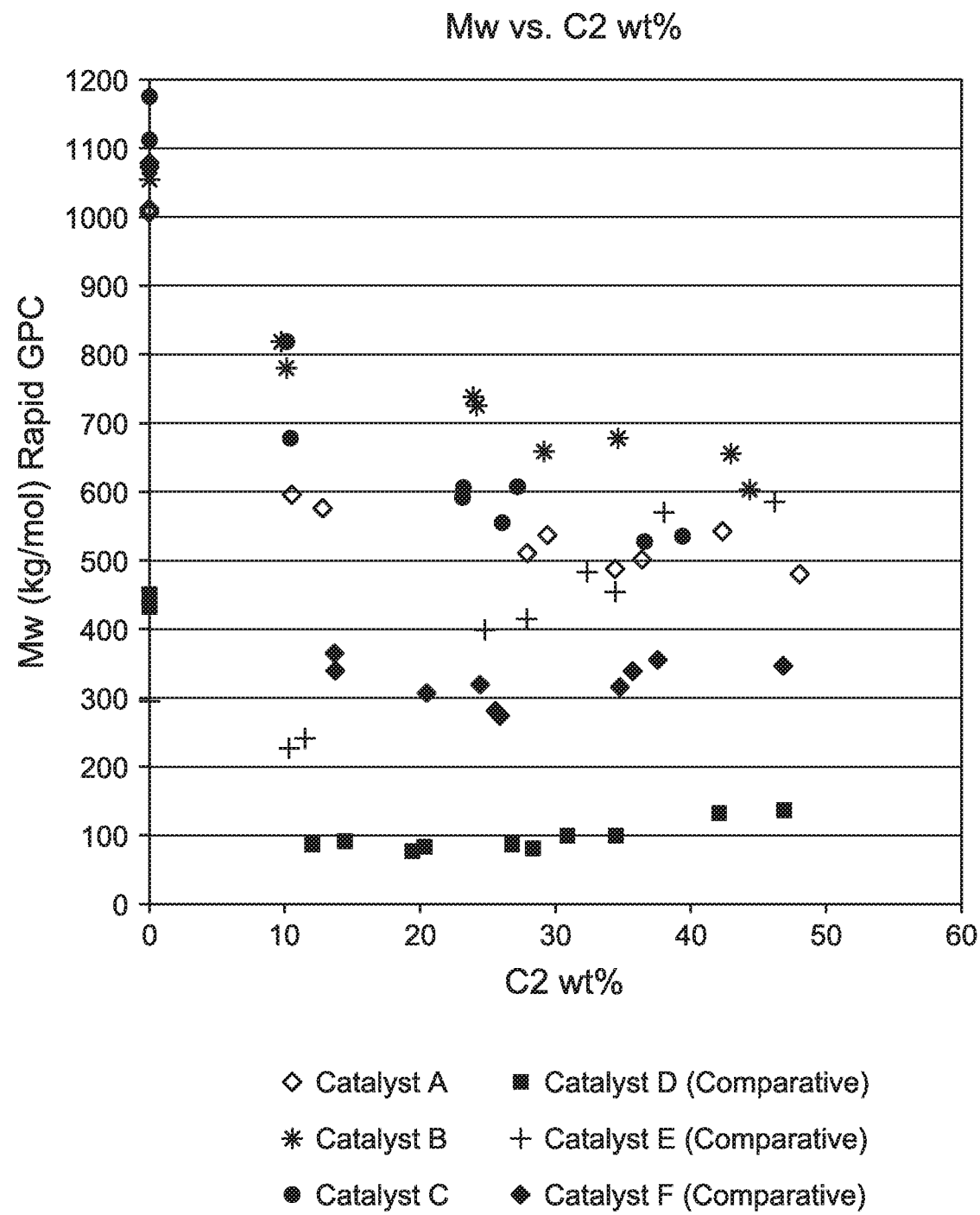
FIG. 3 is a graph of Mw versus C2 wt % incorporation from Table 2.

As shown in Table 2 and FIG. 3, supported catalysts A, B, C with 2-linear alkyl (at least 4 carbons) substitution have shown high Mw capabilities for propylene polymers and copolymers from homo-polypropylene to low C2 (~10 wt % C2) to high C2 (about 50 C2 wt %). As a comparison, comparative Catalyst D with 2-cyclopropyl substitution has medium Mw capabilities for homo-polypropylene but very low Mw capabilities for propylene-ethylene copolymers, comparative Catalyst E with 2-iPr substitution has low Mw capabilities for homo-polypropylene and low C2 (~10 wt % C2) copolymers and high Mw capabilities for high C2 (about 50 C2 wt %) copolymers, comparative Catalyst F with 2-Me substitution has high Mw capabilities for homo-polypropylene but only medium Mw capabilities for propylene-ethylene copolymers.

Figure 4:
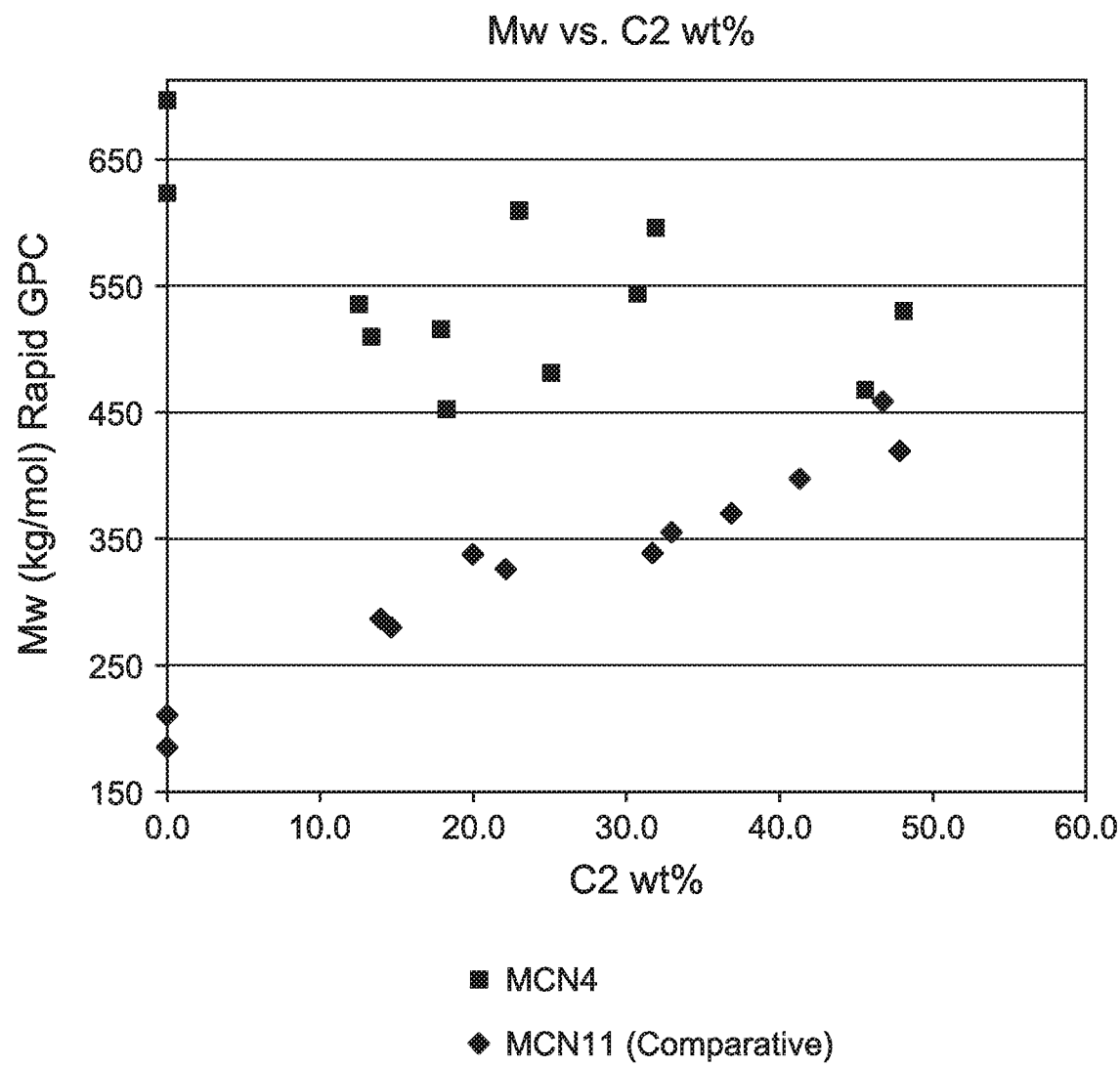
FIG. 4 is a graph of Mw versus C2 wt % incorporation from Table 3.

As shown in Table 3 and FIG. 4, MTC4 with 2-Butyl substitution has shown higher Mw capabilities than MTC 11 (comparative) with 2-iPr substitution for homo-polypropylene and propylene-ethylene copolymers.

Figure 5:
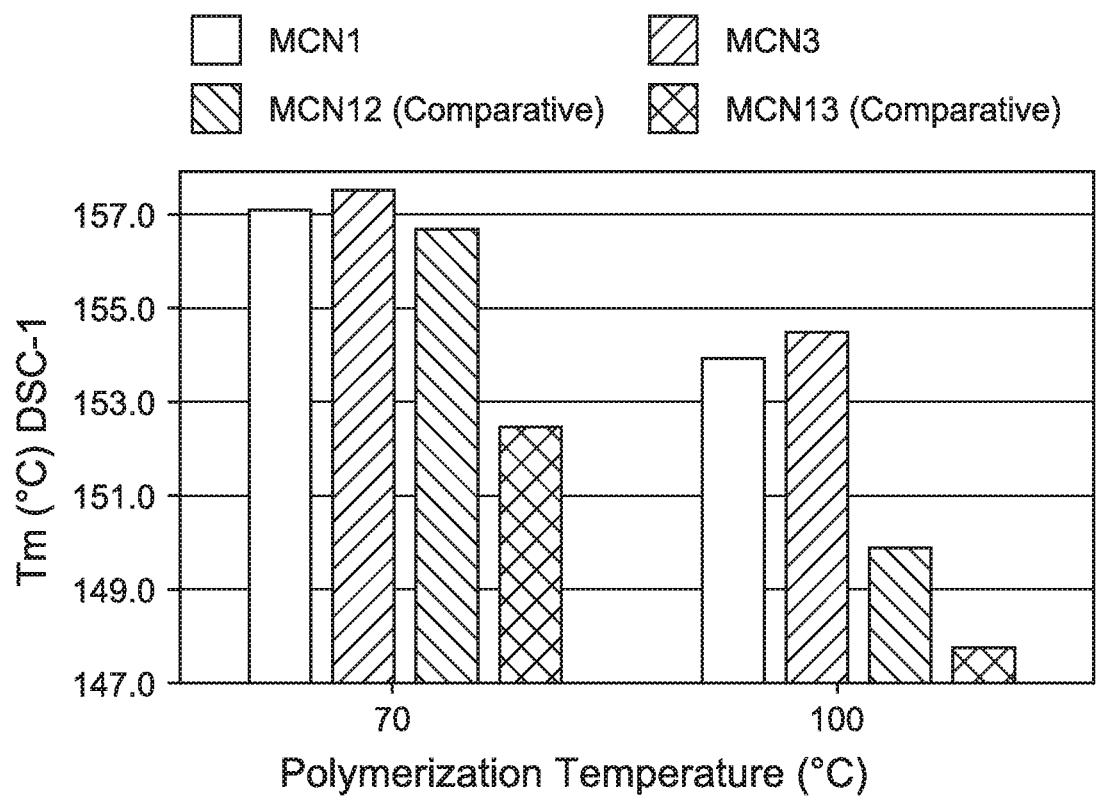
FIG. 5 is a graph of iPP melting point versus polymerization temperature data from Table 4 (data averaged over two runs).
Figure 6:
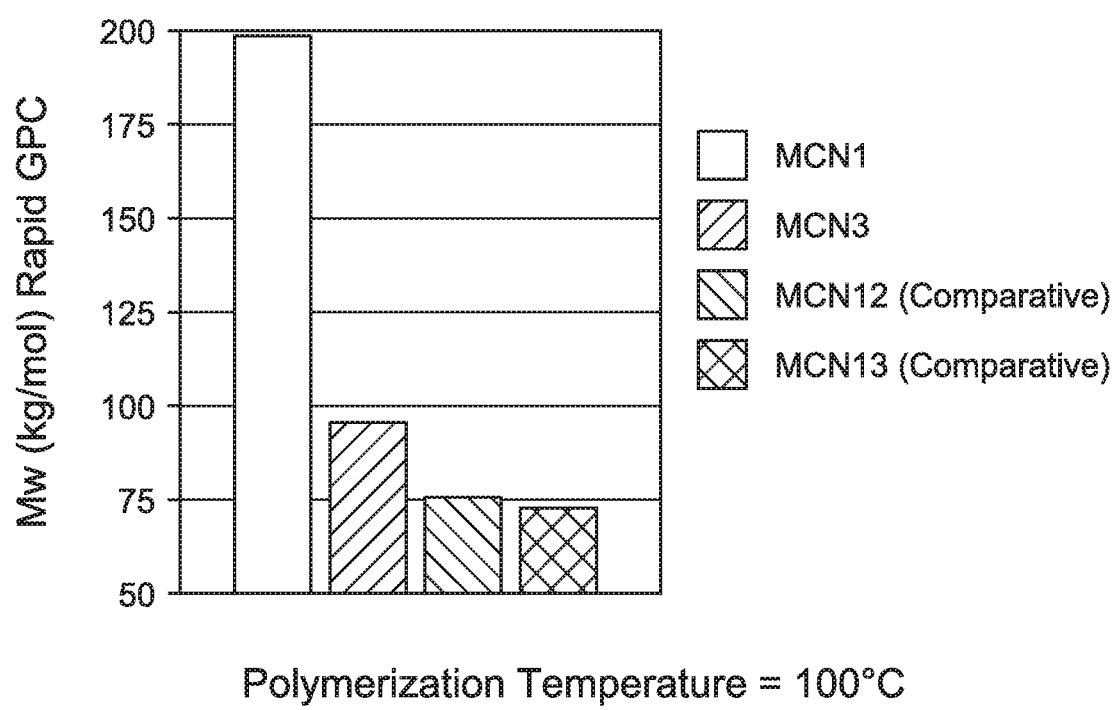
FIG. 6 is a graph of Mw versus polymerization temperature data from Table 4 (data averaged over two runs).

As shown in Table 4 and FIGS. 5 and 6, MTC 1 and MTC3 with 4-substituted phenyl groups have shown higher iPP Tm and Mw capabilities than comparative metallocenes MTC12 and MTC13 for propylene polymerization under similar conditions.

Figure 7:
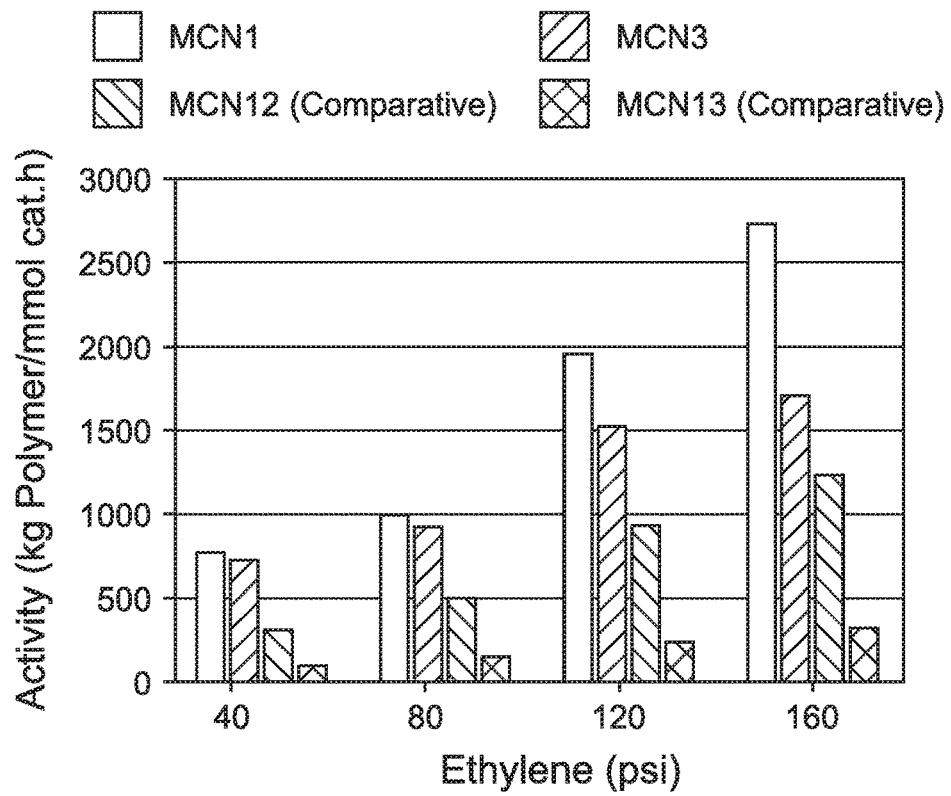
FIG. 7 is a graph of activity versus ethylene feed pressure data from Table 4 (data averaged over two runs).
Figure 8:
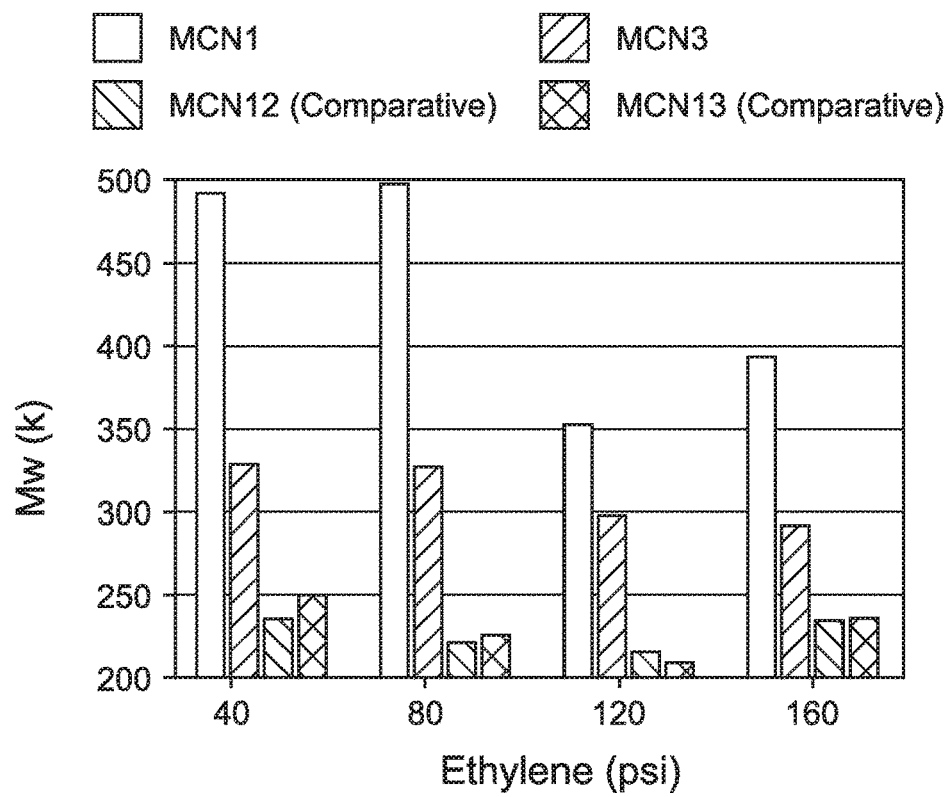
FIG. 8 is a graph of Mw versus ethylene feed pressure data from Table 4 (data averaged over two runs).

As shown in Table 4 and FIGS. 7 and 8, MTC 1 and MTC3 with 4-substituted phenyl groups have shown higher Mw capabilities and activities than comparative metallocenes MTC12 and MTC13 for propylene-ethylene copolymerization under similar conditions.

Figure 9:
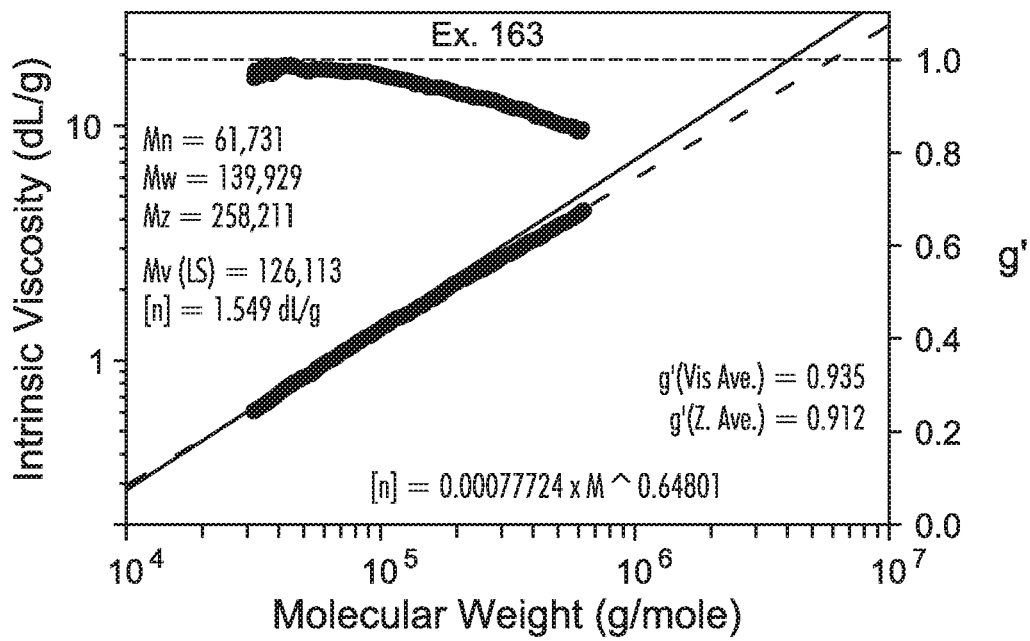
FIG. 9 is a GPC-3D graph for the polymer made in Examples 163 (left) and 164 (right).
Figure 9:
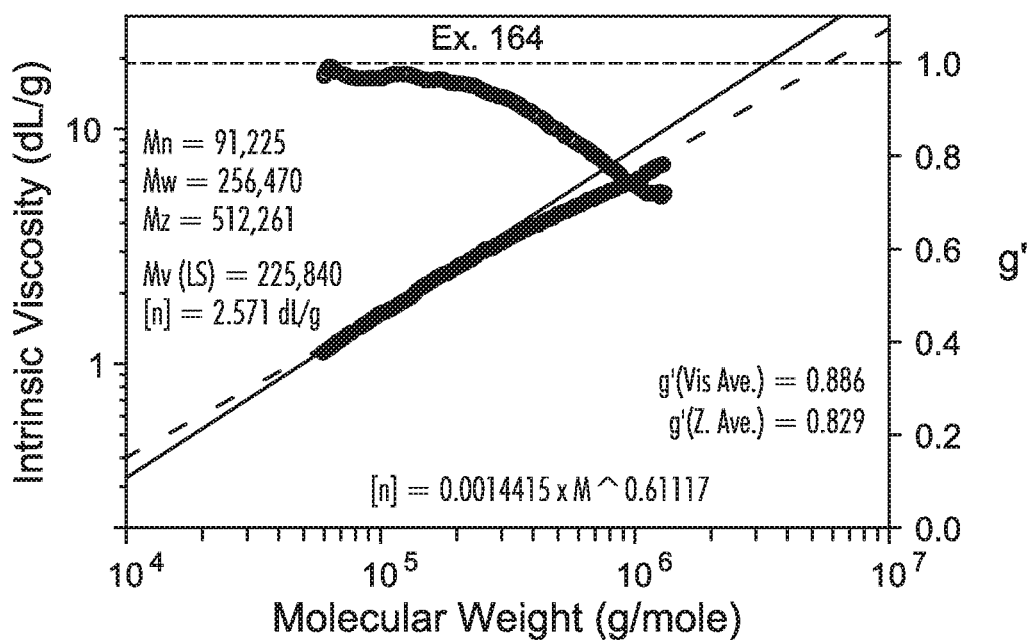
Figure 10:
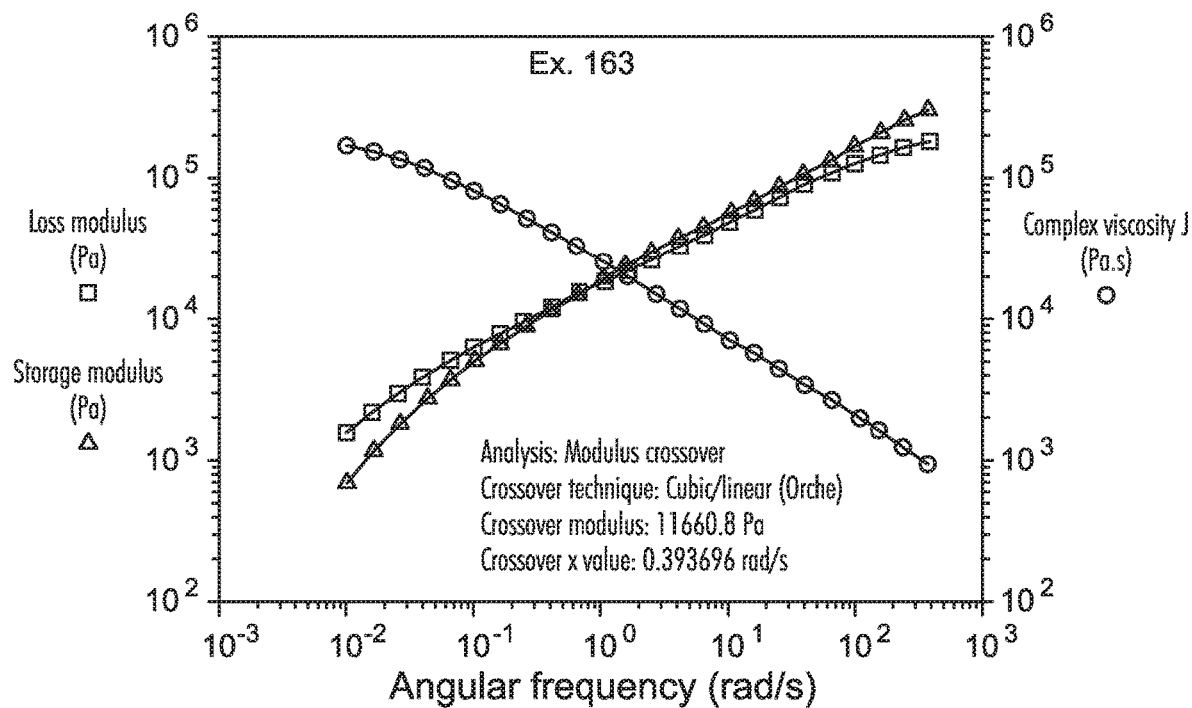
FIG. 10 is a graph of rheological measurements or the polymer made in Examples 163 (left) and 164 (right).
Figure 10:
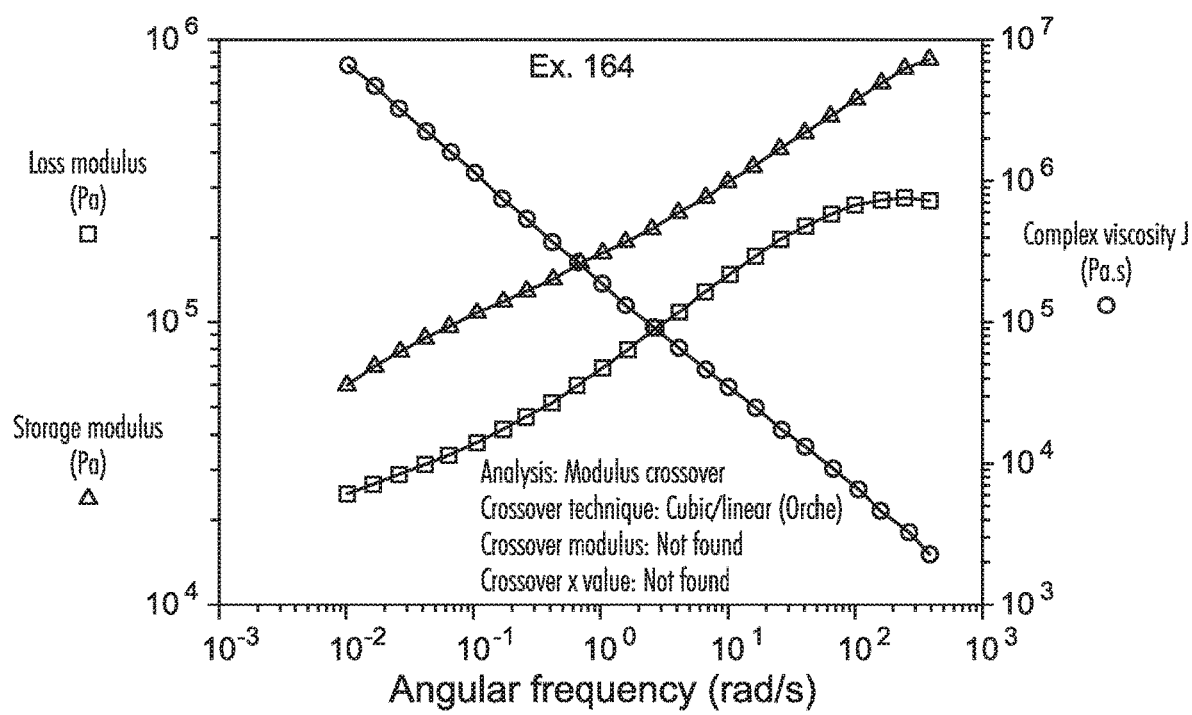
Figure 11:
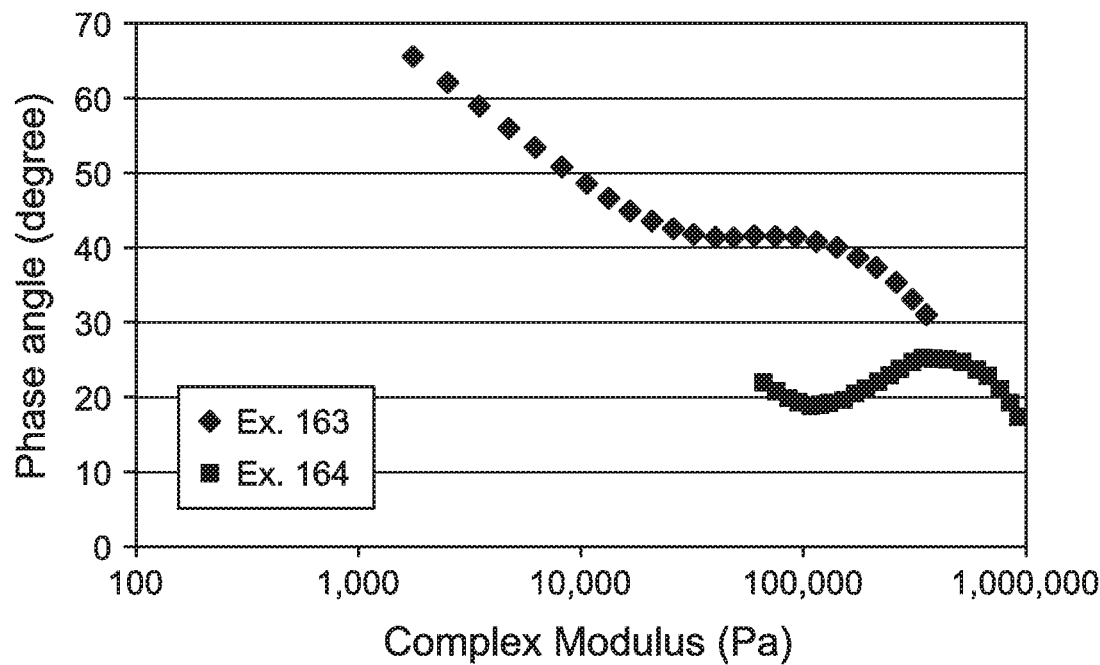
FIG. 11 is a graph of phase angle versus complex modulus for the polymer made in Examples 163 and 164.
Figure 12:
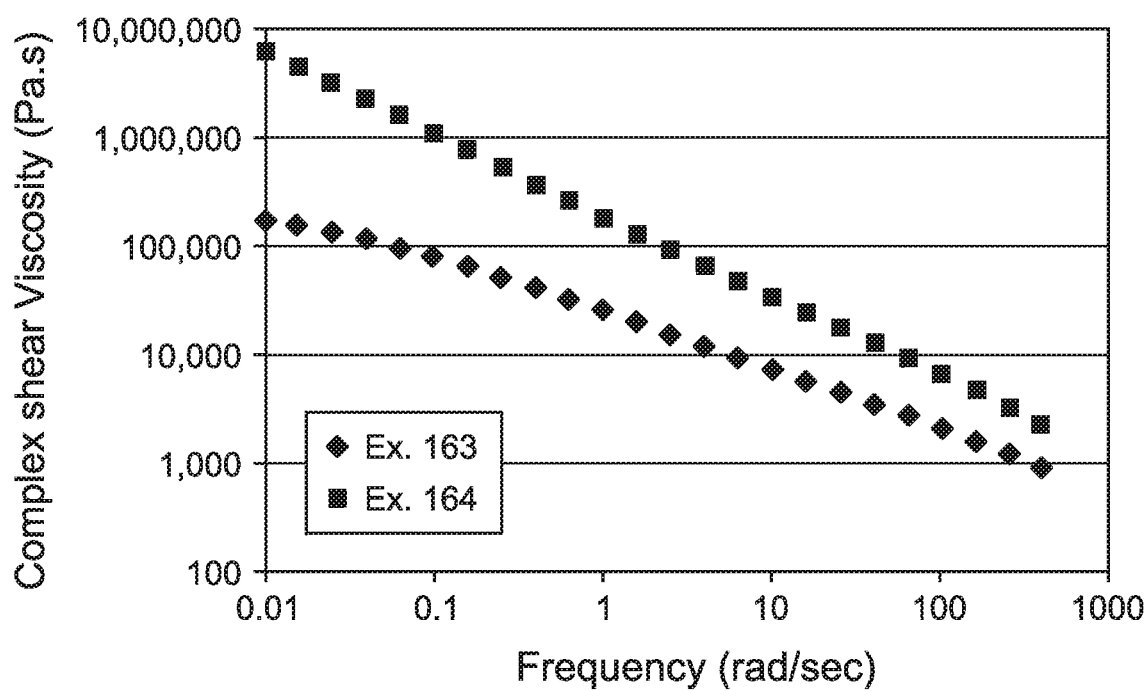
FIG. 12 is a graph of complex shear viscosity versus frequency for the polymer made in Examples 163 and 164.

Interestingly, as shown in Table 5 and FIG. 9, inventive catalyst MTC14 has shown not only good thermal stability and productivities at high temperature (120° C.) but also produced polymers with long-chain branching as evidenced by g'$_{vis}$ of 0.935 (Ex. 163) and 0.886 (Ex. 164). Rheological measurements as shown in FIGS. 10-12 further support this.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

The invention claimed is:

1. A metallocene catalyst compound represented by one or more of the following formulas:

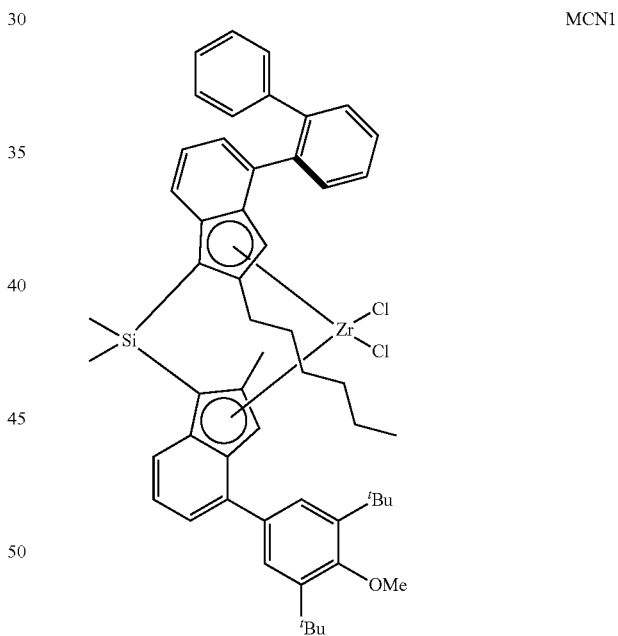

MCN1

2. The metallocene catalyst compound of claim 1, wherein the rac/meso ratio is 10:1 or greater.

3. A catalyst system comprising activator and the metallocene compound of claim 1, and optional support.

4. The catalyst system of claim 3, wherein the activator comprises alumoxane, non-coordinating anion activator, or alumoxane and a non-coordinating anion activator.

5. A process to polymerize olefins comprising contacting one or more olefins with the catalyst system of claim 3.

* * * * *